(12) United States Patent
Masonis et al.

(10) Patent No.: US 11,445,033 B2
(45) Date of Patent: *Sep. 13, 2022

(54) VIRAL ENGINE FOR NETWORK DEPLOYMENT

(71) Applicant: Plaxo, Inc., Sunnyvale, CA (US)

(72) Inventors: John T. Masonis, San Jose, CA (US); Sean Parker, Portola Valley, CA (US); Cameron T. Ring, Menlo Park, CA (US); Richard J. Carey, Los Altos, CA (US)

(73) Assignee: Plaxo, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/072,420

(22) Filed: Oct. 16, 2020

(65) Prior Publication Data

US 2021/0176332 A1 Jun. 10, 2021

Related U.S. Application Data

(63) Continuation of application No. 16/432,066, filed on Jun. 5, 2019, now Pat. No. 10,848,593, which is a
(Continued)

(51) Int. Cl.
*H04L 67/306* (2022.01)
*G06F 21/62* (2013.01)
(Continued)

(52) U.S. Cl.
CPC ........ *H04L 67/306* (2013.01); *G06F 21/6245* (2013.01); *H04L 12/185* (2013.01);
(Continued)

(58) Field of Classification Search
CPC ... H04L 67/306; H04L 12/185; H04L 67/325; H04L 69/40
See application file for complete search history.

(56) References Cited

U.S. PATENT DOCUMENTS

| 5,245,656 A | 9/1993 | Loeb et al. |
|---|---|---|
| 5,263,158 A | 11/1993 | Janis |

(Continued)

FOREIGN PATENT DOCUMENTS

| JP | 2005521946 A | 7/2005 |
|---|---|---|
| NO | 02/052436 A2 | 7/2002 |

(Continued)

OTHER PUBLICATIONS

"Sdn Online Incorporated (Zkey); Company Profile," retrieved Apr. 15, 2009 from http://www.manta.com/coms2/dnbcompany-db9v84, Dun and Bradstreet, Inc., 2009.

(Continued)

*Primary Examiner* — Adnan M Mirza
(74) *Attorney, Agent, or Firm* — Banner & Witcoff, Ltd.

(57) ABSTRACT

A private network system operates over a public network to provide an asymmetric service to members with information from other members and non-members. The system includes central servers and databases connected via the public network to client systems of public network users. The users may be members who communicate with a private protocol or non-members who communicate with the public protocol. A process for the private service includes communication of information between users via the private service servers. The private service server implements the private service, which includes a viral engine for network deployment. Features of the viral engine include genetic algorithms, data mining, personalization, frictionless service setup, user maximization, and member-controlled privacy. A sample setup process and contact update wizard that include several viral engine features are described.

64 Claims, 32 Drawing Sheets

Related U.S. Application Data continuation of application No. 15/337,581, filed on Oct. 28, 2016, now Pat. No. 10,356,205, which is a continuation of application No. 13/438,581, filed on Apr. 3, 2012, now Pat. No. 9,516,134, which is a continuation of application No. 12/104,217, filed on Apr. 16, 2008, now Pat. No. 8,176,131, which is a continuation of application No. 10/703,337, filed on Nov. 7, 2003, now Pat. No. 7,389,324.

(51) Int. Cl.
*H04L 12/18* (2006.01)
*H04L 51/00* (2022.01)
*H04L 69/40* (2022.01)
*H04L 67/62* (2022.01)

(52) U.S. Cl.
CPC .............. *H04L 51/00* (2013.01); *H04L 67/62* (2022.05); *H04L 69/40* (2013.01); *Y10S 707/99931* (2013.01); *Y10S 707/99953* (2013.01)

(56) References Cited

U.S. PATENT DOCUMENTS

| | | |
|---|---|---|
| 5,459,859 A | 10/1995 | Senda |
| 5,493,105 A | 2/1996 | Desai |
| 5,640,565 A | 6/1997 | Dickinson |
| 5,717,863 A | 2/1998 | Adamson et al. |
| 5,732,218 A | 3/1998 | Bland et al. |
| 5,732,229 A | 3/1998 | Dickinson |
| 5,742,763 A | 4/1998 | Jones |
| 5,754,306 A | 5/1998 | Taylor et al. |
| 5,754,938 A | 5/1998 | Herz et al. |
| 5,754,939 A | 5/1998 | Herz et al. |
| 5,764,736 A | 6/1998 | Shachar et al. |
| 5,774,117 A | 6/1998 | Kukkal et al. |
| 5,796,395 A | 8/1998 | de Hond |
| 5,802,510 A | 9/1998 | Jones |
| 5,813,006 A | 9/1998 | Polnerow et al. |
| 5,832,221 A | 11/1998 | Jones |
| 5,835,087 A | 11/1998 | Herz et al. |
| 5,848,412 A | 12/1998 | Rowland et al. |
| 5,852,807 A | 12/1998 | Skarbo et al. |
| 5,937,162 A | 8/1999 | Funk et al. |
| 5,943,399 A | 8/1999 | Bannister et al. |
| 5,948,054 A | 9/1999 | Nielsen |
| 5,950,200 A | 9/1999 | Sudai et al. |
| 5,960,406 A | 9/1999 | Rasansky et al. |
| 5,968,131 A | 10/1999 | Mendez et al. |
| 5,987,440 A | 11/1999 | O'Neil et al. |
| 6,029,195 A | 2/2000 | Herz |
| 6,047,327 A | 4/2000 | Tso et al. |
| 6,073,138 A | 6/2000 | de l'Etraz et al. |
| 6,073,141 A | 6/2000 | Salazar |
| 6,085,192 A | 7/2000 | Mendez et al. |
| 6,085,242 A | 7/2000 | Chandra |
| 6,112,186 A | 8/2000 | Bergh et al. |
| 6,131,096 A | 10/2000 | Ng et al. |
| 6,151,606 A | 11/2000 | Mendez |
| 6,175,831 B1 | 1/2001 | Weinreich et al. |
| 6,205,478 B1 | 3/2001 | Sugano et al. |
| 6,208,659 B1 | 3/2001 | Govindarajan et al. |
| 6,233,623 B1 | 5/2001 | Jeffords et al. |
| 6,247,043 B1 | 6/2001 | Bates et al. |
| 6,253,202 B1 | 6/2001 | Gilmour |
| 6,269,369 B1 | 7/2001 | Robertson |
| 6,311,214 B1 | 10/2001 | Rhoads |
| 6,324,587 B1 | 11/2001 | Trenbeath et al. |
| 6,360,221 B1 | 3/2002 | Gough et al. |
| 6,374,259 B1 | 4/2002 | Celik |
| 6,393,421 B1 | 5/2002 | Paglin |
| 6,405,243 B1 | 6/2002 | Nielsen |
| 6,430,282 B1 | 8/2002 | Bannister et al. |
| 6,449,344 B1 | 9/2002 | Goldfinger et al. |
| 6,519,628 B1 | 2/2003 | Locascio |
| 6,529,724 B1 | 3/2003 | Khazaka et al. |
| 6,533,171 B1 | 3/2003 | Porter |
| 6,564,128 B2 | 5/2003 | Baird et al. |
| 6,571,281 B1 | 5/2003 | Nickerson |
| 6,633,311 B1 | 10/2003 | Douvikas et al. |
| 6,636,897 B1 | 10/2003 | Sherman et al. |
| 6,654,779 B1 | 11/2003 | Tsuei |
| 6,654,789 B1 | 11/2003 | Bliss et al. |
| 6,694,353 B2 | 2/2004 | Sommerer |
| 6,701,348 B2 | 3/2004 | Sommerer |
| 6,708,221 B1 | 3/2004 | Mendez et al. |
| 6,714,916 B1 | 3/2004 | Robertson et al. |
| 6,760,727 B1 | 7/2004 | Schroeder et al. |
| 6,778,651 B1 | 8/2004 | Jost et al. |
| 6,820,204 B1 | 11/2004 | Desai et al. |
| 6,829,348 B1 | 12/2004 | Schroeder et al. |
| 6,845,448 B1 | 1/2005 | Chaganti et al. |
| 6,883,000 B1 | 4/2005 | Gropper |
| 6,957,229 B1 | 10/2005 | Dyor |
| 6,959,324 B1 | 10/2005 | Kubik et al. |
| 7,003,546 B1 | 2/2006 | Cheah |
| 7,007,068 B2 | 2/2006 | Morkel |
| 7,010,599 B2 | 3/2006 | Shrinivasan et al. |
| 7,017,109 B1 | 3/2006 | Douvikas et al. |
| 7,039,679 B2 | 5/2006 | Mendez et al. |
| 7,069,308 B2 | 6/2006 | Abrams |
| 7,080,104 B2 | 7/2006 | Ring et al. |
| 7,280,981 B2 | 10/2007 | Huang et al. |
| 7,308,496 B2 | 12/2007 | Yeager et al. |
| 7,774,368 B2 | 8/2010 | Ring et al. |
| 8,032,559 B2 | 10/2011 | Ring et al. |
| 8,200,770 B2 * | 6/2012 | Ostertag .......... G06Q 10/06315 709/207 |
| 8,271,535 B2 | 9/2012 | Ring et al. |
| 2001/0002469 A1 | 5/2001 | Bates et al. |
| 2002/0016857 A1 | 2/2002 | Harari |
| 2002/0038316 A1 | 3/2002 | Onyon et al. |
| 2002/0042846 A1 | 4/2002 | Bottan et al. |
| 2002/0049751 A1 | 4/2002 | Chen et al. |
| 2002/0049828 A1 | 4/2002 | Pekarek-Kostka |
| 2002/0055351 A1 | 5/2002 | Elsey et al. |
| 2002/0076015 A1 | 6/2002 | Norwitz et al. |
| 2002/0080413 A1 | 6/2002 | Sommerer |
| 2002/0087573 A1 | 7/2002 | Reuning et al. |
| 2002/0094870 A1 | 7/2002 | Murray |
| 2002/0099719 A1 | 7/2002 | Schwitters et al. |
| 2002/0103999 A1 | 8/2002 | Camnisch et al. |
| 2003/0009434 A1 | 1/2003 | Munn et al. |
| 2003/0046280 A1 | 3/2003 | Rotter et al. |
| 2003/0069874 A1 | 4/2003 | Hertzog et al. |
| 2003/0115457 A1 | 6/2003 | Wildish et al. |
| 2003/0126006 A1 | 7/2003 | Kumar et al. |
| 2003/0126156 A1 | 7/2003 | Stoltenberg et al. |
| 2003/0130984 A1 | 7/2003 | Quinlan et al. |
| 2003/0158860 A1 | 8/2003 | Caughey |
| 2004/0002972 A1 | 1/2004 | Pather et al. |
| 2004/0010578 A1 | 1/2004 | Demetriades et al. |
| 2004/0019584 A1 | 1/2004 | Greening et al. |
| 2004/0093317 A1 | 5/2004 | Swan |
| 2004/0158613 A1 | 8/2004 | Sommerer |
| 2004/0167813 A1 | 8/2004 | Robertson et al. |
| 2004/0193691 A1 | 9/2004 | Chang |
| 2004/0215793 A1 | 10/2004 | Ryan et al. |
| 2005/0015443 A1 | 1/2005 | Levine et al. |
| 2005/0114447 A1 | 5/2005 | Cameron et al. |
| 2005/0259291 A1 | 11/2005 | Kii et al. |
| 2006/0021009 A1 | 1/2006 | Lunt |
| 2006/0027648 A1 | 2/2006 | Cheah |
| 2006/0080284 A1 | 4/2006 | Masonis et al. |
| 2006/0168059 A1 | 7/2006 | Chang et al. |
| 2006/0242210 A1 | 10/2006 | Ring et al. |
| 2009/0043805 A1 | 2/2009 | Masonis et al. |
| 2010/0268742 A1 | 10/2010 | Ring et al. |
| 2010/0273483 A1 | 10/2010 | Cho et al. |
| 2010/0299611 A1 | 11/2010 | Feng et al. |

(56) References Cited

U.S. PATENT DOCUMENTS

| | | |
|---|---|---|
| 2010/0312863 A1 | 12/2010 | Mohr |
| 2011/0007726 A1 | 1/2011 | Xie et al. |
| 2011/0122817 A1 | 5/2011 | Russell et al. |

FOREIGN PATENT DOCUMENTS

| | | |
|---|---|---|
| WO | 0018053 A2 | 3/2000 |
| WO | 0067105 A1 | 11/2000 |
| WO | 0109745 A2 | 2/2001 |
| WO | 0133430 A1 | 5/2001 |
| WO | 03083684 A1 | 10/2003 |

OTHER PUBLICATIONS

"Zkey.com Welcomes a Seasoned CFO and Vice President of Operations to the Staff," retrieved Apr. 15, 2009 from http://www.bizwiz.com/bizwizwire/pressrelease/1647/8j8j44yyxj7kyje888j.htm, Jul. 5, 2000.

Maru, Pankaj, "Writing allows me to express my thoughts," retrieved Apr. 15, 2009 from http://www.cxotoday.com/cxo/isp/article.jsp?print=1&article-id=87278&cat-id=1005, Mar. 3, 2008.

Korean Office Action, Korean Application No. 10-2008-7000661, dated Apr. 10, 2008, 6 pages.

Trademark U.S. Appl. No. 75/479,406, filed May 4, 1998; Word Mark: WebCardz.

Yasns, "Six Degrees," retrieved Oct. 18, 2008 from http://yasns.pbwiki.com/SixDegrees, 1997.

U.S. Appl. No. 60/162,499, filed Oct. 29, 1999, Hertzog et al.

European Supplementary Search Report, EP 04810682.7, dated Apr. 22, 2008, 6 pages.

Korean Office Action, Korean Application No. 10-2006-7011152, dated Apr. 14, 2008, 4 pages.

U.S. Appl. No. 60/127,114, filed Mar. 31, 1999, 115 pages.

Examiner's First Report for Australian Patent Application No. 2008202256 dated Jul. 25, 2008, 2 pages.

Canadian Office Action for Application No. 2,544,837, dated Feb. 2, 2010, 2 pages.

PCT International Search Report and Written Opinion, PCT/US04/37539, dated Jul. 18, 2007, 7 pages.

Office Action for Korean Patent Application 10-2006-7011152, dated Jul. 24, 2007.

U.S. Appl. No. 60/132,560, filed May 5, 1999, 74 pages.

Notice of Grounds for Rejection (Office Action) for Japanese Patent Application No. P2006-538552, dated Jul. 13, 2010, 5 pages.

Office action for European patent application No. 04810682.7 dated May 25, 2011.

Extended European Search Report for international application No. 11187946.6 dated Jan. 30, 2012.

Anonymous, "So You Want to Link Your State Data", National Association of Governors Highway Safety Representatives, National Highway Traffic Safety Administration, Jul. 1996.

R. Baxter, P. Christen and T. Churches, "A comparison of fast blocking methods for record linkage", CMIS Tecnical Report 03/139, Aug. 24-27, 2003.

Jun. 4, 2010—Indian Office Action—IN 650/MUMNP/2006.

Mar. 15, 2018—EP Summons to Oral Proceedings—EP 10184855.4.

PlanetAll; Making the world a smaller place, "Become a PlanetAll member now!," retrieved Apr. 16, 2009 from http://web.archive.org/web/19971114082202/www.planetall.com/newmain/New-main.dbm.

Welcome to PlanetAll!, "you will move to a new city eight times," retrieved Apr. 15, 2009 from http://web.archive.org/web/19980415155033/www.planetall.com.

PlanetAll; Making the world a smaller place, "PlanetAll Permissions Scheme," retrieved Apr. 15, 2009 from http://web.archive.org/web/19971114081833/www.planetall.com/newmain/new-main.dbm.

PlanetAll; Making the world a smaller place, "PlanetAll News," retrieved Apr. 16, 2009 from http://web.archive.org/web/1997114081215/www.planetall.com/newmain/new-main.dbm.

PlanetAll; Making the world a smaller place, "PlanetAll in the News," retrieved Apr. 15, 2009 from http://web.archive.org/web/19971114081256/www.planetall.com/newmain/new-main.dbm.

PlanetAll; Making the world a smaller place, "Statement of Privacy," retrieved Apr. 15, 2009 from http://web.archive.org/web/19971114081242/www.planetall.com/newmain/new-main.dbm.

PlanetAll; Making the world a smaller place, "Reminder Service," retrieved Apr. 16, 2009 from http://web.archive.org/web/19971114081202/www.planetall.com/newmain/new-main.dbm.

PlanetAll; Making the world a smaller place, "Who Should Join?," retrieved Apr. 15, 2009 from http://web.archive.org/web/19971114081105/www.planetall.com/newmain/new-main.dbm.

PlanetAll, "Benefits of Building an Active Address Book on PlanetAll," retrieved Apr. 15, 2009 from http://web.archive.org/web/19980415155200/www.planetall.com/tsd1/more1.asp.

PlanetAll, "Access your address book from anywhere," retrieved Apr. 15, 2009 from http://web.archive.org/web/19980415155405/www.planetall.com/tsd1/more2.asp?source=.

PlanetAll, "Synchronizes MS Outlook," retrieved Apr. 15, 2009 from http://web.archive.org/web/19980415155359/www.planetall.com/tsd1/more3.asp?source=.

PlanetAll, "About PlanetAll," retrieved Apr. 15, 2009 from http://web.archive.org/web/19980415155206/www.planetall.com/tsd1/about1.asp.

PlanetAll, "Investors," retrieved Apr. 15, 2009 from http://web.archive.org/web/19980415155546/www.planetall.com/tsd1/about3 asp?source=.

PlanetAll, "Privacy Policy," retrieved Apr. 15, 2009 from http://web.archive.org/web/19980415155552/www.planetall.com/activeSync/outlook/priva . . . .

PlanetAll, "PlanetAll Registration," retrieved Apr. 15, 2009 from http://web.archive.org/web/19980415155118/www.planetall.com/reg/reg1.cfm.

PlanetAll, "What is PlanetAll?," retrieved Apr. 15, 2009 from http://web.archive.org/web/19980415155445/www.planetall.com/activeSync/outlook/what . . . .

Caulfield, Brian, "Building 10,000 Relationships Each Day," Mecklermedia Corporation, Feb. 9, 1998.

Carroll, Matt, "Can't Keep Track of Your Friends? A Cambridge Firm Will," Boston Globe (MA), Jan. 4, 1998.

Business Wire, Inc., "CMG@Ventures II Announces Sale of PlanetAll to Amazon.com," Press Release Aug. 4, 1998.

Business Wire, Inc., "Planet Directs' Personalized Web Service Added to the Compaq Presario Easy Access Internet Suite," Press Release Sep. 28, 1998.

Wang, Nelson, "Keep in Touch: New Breed of Site Links People by Common Interest," Mecklermedia Corporation, Nov. 10, 1997.

Herbert, Rosemary, ProQuest, "Company Profile: PlanetAll links its woridwide colleagues," Boston Herald, Aug. 18, 1997.

Kilsheimer, Joe, "Looking for Old Friend? Web Sites Can Help," Sentinel Communications Co., Nov. 1, 1997.

Emigh, Jacqueline, "PlanetAll Marks 1st Birthday, Inks Deal with Unisys," Post-Newsweek Business Information Inc., Nov. 13, 1997.

PlanetAll, "PlanetAll Membership Agreement," retrieved Apr. 17, 2009 from http://web.archive.org/web/1997121122260/http:/www.planetall.com/reg/agreement-default.cfm, copyright PlanetAll 1997.

Business Wire, Inc., "PlanetAll Partners With Puma Technology to Synchronize Web-Based Contact Management Service With Leading Mobile Devices and Desktop Applications," Press Release Jul. 9, 1998.

"PlanetAll Internet Community Personalizes the Web With Hot New Features and a Fresh Look; Free, Web-based community—growing by the thousands daily—ensures that friends and colleagues are just a mouse click away," Newswire Association, Inc., Sep. 30, 1997.

PlanetAll, "PlanetAll Registration," retrieved Apr. 17, 2009 from http://web.archive.org/web/19980112232618/www.planetall.com/reg/reg1.cfm.

(56) References Cited

OTHER PUBLICATIONS

"This Week Online," Daily News Monday, retrieved Apr. 15, 2009 from http://www.nydailynews.com/archives/money/1996/1996/12/01-this-week-online.h . . . , published Dec. 1, 1996.
Alsop, Stewart, "The Importance of Being in Sync," vol. 138, Time, Inc., Oct. 12, 1998.
Kaufthal, Jon, "The Web's Executive Assistant," retrieved Apr. 16, 2009 from http://www.wired.com/wired/archive/7.07/streetcred.html?pg=5, Issue 7.05, May 1999.
Rosenberg, Ronald, ProQuest, "A way to stay in touch with own little world PlanetAll lets users customize own community in cyberspace; [City Edition]," Boston Globe, p. F.4, Nov. 30, 1997.
"PlanetAll Plans to Make a World of Difference in Busy Lives; New Interactive Service Keeps People Connected, Coordinated and Clued-In," Newswire Association, Inc , Nov. 13, 1996.
"PC Pro: Product Reviews: Sidekick 98," issue 44, retrieved Sep. 22, 2008 from http://www.pcpro.co.uk/reviews/212/sidekick-98.html, Apr. 1998.
"Sidekick Plus® Owner's Handbook," Borland International copyright 1988.
Business Wire, Inc., "Starfish Software Introduces Starfish Internet Sidekick; Starfish Internet Sidekick is the best way for Internet Users to Manage Their Calendar, Contacts and Communications," Press Release Sep. 23, 1996.
Business Wire, Inc. "Starfish Software Updated Sidekick for the Mobile Professional and Internet User; Sidekick 97 Features Unique, Message-Based Internet Scheduling and Links to Powerful Add-On Products," Press Release Jan. 27, 1997.
Business Wire, "Starfish Software Releases Lite Version of Best-Selling Starfish Internet Sidekick; Starfish Internet Sidekick Lite Now Available for Free Download," Press Release Dec. 2, 1996.
"Sidekick® for Windows, Version 2.0 User's Guide," Starfish Software copyright 1991, 1995.
"Sidekick® for Windows; Simplify Your Life User's Guide," Borland International, copyright 1994.
"Bring Me the Head of Carl Steadman!," retrieved Oct. 18, 2008 from http://www.rageboy.com/carlshead.html, published Oct. 7, 1998.
Allbritton, Chris, "It's a small World Wide Web, after all," The Associated Press, Sep. 8, 1998.
Business Wire, Inc., "Launch of Revolutionary "Connection Engine" Links Nearly One Million sixdegrees Members," Press Release Sep. 8, 1998.
Bedell, Doug, "Meeting your new best friends Six Degrees widens your contacts in exchange for sampling Web sites," The Dallas Morning News, published Oct. 27, 1998.
"Net Reader," Dow Jones and Reuters Company, May 8, 1998.
"Novel Services Use Matchmaking Model," p. 59-60, vol. 4, No. 7, NetGuide Magazine, Jul. 1997.
Business Wire, Inc., "sixdegrees Product Launch Promised to Revolutionize Traditional On-line Bulletin Boards & Web Communities," Press Release Oct. 14, 1997.
"6 Degrees of Networking (Macroview Communication's Six Degrees), a Web Site Company Business and Marketing," retrieved Oct. 18, 2008 from https://www.thedacs.com/techs/abstract/161861, published Jun. 4, 1998.
Plotnikoff, David, "Six degrees to the nth degree," San Jose Mercury News, Feb. 10, 1998.
"Confidentiality worry in Net card-file storage," South China Morning Post (Hong Kong), Nov. 17, 1998.
Anonymous, "Electronic Business Card," Communications International, p. 47, May 1996.
Business Wire, Inc., "How to Keep Business Cards from Becoming Obsolete," Financial Times Information, Press Release Oct. 27, 1998.
"Netscape, Firefly and Versign Propose Open Profiling Standard (OPS) to Enable Broad Personalization of Internet Services," PRNewswire, Press Release May 27, 1997.

Macavinta, Courtney, "Netscape pushes privacy standard," CNET News, retrieved Mar. 13, 2009 from http://news.cnet.com/Netscape-pushes-privacy-standard/2100-1023-3-280052.html, published May 23, 1997.
"VCard, The Electronic Business Card, Version 2.1," A versit Consortium Specification, International Business Machines Corp., Lucent Technologies, Inc. and Siemens, Sep. 18, 1996.
Licken, Eoin, "Techie business card takes chaos out of communication as with so many new IT products, users will hve to decide if the frustration and cost of constant upgrades are prices worth paying for inter-operability and progress," The Irish Times, Press Release May 8, 1998.
Business Wire, Inc., "Versit Achieves Widespread Industry Adoption of its vCard Specification," Press Release Apr. 29, 1996.
"Versit: Versit achieves widespread industry adoption of it vCard specification," M2 Communications Ltd., May 1, 1996.
"VCard: The Electronic Business Card, Version 2.1," A versit Consortium White Paper, Jan. 1, 1997.
International Search Report, International Application No. PCT/US99/22931, International filing date Oct. 13, 1999, dated Dec. 22, 1999.
"Visto Briefcase, anywhere, anytime access. It's your PC on the Web!-Free Service Information," retrieved Apr. 14, 2009 from http://web.archive.org/web/19981202192944/www.visto.com/products/products-free.html, Visto Corporation, copyright 1998.
Green, Heather, "A Virtual Concierge at Your Service," The McGraw-Hill Companies, Inc., Nov. 16, 1998.
Norr, Henry, "Companies Offer Virtual Desktops," The San Francisco Chronicle, The Chronicle Publishing Co., Dec. 24, 1998.
Business Wire, Inc., "ESS Wire Visto Delivers First Web-Based Personal Calendar; Visto Briefcase Extends Desktop Calendar to Web for Universal Access," Global News Wire, Press Release May 18, 1998.
Business Wire, Inc., "Palm VII Connected Organizer Users Will be Able to Access Corporate Email Via Visto; Visto Service Expanded to Integrate with Wireless Handheld Devices," Press Release Dec. 15, 1998.
Business Wire, Inc., Visto Introduces Shared Calendar, Files and Photos on the Web; Virtual Briefcase Puts Users' Desktop Information on the Web for Accessing Syncing and Now for Sharing, Press Release Oct. 14, 1998.
Business Wire, Inc., "My Software Partners With Internet Pioneer Visto to Provide Innovative Web Services to Businesses," Press Release Dec. 3, 1998.
Mossberg, Walter S., "Now There Is a Way to Reach Your Files From All of Your PCs," Personal Technology; p. 6, The Asian Wall Street Journal, Apr. 3, 1998.
Holman, Kelly, "Visto Raises $9M Third Round," Securities Data Publishing, Press Release Aug. 3, 1998.
"The Great Portal Race; Internet Companies Compete for Viewers," Time, Inc. Fortune Special, Winter 1999 Technology Buyer's Guide Special Issue, p. 232, Nov. 16, 1998.
Brown, Margaret J., "The Visto Briefcase Pro Puts Your PIM on the Internet," ZDNet Computer Shopper, vol. 18, No. 9, p. 236, Gale Group, Inc., Sep. 1, 1998.
Business Wire, Inc., "Verisign CEO Joins Visto Corp.'s Board of Directors," Financial Times Information, Press Release Dec. 10, 1998.
Business Wire, Inc., "whatUseek Features Visto Briefcase in Its New Meta-Search Engine; Partnership Enables Access to Both Public and Personal Content from Same Site," Financial Times Information, Press Release Nov. 25, 1998.
Business Line, "Visto Briefcase—A PC Away From Your PC," Financial Times Information, Press Release Aug. 13, 1998.
Business Wire, Inc., "Visto Raises $9 Million in Venture Funding to Broaden Universal Internet Access Service; NEA's Stewart Alsop Will Join Visto's Board," Financial Times Information, Press Release Jul. 24, 1998.
WebCardz—Electronic Business Cards, "Business Cards Come to Virtual Life on the World Wide Web," retrieved Apr. 14, 2009 from http://web.archive.org/web/19991005203339/www.webcardz.com/press-release/press-releases-1.html, WebCardz International, 1998.

(56) References Cited

OTHER PUBLICATIONS

WebCardz—Electronic Business Cards, "Web Cardz Press Box; Frequently Asked Questions," retrieved Apr. 14, 2009 from http://web.archive.org/web/19990422020641/www.webcardz.com/press-release/faq.html, WebCardz International, 1998.
"Here's My Webcardz," Crain Communications Inc., Press Release Sep. 1, 1998.
WebCardz—Electronic Business Cards, "New design & new features," retrieved Apr. 14, 2009 from http://web.archive.org/web/19991005223211/www.webcardz.com/press-release/press-releases-2.html, WebCardz International, 1998.
WebCardz—Electronic Business Cards, "Sample WebCardz," retrieved Apr. 14, 2009 from http://web.archive.org/web/19990129025849/www.webcardz.com/samples/index.html, WebCardz International, 1998.
"WebCardz to market Internet business cards," Philadelphia Business Journal, Jun. 18, 1998.
WebCardz, "What is a WebCardz," retrieved Apr. 14, 2009 from http://web.archive.org/web/19981205214701/www.webcardz.com/whatis/index.html, WebCardz International, 1998.
Webcardz.com—Web Car Dz, retrieved Apr. 14, 2009 from http://whois.domaintools.com/webcardz.com.
About Who Where?, "WhoWhere?® Features," retrieved Oct. 23, 2008 from http://web.archive.org/web/19970809065707/www.whowhere.com/About/features.html, 1995-1997.
"WhoWhere? and GeoCities Announce Partnership Linking the Leading People & Home-Page Directory With Online Community Pioneer; Hot-Linked Sit4es Create Premier Destination for Connecting People and Communities on the Web," PR Newswire Association, Inc., Press Release Dec. 2, 1996.
"WhoWhere? Announces MailCity Free, Permanent E-Mail Service; Get It Anywhere, Anytime," PR Newswire Association, Inc., Mar. 13, 1997.
"WhoWhere, Classifieds2000, Create WhoWhere Classifieds on Web," The Simba Report on Directory Publishing, Press Release Mar. 15, 1997.
Hesseldahl, Arik, "Creating Scalable Sites Using Homegrown Tools," Mecklermedia Corporation, Press Release May 18, 1998.
McKenna, Patrick, "Excite Makes WhoWhere Number One People Finder," Post-Newsweek Business Information Inc., Press Release Feb. 25, 1997.
"Excite Selects WhoWhere? for Email Lookup and People Finder Services; WhoWhere? Recognized As 'Best of Class' for Finding Email Address, Home Phone Numbers and Home Addresses on the Web," PR Newswire Association, Inc., Press Release Feb. 25, 1997.
"Find a Lost Love and Send a Valentine Via E-mail, American Greetings Joins WhoWhere? With Its Popular Line of Electronic Cards," PR Newswire Association, Inc., Press Release Feb. 12, 1998.
Buel, Stephen, "Internet Directory Firm Lycos to Buy Online Locator WhoWhere," San Jose Mercury News, Aug. 12, 1998.
"Leading Internet White Page Director Vendors Support Microsoft NetMeeting; Integration Makes It Easy to Find Users of NetMeeting on the Internet Anywhere in the World," PR Newswire Association, Inc., Press Release Aug. 27, 1996.
Notess, Greg R., "On the Nets: Email Address Databases," Responsive Database Services, Inc. And Business and Management Practices, Press Release Oct. 1996.
"People on the Net," Phillips Business Information, Inc. Internet Week, Press Release May 5, 1997.
"Welcome to WhoWhere?," retrieved Oct. 23, 2008 from http://web.archive.org/web/19970809064609/http://www.whowhere.com, 1995-1997.
WhoWhere?, "Usage Agreement," retrieved Oct. 28, 2008 from http://web.archive.org/web/19970809065219/www.whowhere.com/Agree, 1995-1997.
Zkey.com: Private Company Information—Business Week, "ZKey.com Company Overview," retrieved Apr. 15, 2009 from http://investing.businessweek.com/research/stocks/private/snapshot.asp?privcapId=89778, The McGraw-Hill companies, 2000-2009.

Werback, Kevin, "Data Soup: The Client is the Server," Release 1.0; Esther Dyson's Monthly Report, Apr. 12, 2000.
Business Wire, Inc., "Day-Time Digital Inc. and Zcentral Join Forces to Create the Ultimate Online Organizer," Press Release Jul. 20, 1999.
Story, L., Helping People on the Move Keep Adresses Up to Date, New York Times, Apr. 5, 2004.
PlanetAll project description [online]. PlanetAll, Inc, 2003 [retrieved on Aug. 19, 2003]. Retrieved from the Internet: <URL: http://www.tinmonkey.com/projects/planetall<SUB>-</SUB>fp.html>.
Plaxo Description and Download [online]. NetworkingFiles.com, 2003 [retrieved on Aug. 19, 2003]. Retrieved from the Internet: <URL: http://www.networkingfiles.com/email/plaxo.html>.
Lacy, S., Banking on its customer base, Plaxo raises $8.5 million more. Silicon Valley / San Jose Business Journal [online], Aug. 4, 2003 [retrieved on Aug. 18, 2003]. Retrieved from the Internet: <URL: http://sanjose.bizjournals.com/sanjose/stories/2003/08/04/smallb4.html>.
Lacy, S., Out of beta, Plaxo to target business with address book product. Silicon Valley / San Jose Business Journal [online], May 26, 2003 [retrieved on Aug. 18, 2003]. Retrieved from the Internet: <URL: http://sanjose.bizjournals.com/sanjose/stories/2003/05/26/smallb4.html>.
Marshall, M., Plaxo to launch address software. Mercury News [online], May 21, 2003 [retrieved on Aug. 18, 2003]. Retrieved from the Internet:: <URL: http://www.siliconvalley.com>.
Rowlingson, P., Product review of Plaxo software. Computeractive Online [online], Feb. 19, 2003 [retrieved on Aug. 18, 2003]. Retrieved from the Internet: <URL: http://www.computeractive.co.uk/Download/1138899>.
Borland, J., P2P pioneers take on new challenges. CNET News.com [online], Nov. 12, 2002 [retrieved on Sep. 10, 2003]. Retrieved from the Internet: <URL: http://zdnet.com.com/2100-1106-965371.html>.
Plaxo announces flagship software application. Silicon Valley / San Jose Business Journal [online], Nov. 12, 2002 [retrieved on Aug. 18, 2003]. Retrieved from the Internet: <URL: http://sanjose.bizjournals.com/sanjose/stories/2002/11/11/daily17.html>.
Plaxo Launches; Makes it Easy to Keep Contact Information Up to Date. Plaxo, Inc. News Release [online], Nov. 12, 2002. Retrieved from the Internet: <URL:http://plaxo.com>.
Wolverton, T., Amazon to shut PlanetAll, absorb feature. CNET News.com [online], Jun. 8, 2002 [retrieved on Aug. 19, 2003]. Retrieved from the Internet <URL: http://news.com.com/2100-1017-241648.html>.
Amazon.com, Inc., Important Information About PlanetAll.com. In cypherpunks@toad.com mailing list [online]. Jun. 6, 2000. Retrieved from the Internet: <URL: http://www.csua.berkeley.edu/cypherpunks>.
PlanetAll, Inc., Planetall Update for Jul. 3, 1999. In cypherpunks@toad.com mailing list [online]. Jul. 3, 1999. Retrieved from the Internet: <URL: http://www.csua.berkeley.edu/cypherpunks>.
Miles, S., Short Take: PlanetAll, GeoCities to link. CNET News.com [online], Oct. 20, 1997 [retrieved on Aug. 19, 2003]. Retrieved from the Internet: <URL: http://news.com.com/2110-1023<SUB>-</SUB>3-204437.html>.
PlanetAll homepage [online]. PlanetAll, Inc., 1997. Retrieved form the Internet: <URL: http://web.archive.org/web/19971014102700/http:www.planetalL.com/>.
Plaxo Company Overview [online]. Plaxo, Inc. Retrieved from the Internet: <URL: http://www.plaxo.com> on or before Jun. 28, 2004.
Plaxo Product Overview [online]. Plaxo, Inc. Retrieved from the Internet <URL: http://web.archive.org/web/20021114192948/http://www.plaxo.com/products>, dated Nov. 14, 2002.
Archive of "Contact Networks-Mozilla Firefox," Aug. 15, 2000, www.contact.com, [online] [Archived by http://archive.org on Aug. 15, 2000] Retrieved from the Internet<URL:http://web.archive.org/web/20000815060557/http://www.contact.com/>.
Archive of "Download Software," Contact Networks, Inc., 1999, [online] [Archived by http://archive.org].
Archive of "GoodContacts: Products Overview,"www.goodcontacts.com, Nov. 22, 2002, [online] [Archived by http://archive.org on

(56) References Cited

OTHER PUBLICATIONS

Dec. 9, 2002] Retrieved from the Internet<URL:http://web.archive.org/web/20021209035011/www.goodcontacts.com . . . >.
Camino, B.M. et al., "Replying to Email with Structured Responses," Int. J. Human-Computer Studies, 1998, pp. 763-776, vol. 48.
"Contact Networks: The First Personal Relationship Management Solution," 22 pages.
"Contact Networks: Keep in Touch Like Never Before," 14 pages.
"Contact Networks: Keep in Touch Like Never Before," presentation for Motorola, 20 pages.
"Contact Networks, Inc.: Executive Summary," 7 pages.
Copeland, K.W. et al., "Electronic Data Interchange: Concepts and Effects," The 7<SUP>th </SUP>Annual Conference of the Internet Society, 1997, 11 pages.
"Federal Implementation Guideline for Electronic Data Interchange: ASC X12 003070 Transaction Set 838 Trading Partner Profile," NIST Special Publication 881-48, U.S. Department of Commerce, National Institute of Standards and Technology, 52 pages, Sep. 11, 1997.
"Federal Implementation Guideline for Electronic Data Interchange: ASC X12 003070 Transaction Set 838C Trading Partner Profile (Confirmation)," NIST Special Publication 881-49, U.S. Department of Commerce, National Institute of Standards and Technology, 18 pages, Sep. 11, 1997.
Glitman, R., "Contact Managers Made Easy," PC Magazine, Mar. 19, 2003, [online] Retrieved from the Internet<URL: http://www.pcmag.com/print<SUB>-</SUB>article2/0, 1217, a=38902,00.asp>.
Glitman, R., "Plaxo Contacts," PC Magazine, Mar. 19, 2003, [online] Retrieved from the Internet<URL:http://www.pcmag.com/article2/0,1759,940255,00.asp.
"Intuwave and Contact Networks Team Up to Bring Next-Generation Contact," News Release, Jul. 27, 2000, [online] Retrieved from the Internet<URL:http://www.pmewswire.co.uk//cgi/news/release?id=58956>.
Khare, R. et al., "XML: A Door to Automated Web Applications," IEEE Internet Computing, Jul.-Aug. 1997, pp. 78-87.
Milewski, A.E. et al., "An Experimental System for Transactional Messaging," ACM Group 9, 1997, 6 pages.
Nardi, B.A. et al., "Collaborative, Programmable Intelligent Agents," Communications of the ACM, Mar. 1998, pp. 96-104, vol. 41, No. 3.
Pryma, K., "GoodContacts Keeps Enterprises in Touch," Mar. 7, 2003, Network World Canada, [online] Retrieved from the Internet<URL:http//www.itworldcanada.com/Mobile/ViewArticle.aspx?title=&id=idgmi-1af8ec5e-597 . . . >.
Toth, M. et al., "PlanetAll,"Harvard Business School, Mar. 6, 1998, pp. 1-29.
Alwang, B., "Make Contact on the Web," PC Magazine, May 23, 2000, vol. 54.
Business Wire, Inc., "Industry Bigshots and Upstarts Rally Around AvangGo 2.0; Microsoft, IBM, Oracle, Symbol Technologies and Palm Computing Support AvantGo," Press Release Sep. 21, 1998.
Sinton, Peter, "Cyberspace Yellow Pages," The San Francisco Chronicle, Feb. 23, 1996.
Jacso, Peter, "Databases: Peter's picks & pans," UMI, Inc., vol. 19, No. 5, p. 93-96, Oct./Nov. 1996.
Moskowitz, Lisa, "Interactive Quarterly: Thinking (and Acting) Big," A/S/M Communications, Inc., May 26, 1997.
Business Wire, "BrainStorm Interactive Initiates Registration for Online Community of 28 Jesuit Colleges and Universities," Press Release Oct. 6, 1997.
"BranchOut Tour-BranchOut in the Press," retrieved on Oct. 23, 2008 from http://web.archive.org/web/19980131175744/www.branchout.com/TourPress.htm, copyright 1997.
"BranchOut," retrieved on Oct. 28, 2008 from http://web.archive.org/web/19970416044317/www.branchout.com/.
General Information, Frequently Asked Questions, retrieved Oct. 23, 2008 from http://web.archive.org/web/20000621160607/www.contact.com/help/gen-info.html, copyright 1999.
Contact Networks, "Welcome!," retrieved Oct. 28, 2008 from http://web.archive.org/web/20000620064129/www.contact.com/tour-start.html, 1999.
Contact Networks, "Download Software," retrieved Oct. 28, 2008 from http://web.archive.org/ web/20000621194359/www.contact.com/software-download.html, 1999.
"create relationships," digitalme, retrieved on Nov. 25, 2008 from http://web.archive.org/web/20000816003630/www.digitalme.com/Learn-More/Create-Relationships/, Novell, Inc. copyright 1999.
"Digitalme & meBusiness," digitalme, retrieved on Nov. 25, 2008 from http://web.archive.org/web/20000815070141/www.digitalme.com/digitalme-Story/, Novell, Inc. copyright 1999.
"FAQ," digitalme, retrieved on Nov. 25, 2008 from http://web.archive.org/web/20000815070151/www.digitalme.com/Learn-More/FAQs/, Novell, Inc. copyright 1999.
"Making life easier," digitalme, retrieved on Nov. 25, 2008 from http://web.archive.org/web/20000815055413/www.digitalme.com/, Novell, Inc. copyright 1999.
"Learn more," digitalme, retrieved on Nov. 25, 2008 from http://web.archive.org/web/20000815070123/www.digitalme.com/Learn-More/, Novell, Inc. copyright 1999.
"Make it convenient," digitalme, retrieved on Nov. 25, 2008 from http://web.archive.org/web/20000815083520/www.digitalme.com/Learn-More/Make-it-Convenient/, Novell, Inc. copyright 1999.
"Take control," digitalme, retrieved on Nov. 25, 2008 from http://web.archive.org/web/20000816003625/www.digitalme.com/Learn-More/Take-Control/, Novell, Inc. copyright 1999.
"MeBusiness: Convenience, Choice and Control through digitalme," retrieved Nov. 15, 2008 from http://support.novell.com/techcenter/articles/dnd20000104.html, Novell, Inc. copyright 2008.
Markoff, John, "Market Place; Novell to Offer Data-Privacy Technology for Internet," retrieved Nov. 11, 2008 from http://query.nytimes.com/gst/fullpage.html?res=940CE4DD1031F931A15-750C0A96F95, originally published Mar. 22, 1999.
"ECode Concept," retrieved Apr. 14, 2009 from http://web.archive.org/web/19990508194037/ecode.com/html/about-us.asp, eCode.com copyright 1998.
Springer, Richard, "Address Book Updating Offered Free by eCode" vol. 23, No. 41, p. 41, copyright 1998 Softline Information, Inc., Aug. 14, 1998.
"eCode.com," retrieved Oct. 22, 2008 from http://web.archive.org/web/19991005083618/ecode.com/html/confidentiality.asp, eCode.com copyright 1999.
eCode.com, Frequently Asked Questions, retrieved Oct. 22, 2008 from http://web.archive.org/web/20000607045723/ecode.com/html/faq.asp, eCode.com copyright 1999.
ECode's Help Center, Member Directory, retrieved Oct. 22, 2008 from http://web.archive.org/web/20000307022548/ecode.com/help/hlp-mDirectory.asp, eCode.com copyright 1998.
"Revolutionary Web-Site by eCode.com Tops 1,000,000 Hits in 1st Month of Business," retrieved Oct. 22, 2008 from http://web.archive.org/web/20000118060425/ecode.com/html/millionhits.asp, eCode.com copyright 1999.
eCode.com, Terms of Service, retrieved Oct. 22, 2008 from http://web.archive.org/web/19991111120211/ecode.com/html/termsofservice.asp, eCode.com copyright 1999.
Dow Jones Factiva, "Throw that addres book away," retrieved Oct. 22, 2008 from http://global.factive.com.libproxy.mit.edu, original publication Sep. 24, 1998.
Business Wire, Inc., "Web Innovator Launches Unique New Service at eCode.com: Delivering Global Id, Web-based Business Cards and a Truly Self-Populating and Self-Updating Address Book," Press Release Aug. 4, 1998.
eCode.com, eCode Concept, retrieved Oct. 28, 2008 from http://web.archive.org/web/19990508194037/ecode.com/html/about-us.asp, eCode.com copyright 1999.
ECode iBar(TM), Instant Help, retrieved Oct. 22, 2008 from http://web.archive.org/web/20000817120737/www.ecode.com/help/Instanthelp/ibarhelp.asp, eCode.com copyright 1998.
Business Wire, Inc., "Veteran computer industry pioneers announce internet advertising network and Internet address finder; new com-

(56) References Cited

OTHER PUBLICATIONS pany and service focus on delivering solution for advertising on the Internet," Press Release Nov. 28, 1995.
Levine, John R. et al., "The Internet for Dummies™, 2nd Edition," p. 98, 142, 161-162, IDG Books Worldwide, Inc., 1994.
Phillips Business Information, Inc., "Searching for People May Generate Profits," vol. 2, No. 2, Jan. 8, 1996.
Business Communications Co., "LinkStar Offers Integrated Service," vol. 2, No. 10, Jan. 1996.
Canada NewsWire Ltd., "Incontext and LinkStar to Deliver Enhanced Web Publishing Solution," Sep. 16, 1996.
PR Newswire Association, Inc., "HotOffice Embraced by Industry Leaders as Breakthrough Online Communications Solution for Small Business; 20 Million Microsoft Office Users to Benefit from New Technology," Press Release Oct. 22, 1996.
CMP Media Inc., "Start-Up LinkStar to Use Comdex for Small Business," Nov. 4, 1996.
LinkStar, "Business Directory Help" and "LinkStar Frequently Asked Questions," retrieved Oct. 28, 2008 from http://web.archive.org/web/19980211042107/www.linkstar.com/linkstar/bin/help, HotOffice Technologies, Inc., copyright 1995-97.
LinkStar, "About Our Search Engine" and "About HotOffice Technologies," retrieved Oct. 28, 2008 from http://web.archive.org/web/19980529194037/www.linkstar.com/linkstar/bin/vanilla?FILE=about . . . , HotOffice Technologies, Inc., copyright 1995-97.
Marshak, David, "Mission-Critical Lotus Notes," Prentice Hall, Aug. 1996.
Brown, Kenyon et al., "Mastering™ Lotus Notes 4.5 and Domino Second Edition," Sybex Inc., copyright 1997.
"OCLC First Search: Detailed Record, Mastering Lotus Notes 4.5" retrieved Apr. 9, 2009 from http://firstsearch.oclc.org, book published 1997.
"OnePIN, Inc.: Private Company Information," Business Week, retrieved Apr. 16, 2009 from http://investing.businessweek.com/research/stocks/private/snapshot.asp?privcapId=27422961, founded 1998.
"Getting Results with Microsoft® Outlook(TM) 98," Microsoft Corporation, 1998.
"Download details: Outlook 97/98 vCards Reader," retrieved Apr. 16, 2009 from http://www.microsoft.com/downloads/details.aspx?FamilyID=6B31F984-7F0B-42EC-9AC1-17433D9940FB&displaylang=EN, Microsoft Corporation, copyright 2009.
Rain, Diana, "Visual Reference Basics Microsoft® Outlook™," DDC Publishing, copyright 1997.
"What is the concept of PlanetAll?," retrieved Apr. 15, 2009 from http://web.archive.org/web/19970605093252/www.plantetall.com/why.dbm.
"PlanetAll Frequently Asked Questions," retrieved Apr. 15, 2009 from http://web.archive.org/web/19970605093325/www.plantetall.com/FAQ.dbm.
PlanetAll, "You will change jobs ten times," retrieved Apr. 15, 2009 from http://web.archive.org/web/19970605093042/http://www.plantetall.com.
"Members Speak," PlanetAll, retrieved Apr. 15, 2009 from http://web.archive.org/web/19970605093333/www.planetall.com/press/press.dbm?type=1.
"Sample Daily PlanetAll," retrieved Apr. 15, 2009 from http://web.archive.org/web/19970605093139/www.planetall.com/sample-email.dbm.
"What is PlanetAll?," retrieved Apr. 15, 2009 from http://web.archive.org/web/19970605093158/www.planetall.com/WhatIsPlanetAll.dbm.
PlanetAll; Making the world a smaller place, "About Our Company," retrieved Apr. 15, 2009 from http://web.archive.org/web/19971114081317/www.planetall.com/newmain/new-main.dbm.
PlanetAll; Making the world a smaller place, "Sample PlanetAll Address Book," retrieved Apr. 15, 2009 from http://web.archive.org/web/19971114081125/www.planetall.com/newmain/new-main.dbm.
PlanetAll; Making the world a smaller place, "Sample PlanetAll Address Book," retrieved Apr. 16, 2009 from http://web.archive.org/web/19971114081350/www.planetall.com/newmain/New-main.dbm.
PlanetAll; Making the world a smaller place, "Top Ten groups in PlanetAll by number of members," retrieved Apr. 16, 2009 from http://web.archive.org/web/19971114082144/www.planetall.com/newmain/new-main.dbm.
PlanetAll; Making the world a smaller place, "Groups on PlanetAll," retrieved Apr. 15, 2009 from http://web.archive.org/web/19971114081140/www.planetall.com/newmain/new-main.dbm.
PlanetAll; Making the world a smaller place, "Your PlanetAll Calendar," retrieved Apr. 15, 2009 from http://web.archive.org/web/19971114081232/www.planetall.com/newmain/new-main.dbm.
PlanetAll; Making the world a smaller place, "Crossing Paths," retrieved Apr. 15, 2009 from http://web.archive.org/web/19971114081154/www.planetall.com/newmain/new-main.dbm.
PlanetAll; Making the world a smaller place, "Sample PlanetAll Update," retrieved Apr. 16, 2009 from http://web.archive.org/web/19971114081117/www.planetall.com/newmain/new-main.dbm.
"PlanetAll-Stay in Touch!," retrieved Apr. 15, 2009 from http://web.archive.org/web/19971114082415/www.planetall.com, copyright 1997.
PlanetAll; Making the world a smaller place, "Sample PlanetAll Address Book," retrieved Apr. 16, 2009 from http://web.archive.org/web/19971114082442/www.planetall.com/newmain/New-main.dbm.
PlanetAll; Making the world a smaller place, "PlanetAll Members Speak," retrieved Apr. 15, 2009 from http://web.archive.org/web/19971114081306/www.planetall.com/newmain/new-main.dbm.

* cited by examiner

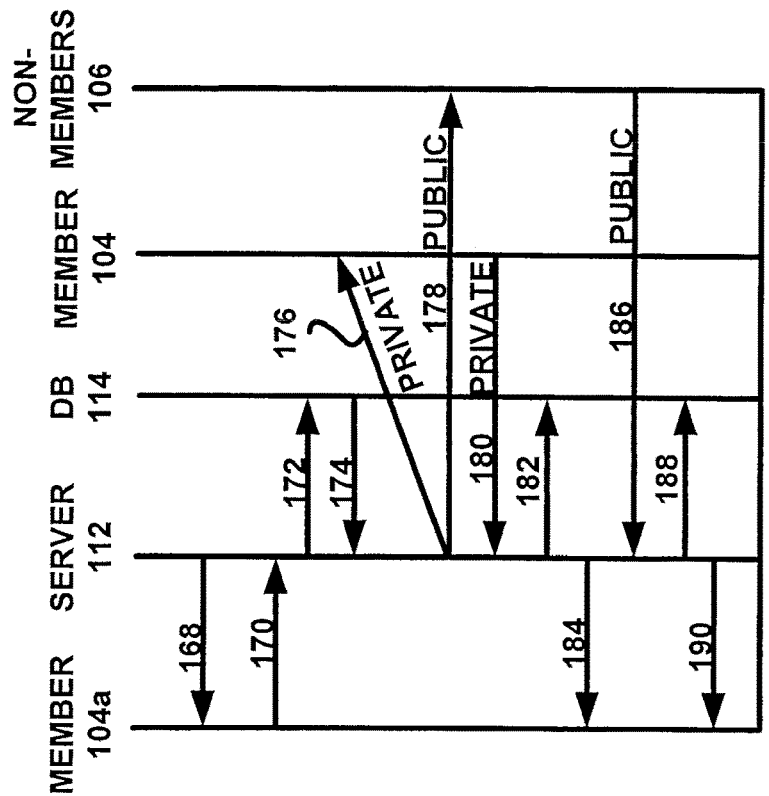
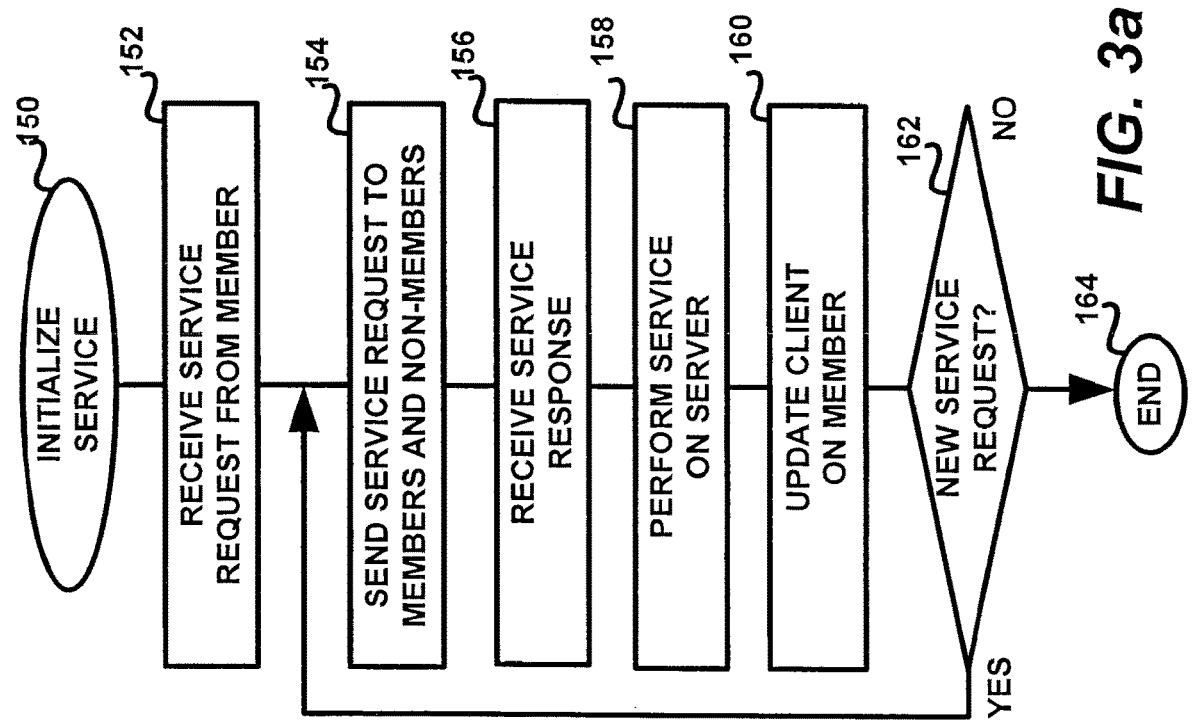
FIG. 3b
FIG. 3a

| Combo Conversion Rates by Template | 1-2 Day Conv. Rate | | 7-14 Day Conv. Rate | | 7-35 Day Conv. Rate | | Total Conv. Rate | |
|---|---|---|---|---|---|---|---|---|
| su_default_nlp.hdf1 | 0.78% | 37928 | 1.93% | 173387 | 1.88% | 619840 | 2.93% | 2192938 |
| su_htmlsimple_web.hdf1 | 0.88% | 136475 | 1.55% | 662155 | 1.25% | 2073468 | 1.98% | 8064819 |
| su_htmlsimple3_web.hdf1 | 0.19% | 12377 | 1.02% | 11650 | 0.92% | 44951 | 2.02% | 379673 |
| su_htmlsimple4_web.hdf1 | 0.87% | 115560 | 1.61% | 576875 | 1.44% | 1683112 | 1.81% | 3284360 |
| su_htmlsimple5_web.hdf1 | 0.67% | 13937 | 1.12% | 75152 | 1.06% | 212550 | 1.25% | 319162 |
| su_htmlsimple_footer_noadd_nobanner_web.hdf1 | 0.47% | 6528 | 1.33% | 18449 | 1.33% | 18449 | 1.15% | 48518 |
| su_htmlsimple_footer_noadd_web.hdf1 | 0.78% | 4382 | 1.39% | 16169 | 1.39% | 16169 | 1.18% | 44832 |
| su_htmlsimple_footer_web.hdf1 | 0.34% | 6116 | 1.23% | 16116 | 1.23% | 16116 | 1.06% | 49633 |
| su_default_aol.hdf1 | 0.37% | 2414 | 1.03% | 12186 | 0.84% | 37778 | 1.07% | 102845 |
| su_htmlsimple_aol.hdf1 | 0.23% | 7033 | 0.40% | 41119 | 0.36% | 117479 | 0.53% | 385866 |
| su_htmlsimple3_aol.hdf1 | 0.36% | 276 | 0.30% | 328 | 0.29% | 2049 | 0.61% | 11875 |
| su_htmlsimple4_aol.hdf1 | 0.16% | 6796 | 0.49% | 36678 | 0.43% | 104433 | 0.52% | 194136 |
| su_htmlsimple5_aol.hdf1 | 0.23% | 882 | 0.46% | 4106 | 0.45% | 11938 | 0.45% | 19362 |
| su_htmlsimple_footer_aol.hdf1 | 0.41% | 246 | 0.16% | 1248 | 0.16% | 1248 | 0.36% | 3312 |
| su_htmlsimple_footer_noadd_aol.hdf1 | 0.82% | 243 | 0.23% | 878 | 0.23% | 878 | 0.33% | 3074 |
| su_htmlsimple_footer_noadd_nobanner_aol.hdf1 | 0.60% | 334 | 0.69% | 1018 | 0.69% | 1018 | 0.48% | 3120 |

*FIG. 5a*

| Click Through Rates (CTRs) | ECID | Downloads | Plaxo Launch | Views |
|---|---|---|---|---|
| EC1 | 74% | 1% | 8% | 3396 |
| EC12 | 76% | 1% | 8% | 3489 |
| EC13 | 81% | 1% | 11% | 28126 |
| Confirm | | 0% | 5% | 5873 |
| ECID | | 11% | 5% | 1824 |
| ECID 2 | | 12% | 6% | 3478 |
| ECID 3 | | | 14% | 8772 |
| ECID 4 | | | 15% | 3457 |
| ECID 5a | | | 12% | 3458 |
| ECID 5b | | | 11% | 3527 |
| ECID green | | | 11% | 3460 |
| ECID 7 | | | 10% | 3506 |
| ECID 7faq | | | 10% | 3521 |
| Downloads 1 | | | | |
| Downloads 2 | | | | |
| Downloads 2faq | | | | |
| Signature 1 | | | 32% | 155 |
| Signature beyourself | | | 34% | 167 |
| Signature create1 | | | 49% | 149 |
| Signature create2 | | | 33% | 170 |
| add_me | | | 5% | 736 |

VIRAL ENGINE FOR NETWORK DEPLOYMENT

CROSS REFERENCE TO RELATED APPLICATIONS

This application is a continuation of U.S. patent application Ser. No. 16/432,066, filed Jun. 5, 2019, entitled "Viral Engine for Network Deployment", which is a continuation of U.S. patent application Ser. No. 15/337,581, filed Oct. 28, 2016, entitled "Viral Engine for Network Deployment", now U.S. Pat. No. 10,356,205, issued on Jul. 16, 2019, which is a continuation of U.S. patent application Ser. No. 13/438,581, filed Apr. 3, 2012, entitled "Viral Engine for Network Deployment", now U.S. Pat. No. 9,516,134, issued on Dec. 6, 2016, which is a continuation of U.S. patent application Ser. No. 12/104,217, filed Apr. 16, 2008, entitled "Viral Engine for Network Deployment", now U.S. Pat. No. 8,176,131, issued on May 8, 2012, which is a continuation of U.S. patent application Ser. No. 10/703,337, filed Nov. 7, 2003, entitled "Viral Engine for Network Deployment", now U.S. Pat. No. 7,389,324, issued on Jun. 17, 2008, which is hereby incorporated by reference herein in its entirety for all purposes including any appendices or attachments.

This application is related to U.S. patent application Ser. No. 10/703,949, filed on Nov. 7, 2003, issued as U.S. Pat. No. 7,080,104, entitled "Synchronization and Merge Engines," which is hereby incorporated by reference herein in its entirety for all purposes including any appendices or attachments.

BACKGROUND OF THE INVENTION

1. Field of the Invention

The present invention relates generally to network deployment, and more particularly, to the deployment of a hybrid peer-to-peer/client-server private network using an asymmetric viral approach.

2. Description of the Related Art

Maintenance of up-to-date contact information between friends, family, business associates, clients, and customers has always been a challenge and a difficult task. More frequently than not, people change at least some of their contact information such as phone numbers, fax numbers, mobile phone numbers, electronic mail addresses, physical addresses, and the like. For example, presently approximately 35% of Internet users change electronic mail addresses annually, approximately 33% of mobile phone numbers are changed annually, and approximately 40 million physical addresses change every year.

Out-of-date contact information leads to personal losses such as friendships or business losses such as missed opportunities leading to increased productivity and revenue. For example, inaccurate and low-quality customer data results in bad mailings and staff overhead costing upwards of $600 billion a year to U.S. businesses. Hence, a centralized universal address book with up-to-date contact information of customers, business associates, friends, and the like, is a very desirable service.

Due to the high desirability of such a service, conventional online service providers on the Internet, such as PlanetAll.com (now owned by Amazon.com), developed conventional online services for storage and maintenance of personal information on a server, accessible via the Internet. In general, these services allowed a user to subscribe to the service and store personal information at a remote server so that the user's personal information was automatically included in the online address books of other subscribing users of the relevant service.

In these conventional online services, the subscribing owner of the personal information was responsible for maintenance of their information. Whenever the subscribing owner made changes to the information, the online service server was updated. Thereafter, other subscribing users of the system would have access to the updated information by logging into the system and synchronizing with that changed information to update their online address books. Further, these conventional online services provided the ability to synchronize personal information maintained within a personal information manager ("PIM," e.g., Microsoft Outlook) with the personal information stored on the remote server through a downloadable conventional synchronization software product, such as, for example, Intellisync® for PlanetAll.com, developed by Puma Technology, Inc., of San Jose, Calif.

One problem with these conventional online services is that they must be symmetric. Symmetric services require a subscription membership to the service on both sides of the information exchange facilitated by the service. That is, only subscribers of the conventional online services could update PIM information with each other if each owner of the PIM subscribed to the service. Thus, the service only works for its intended purpose of keeping information updated if both the user providing the updated information and the user seeking an information update subscribed to the service. Non-subscribers were unable to synchronize their PIM information with subscribers and vice versa. Hence, subscribers to the service would be unable to maintain synchronized data with nonsubscribers. This symmetry requirement limited user flexibility in maintaining consistency of data across the various types of contacts.

Another problem with such conventional online services was limited subscriber flexibility in configuring the information in a manner most suitable for that subscriber. For example, the subscribing user lacked flexibility allowing a subscriber to select particular data fields or sets of data fields to update other subscribing users in of the service on a per subscriber basis. Thus, subscribers were limited to an "all or none" proposition for updating information between subscribers.

These conventional services (including PlanetAll.com) have been used to promote the deployment over the Internet of private networks of subscribers based on the premise that a subscription to the private network provides a valuable service, i.e., a centralized address book. However, such attempts to deploy private networks have failed due principally to slow deployment rates. In part, these private networks failed to grow their membership because the symmetric nature of the private network service limited the value for the initial set of users. The real value of the private network service could not be realized until large numbers of PIM users subscribed to the private network service. Hence, as long as the number of subscribers of the private network service remained small, new users were not enticed to subscribe. Consequently, without new subscribing users, the private network service could not grow to a size necessary to support its value proposition, and in turn, the private network service would ultimately collapse and fail.

Therefore, there is a need for a system and process to deploy a private network within a public network of users (1) without requiring membership to the private network as a prerequisite for providing a substantial service to members, (2) that increases the value of its service by rapidly acquiring new members, (3) that provides a universal address book of members and non-members, and (4) that includes features to promote rapid membership growth.

SUMMARY OF THE INVENTION

The present invention overcomes the problems of conventional private network deployment methods by providing a system to virally deploy a private network over a pre-existing communication channel, or public network, with an asymmetric service. An asymmetric service in accordance with the present invention provides members of a private network communication channel between other members as well as non-members while operating over a public network. Hence, unlike conventional private network services, the present invention does not require membership in the private network to provide a valuable service to members of the private network, including its initial set of members. This feature beneficially overcomes the conventional network deployment problem of initial membership because the service provided to the private network members also functions over non-members, and therefore, produces useful results beginning with the first member.

The present invention also includes a system and a method for promoting network growth. Network growth is desirable for members of private networks of the present invention because, although the asymmetric service operates over members and non-members, enhanced features of the service may be made available among members of the private network. For example, enhanced features available to members include online transactions between members with verified identity, payment services, authentication (and other security features), collaborative information sharing, PIM synchronization, calendar functions, and the like. Hence, although not necessary from a member's standpoint, private network growth increases the service value to its members. Accordingly, one embodiment of the present invention includes a viral engine (or system) that incorporates features into the service to promote rapid private network growth, thereby increasing the benefits and value to members. However, unlike malicious computer viruses, the viral features of the present invention are permission based. Rather than recklessly invading user systems, the viral features of the present invention function to convince users to join or subscribe to the private network based on the benefits and services it provides to members.

In general, a private network system according to the present invention includes a central server, a viral engine and database connected to the public network. The viral engine is used for a private network and asymmetric service. The public network includes interconnected network users. A subset of those users may be members of the private network. The other users of the public network are generally non-members. For example, in one embodiment of the present invention, users of a public network (e.g., the Internet) can join a private network that provides an automatic contact information update service for members' contact lists. In this example, the private network and asymmetric service operate over the public network (e.g., the Internet) and is capable of receiving contact information updates from users of the public network, whether they are members of the private network or not. Thereby, beginning with the first member of the private network, the service provides a beneficial result by updating the first member's contact list with current information provided by users of the public network. Therefore, valued participation is from both members and non-members of the private network.

The viral engine of the present invention includes features that induce growth of the private network in a rapid spreading manner (e.g., like a virus). These features include an embodiment of a viral equation for rapid network growth, Growth=Number of Users (N)*Conversion Rate (CR). The viral growth features are designed to induce rapid network growth by maximizing the number of users of the public network that are exposed to the private network (N) and maximizing their conversion rate from non-members to members (CR). For example, in one embodiment the public network is a computer network of electronic mail ("e-mail") users. An asymmetric service to induce membership in a private network being deployed includes an automatic contact information update for members' address books. To increase the number of members, non-members are sent invitations to join the private network (N) through the public network. For example, a contact update unit transmits contact update requests to all the public network users in a member's address book and, for non-members, includes an invitation to join the network with the contact update requests. When a non-member accepts the invite and is converted into a member, the private network grows in size.

Another feature for increasing the number of users (N) in an e-mail context includes a data-mining unit. The data-mining unit applies heuristic and other algorithms to a member's e-mail folders to identify public network users who have had e-mail communications with the member but who are not in the member's address book. After identifying these public network users, the data-mining unit (or other appropriate mechanism) adds, or offers to add, the public network users to the member's address book. This beneficially increases the number of potential users who may be contacted for membership or otherwise exposed to the private network.

Features of the viral engine intended to maximize the conversion rate (CR) are also included in the present invention. For example, a viral growth feature includes a personalization function for composing update request messages. Input from a member is used to personalize the update requests sent to the public network users listed in the member's address book. For non-members, the personalized update requests may include invitations to join the private network. The invitations are more likely to be accepted when included in personalized messages created by the member as opposed to standardized mass mailing that are often considered synonymous to 'junk-mail" messages and typically ignored. Personalization of messages tends to increase the conversion rate (CR) that, in turn, grows the private network.

Other features that may increase the conversion rate (CR) are tracked and genetically evolved using genetic algorithms. Data is collected and analyzed regarding the likelihood that a non-member, public network user will convert to private network member based on certain features. For example, aesthetic appeal related features are combined and varied in several versions of service messages, web pages, and other user interface data objects presented to non-members, and the corresponding conversion rates due to each of the version is tracked and analyzed. Aesthetic appeal related features include, for example, colors, arrangement, tone, graphics, and the like. Genetic algorithms are used to create new versions of user interface objects by only evolving successful prior versions.

To further maximize the conversion rate (CR), another viral engine feature relates to exploiting relationships between members and non-members, users of the public network. This feature includes repeatedly performing analysis of the messages within a member's message records to identify relationships with public network users. Analysis to identify relationship to users may include heuristic and other algorithms based on frequency of sending, receiving, or replying to communications, length of communications, tone of written messages, specific words or strings in messages or descriptions that may signal a closer relation (e.g., "Dear mom," "Dad's cell no.," or the like), area codes, time of day of communications, or any other information in members records that can lead to relationship related information.

A premise of the relationship feature is that the closer the relationship between a member and a non-member receiving the member's service request bearing an invitation to join the private network, the more likely it is that the non-member may subscribe to the private network, i.e., the higher the likelihood of conversion. Therefore, this relationship based viral feature positively impacts the conversion rate (CR). For example, in one embodiment the analysis includes producing a list of non-member public network users that frequently correspond with the member. The list can be enhanced with a frequency bar graphically representing the frequency of e-mail communication with each of the public network users in the list. The member is given the option to send contact update requests bearing invitations to join the private network to any of the out-of-network users listed. Users who have more frequent contacts with a member are more likely to have a closer relationship with the member, and hence, are more likely to respond to the member's request and invitation to join the private network.

Another viral network growth feature is based on the repeated exposure of non-members to the private network. For example, one embodiment of the present invention includes automatically scheduling the transmission of reminder update requests to non-responsive non-members at predetermined time intervals. Another embodiment includes an e-mail based automatically updating signature block. The signature block includes an invitation to join the private network and is automatically added to all outbound e-mail messages of a member. The automatically updating signature block is an enhanced feature of the service available only to private network members. By sending the signature block to every user that receives an e-mail from the member and showing a benefit of private network membership, the signature block feature increases the number of users of the public network exposed to the private network (N). Further, the signature block feature shows by example a benefit of membership in the private network, which in turn is likely to induce some non-members to join the network. Hence, the signature block feature also has a positive impact the conversion rate (CR).

The principles of the present invention are also applicable to other information management services that can be provided as an asymmetric service, such as, for example, calendar synchronization services, meetings, reminders, notes, tasks, advertisements (e.g., wanted ads), auction services, news, hiring or employment related information management, collaborative project management services, federated payment processing, security and verification services, authentication, trust, or any other services requiring information sharing, synchronization, or updating. Similarly, the present invention also applies to other systems in which viral growth is desirable to enhance or deploy a network.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 3a is a flow chart of a process for growing a private network in accordance with one embodiment of the present invention.

FIG. 3b is an event diagram of one example of a method illustrating asymmetric operation according to one embodiment of the present invention.

FIG. 5a is a list of different electronic mail messages having different aesthetic appeal related features and their corresponding conversion rates according to one embodiment of the present invention.

FIG. 6 is a list of different Internet web pages having different aesthetic appeal related features and their corresponding empirical and statistical data measures according to one embodiment of the present invention.

FIG. 7a is a sample update response web page according to one embodiment of the present invention.

FIG. 11 is a sample graphical report including a frequency bars to one embodiment of the present invention.

FIG. 13a is a sample user interface for inputting business data into a business profile according to one embodiment of the present invention.

FIG. 13b is a sample user interface for inputting personal data into a personal profile according to one embodiment of the present invention.

DETAILED DESCRIPTION OF THE INVENTION

The Figures ("FIG.") and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Figure 1:
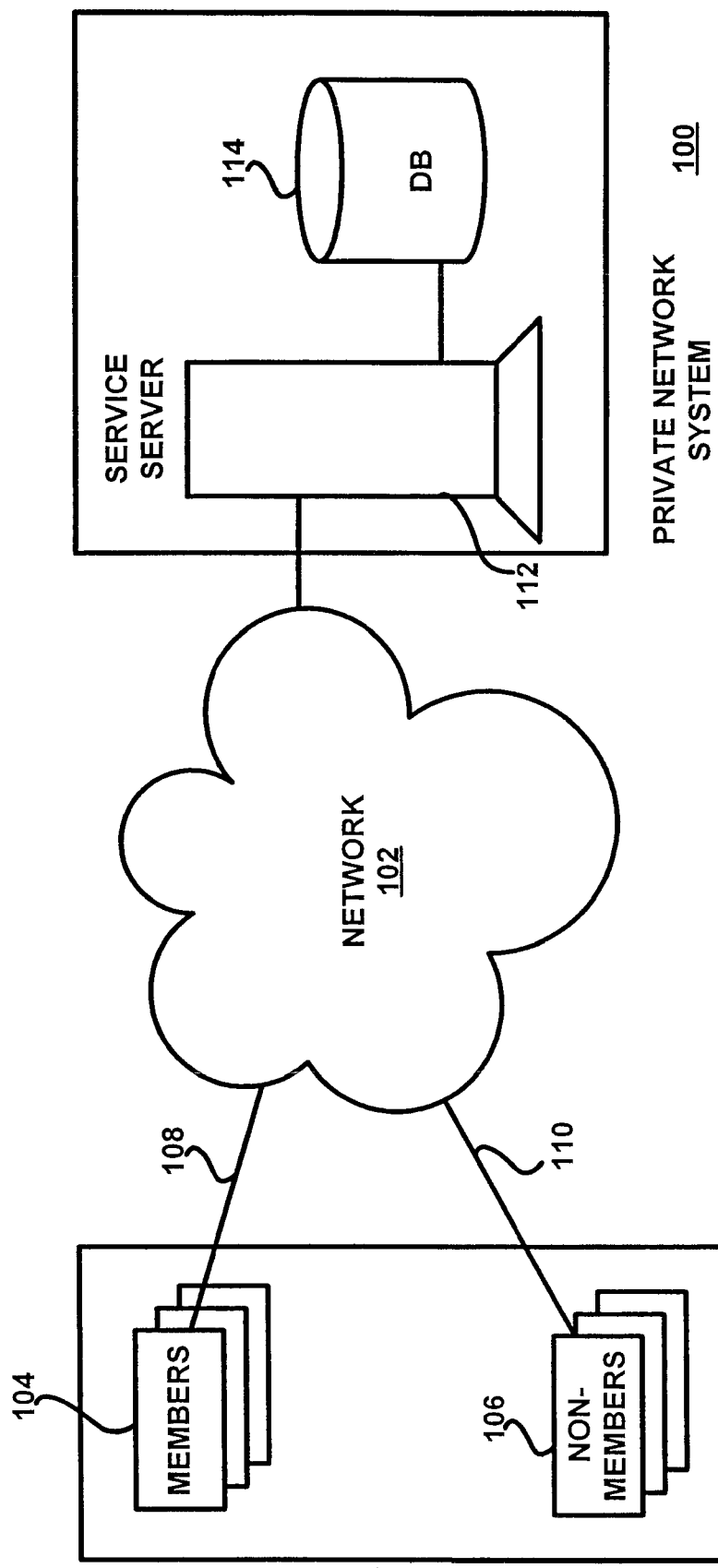
FIG. 1 illustrates an example of one embodiment of a network system in accordance with the present invention.

Referring now to FIG. 1, an embodiment of a network system in accordance with the present invention is shown. The network system includes a private network system 100 that is part of a network environment, which includes a public network 102 and a set of public network users 103.

In the context of the present invention, network is not limited to a physical network, i.e., devices linked by physical communication channels (wired or wireless). Rather, network also includes functional (or logical) networks such as networks based on the type of messaging between users, which may be physically carried by various communication channels. For example, a network may include a group of wireless phones users communicating based on unique telephone numbers or it may include a group of computer users communicating based on unique e-mail addresses. In addition, more than one functional network may be embodied in a single physical network. By way of example, a computer network may embody an electronic mail based functional network and an instant messaging based functional network (e.g., AIM, ICQ, or the like).

Accordingly, in one embodiment, the public network 102 includes a physical element and a functional element. The physical element of public network 102 refers to a communications network, for example, a computer network (e.g., local area network ("LAN"), wide area network ("WAN"), wireless data network ("WDN"), the Internet, or the like) or a wireless protocol based communications network (e.g., network based on personal communications system (PCS), global system mobile (GSM)), or the like.

The functional element of public network 102 refers to a communication mode between network users 103. Examples of the communication mode are instant messaging, electronic mail, telephone, wireless messaging, or the like. Each communication mode includes a unique identifier that may be used to address communications between users 103 in the public network 102. In the context of the present invention, the functional element of the public network 102, i.e., the element that relates to the communications mode, is referred to as public protocol or public communication mode. For example, network users 103 may communicate via a public electronic mail protocol (e.g., Post Office Protocol (POP), Internet Message Access Protocol (IMAP), Simple Mail Transfer Protocol (SMTP), Multipurpose Internet Mail Extension (MIME) protocol, or the like).

Referring again to FIG. 1, the network users 103 include one or more members 104 and one or more non-members 106 (or non-users) of the private network 100. The members 104 communicate with private network system 100 over the public network 102 using a private or proprietary protocol 108. The non-members 106 communicate with the members 104 in the private network system 100 over a common or public communication method or protocol 110 that is part of the public network 102.

In one embodiment of the present invention, members 104 may include groups of members. Groups contain a set of members 104 and information regarding non-members 106 that are related by a commonality, e.g., a common idea or theme. For example, a "Half Moon Bay Surfer Club" group (a member 104) may include persons or information regarding persons belonging to the Half Moon Bay Surfer Club. At least some of the persons are members 104 of the private network but not necessarily all since some of them may be non-members 106. A group is treated as another type of member 104 in the system of the private network 100. Other individual members 104 of the private network 100 could have shared access to the information (e.g., address book, calendar, or the like) pertinent to the group-member 104. For example, one embodiment enables individual members 104 to store their contact information in a group-member 104 account (i.e. group address book).

The access controls over the information in a shared group member 104 profile or account could be implemented by various policies, controllable by one or more designated group moderators who are also individual members 104. For example, in one embodiment, an access control policy could limit writeable access (e.g. create, edit, or delete) for general group members 104 to their own information in the shared profile, that is, general members 104 would not be able to edit other members' 104 information. An access control policy also includes special "moderator" permission for selected members 104 of the group. Moderator permissions would enable these selected members 104 to have a different set of access and control of the group information and policies. For example, in one embodiment, moderator members 104 are enabled to edit information regarding general members 104 of the group, to delete or remove one or more general members 104 from the group account, and other similar control features.

Note that group membership could be implemented in a variety of methods. In one embodiment, members 104 that are part of a group account (another member 104) can invite other members 104 to join the group using private protocol 108, and can invite non-members 106 using public protocol 110 (with a corresponding viral effect in private network 100 growth). Alternatively, non-members 106 can find information about the group member 104 in a public directory with a "join" button (e.g., a webpage or the like) and become private network members 104 while simultaneously joining the group account. Further, in another embodiment, group members 104 are generated dynamically based on member 104 information attributes. For example, members 104 can be made part of a group account based on an internet domain name, i.e., any member 104 with a @candy.com e-mail address is automatically added to the candy.com group, and non-members 106 with a @candy.com e-mail address are invited to join the candy.com group (and the private network 100 as part of the process). One benefit of group account is that information regarding persons with a common interest can be shared across the private network, for example, as a shared address book group or the like, and can be used both informally and formally within corporations and organizations.

Referring back to FIG. 1, the private network system 100 includes a central server 112 and a database system 114 that are communicatively coupled together. In one embodiment, the private network system 100 is based on a hybrid peer-to-peer and client-server network architecture. For the client-server aspect of the network, central server 112 provides the centralized functions of network management. Central server 112 may include one or more computing systems (or machines), i.e., may be a server farm, or the like. The central server 112 is connected to the network 102 and can implement the private and public protocols 108, 110 to communicate with the network users 103. Similarly, the database unit 114 may be a single data storage device or a set of interconnected storage devices, e.g. storage area network ("SAN"), distributed database, or the like.

Figure 2A:
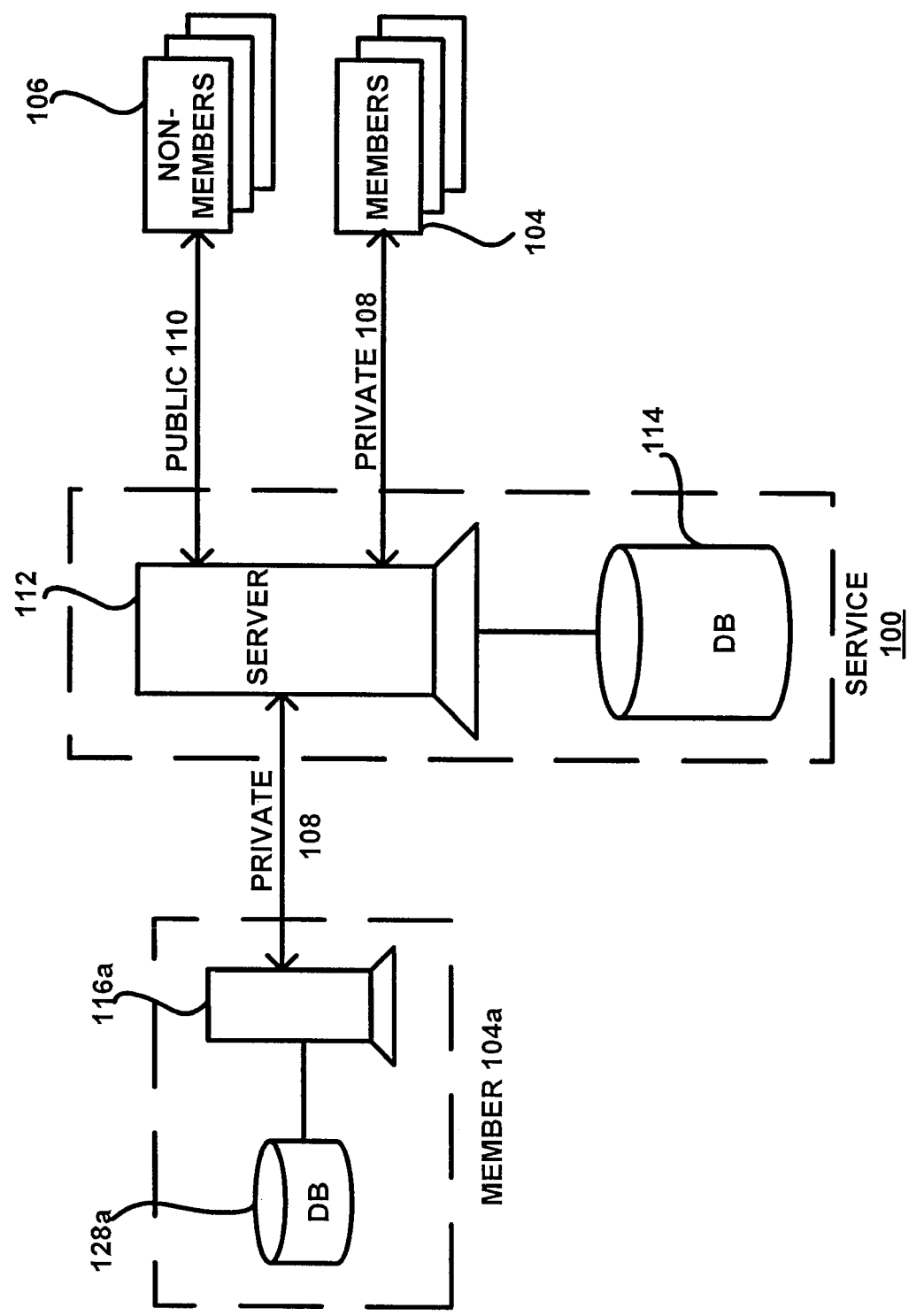
FIG. 2a illustrates an embodiment of a logical network environment in accordance with the present invention.

Referring now to FIG. 2a, it illustrates an embodiment of a logical network environment in accordance with the present invention. The logical network environment includes the private network 100, the one or more members 104, and the one or more non-members 106. Also illustrated is an example member system 104a as set forth below. The one or more members 104 (including 104a) and the one or more non-members are communicatively coupled through the private network 100.

The illustrated member system 104a includes a client system (or machine) 116a and a database 128a. The client system 116a is a conventional computing system (e.g., personal computer, personal digital assistant ("PDA"), mobile phone, computing tablet, and the like) that includes a conventional operating system (e.g., windowing, graphical, and/or text based operating system) and one or more application programs. The client system 116a communicates with a server system 112 of the private network 100 through the computer network 102. Each client system 116 (including 116a) may host a client application for managing private protocol 108 and service 100 functions. The database 128a stores data and other informational entities as further described herein.

Figure 2B:
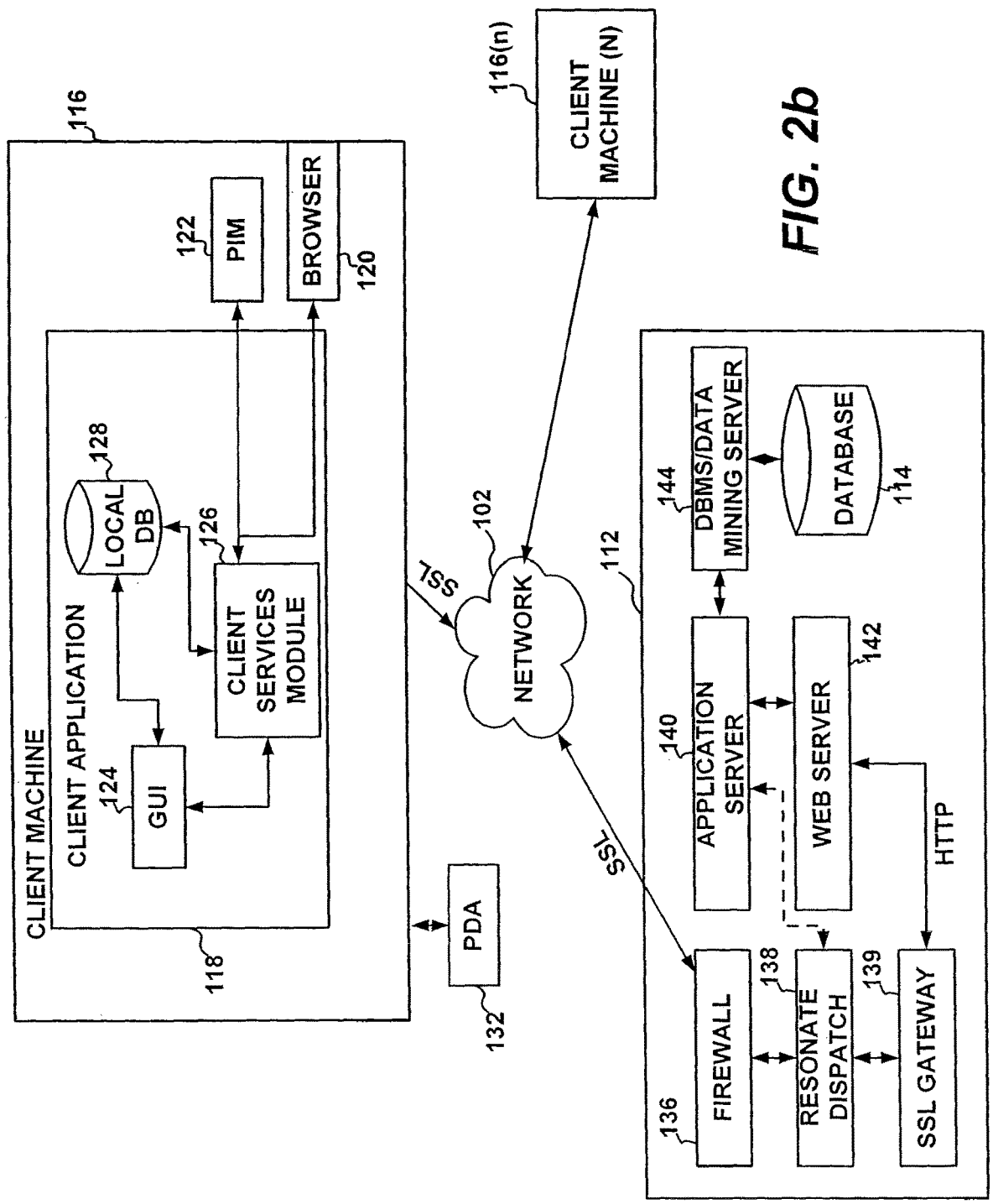
FIG. 2b illustrates an embodiment of a structural network environment in accordance with the present invention.

FIG. 2b illustrates an embodiment of a structural network environment in accordance with the present invention. The structural network environment includes one or more client systems 116, the public network 102, and one or more servers 112 in the private network 100. The client system 116 may communicatively couple with other client systems 116 or devices (e.g., PDA or mobile phone) through a direct or networked connection.

Each client system 116 includes a client application 118, an Internet (or web) browser 120, a personal information manager ("PIM") 122, and a client services module 126. The client application, the Internet browser 120, the PIM 122, and the client services module 126 are communicatively coupled through the operating system. The Internet browser 120 is a conventional browser for wired or wireless system. Examples include Internet Explorer by Microsoft Corporation of Redmond, Wash., Netscape Navigator by Netscape Communications, Corp. of Mountain View, Calif., NetFront Web browser, by Access Systems America, Inc. of Freemont, Calif., or Openwave® Mobile Browser, by Openwave Systems, Inc. of Redwood City, Calif.

The PIM 122 is a conventional PIM. Examples include Microsoft Outlook, by Microsoft Corporation and Lotus Notes, by Lotus Software of International Business Machines (IBM), Cambridge, Mass. It is noted that the Internet browser 120 may be integrated with the client application 118.

The client application 118 is an application a member 104 interacts with to access functionality of a system 100, for example, the system 100 of the present invention as disclosed herein. The member 104 interaction with the system 100 includes the managing the communications between the client system 116 and server 112 using private protocol 108. The client application 118 may include a text or Graphical User Interface ("GUI") 124 front end. The client application 118 facilitates viewing, accessing, publishing and synchronizing of information. It is noted that in alternative embodiments the client application 118 may be fully integrated with and embodied within the PIM 122, or may itself constitute a full-function PIM 122, and thus obviate the need for any further independent or stand-alone PIM 122.

In one embodiment, the client application 118 provides PIM functionality by facilitating/managing storage, publication and synchronization of personal information of members 104. It should be noted that in the context of this description, personal information of a member 104 includes information regarding the member 104 him/herself and information that the member 104 has regarding other users 103 (both members 104 and non-members 106). Note that the ability for non-member 106 to interact with the private network 100 beneficially adds value for the members 104 with regard to gathering and storing information from the non-members 106.

The client services module 126 provides data services to both the client application 118 and a local database 128. The client services module 126 is furthermore responsible for executing accesses to the local database 128 within which personal information of member 104 using client system 116 may be maintained. Specifically, the client services module 126 is responsible for the integrity and locking of the local database 128 at appropriate times. Components that are included within or communicatively couple with the client services module 126 may also be configured to synchronize information maintained in the local database 128 with information maintained on a remote database 114 as described in co-pending U.S. patent application Ser. No. 10/703,949, filed on Nov. 7, 2003, issued as U.S. Pat. No. 7,080,104, entitled "Synchronization and Merge Engines," said application having a common a assignee with the present invention and the contents of which are herein incorporated by reference.

For members 104, the client services module 126 communicates via the private protocol 108, which may include a Secure Socket Layer ("SSL") stack, over the public network 102. In one embodiment, private protocol 108 is a conventional proprietary binary protocol defining message objects that are communicated between the client application 118 at the client system 116 and the server 112. Other customizable communication protocols can be use to implement the private protocol 108, for example, Extensible Markup Language ("XML") based protocols or Remote Procedure Call ("RPC") based protocols may be used. The message objects may further include other types of objects for the transfer of data. For example, private protocol 108 may define update messages to check for data updates based on timestamps and define basic responses such as, for example, "OUT OF DATE," "RECORD INSERTED," "O.K.," or the like.

Optionally, the client services module 126 also has the capability to synchronize with third party components hosted on, or coupled to, the client system 116. For example, the client services module 126 may, via the synchronization engine, synchronize with the PIM 122 or with a PDA 132, or any other PIM capable device.

Referring next to the one or more servers of the private network 100 in FIG. 2b, illustrated is an example server system 112. The server system 112 includes a firewall 136, a resonate dispatch 138, an SSL gateway 139, an application server 140, a web server 142, a database management system ("DBMS")/data mining server 144, and the database 114. These components are communicatively coupled together within the server system 112.

In one embodiment the resonate dispatch 138 is optional and performs load balancing operations between multiple servers on which the application server 140 and the web server 142 are hosted. In one embodiment, both the application server 140 and the web server 142 may be hosted on physically or logically single servers.

The application server 140 may also be developed utilizing web technology such as, Java, J2EE, .NET, Visual Basic, or the like, and serves both the client services module 126 and the web server 142. The application server 140 includes logic that allows a member 104 accessing the application server 140 to access only information for which the member 104 has been granted permission. The application server 140 is also responsible for sending personal information updates to the client services module 126 to synchronize the local database 128 with a specific subset of information maintained within the server database 114 for the specific member 104.

Another function of the application server 140 includes the handling and disposition of service requests from members 104 and the corresponding responses from users 103. These functions include the determination of membership in the private network, public and private protocol communications, and database 114 management. The application server 140 queries the database 114 to determine which users 103 designated in a member's service request are also members 104 of the private network 100. Application server 140 uses the private protocol 108 to send service request messages to members 104. In contrast, users 103 determined to be non-members 106 receive information requests from application server 140 via the public protocol 110. For this purpose, application server 140 may include a public protocol communications module to implement non-member communications.

The web server 142 communicates with the resonant dispatch 138 via an optional SSL gateway 139 that encapsulates and decapsulates a protocol such as Hypertext Transport Protocol ("HTTP") issued from and to be received at the web server 142. For example, private protocol 108 messages can be wrapped in secured HTTP ("HTTPS"), that is, HTTP code encapsulated with SSL encryption. The web server 142 may also be developed utilizing web technology (e.g., Java, J2EE, .NET, Visual Basic, or the like). According to one embodiment of the present invention, the application and web servers 142 and 140 provide full access to permitted data within the database 114 to a member 104 through its client system 116. The web server 142 may further function as a conduit for private protocol 108 messages tunneled through HTTP or HTTPS communications between client applications 118 and the application server 140.

The application server 140 allows access to permitted data within the database 114 from any platform. Further, a part of the asymmetric aspects of the present invention, the application server 140 also allows a non-member 106 to interface with private network 100. Hence, members 104 receive the benefit of communicating with users 103 (other members 104 and non-members 106) in the context of the system of the present invention.

The DBMS (or data-mining module) 144 is included in the system 100. The DBMS 144 executes complex queries to the database 114 either when prompted or on a scheduled basis. The algorithms that implement viral engine functions of the present invention may provide these queries. The DBMS 144 may also execute other algorithms, including natural language processing or heuristic algorithms, to extract member requested information from non-member 106 public protocol 110 based communications. For example, the DBMS 144 may process incoming e-mails responsive to member 104 contact update requests to extract non-member 106 contact information. The DBMS 144 may be hosted on a server system, while the server database 114 may be implemented using a RAID storage device, or other similar system.

The server database 114 maintains synchronized copies of the local (client) databases 128 that may be implemented on numerous client systems 116 communicatively coupled to the server system 112. The server database 114 also records various permissions with respect to personal information by which personal information for a specific user may be accessible by, and accordingly published to, multiple other users 103 as described herein. It should be noted, that in an alternative embodiment the server database 114 needs not store copies of the local databases 128, the server database 114 may store links to the local databases 128 to access as needed.

In accordance with the present invention, the server database 114 facilitates a system in which an address book of a specific member 104 (i.e., address information that is viewable by the specific member 104) is asymmetrically populated by information supplied and or published by multiple other users 103, both members 104 and non-members 106. Accordingly, only a single copy of personal information concerning a specific member 104 may exist within the server database 114, but this specific copy is accessible to multiple other members 104 to whom an owner member 104 has granted access permission. It should be noted that the single copy of personal information concerning a specific member 104 might be replicated as cached copies during the system operation in order to increase efficiency.

Conversely, several instances of personal information concerning non-members 106 may exist within the server database 114, particularly, within personal member 104 records replicated from local client databases 128. That is, two or more members 104 may each have one record for the same non-member 106. Further, the present invention envisages that the single copy of personal information for an owner member 104 may be utilized to populate multiple local databases 128 maintained upon respective client systems 116. Accordingly, a local database 128 on a remote client system 116 may be largely populated by information retrieved from the server database 114, and which is maintained by an originator of such information about whom the information concerns.

The private network service 100 can be one or more of any information management services that can be provided as an asymmetric service over a public network 102. For example, private network service 100 may include one or more of calendar synchronization services, meeting scheduling services, reminder or notification services, notes or tasks tracking services, advertisements (e.g., wanted ads), auction services, news services, hiring or employment related information management services, collaborative project management services, federated payment processing services, security and verification services, authentication, trust, or any other services requiring information sharing, synchronization, or updating. For example, in one embodiment of the present invention, the private network service 100 includes a personal contact information updating service operating via a wireless network among wireless phone users 103. In another embodiment, private network service 100 includes a universal address book operating over the Internet among e-mail users 103.

By way of example with reference to FIGS. 2a and 2b, a member 104a with a local address book in a storage device (local database 128a) accesses the private and public networks with a personal computer (client system 116a). The member 104a selects a set of e-mail users (users 103) for requesting updated contact information. The member's personal computer (e.g., client system 116) sends update requests identifying the set of e-mail users by e-mail address to a server system 112 using a proprietary messaging (private protocol 108).

Based on the e-mail addresses provided, the server system 112 looks up the e-mail users in a universal address book in the service database 114 to determine membership in the private network 100. Once the e-mail users are identified as members 104 (i.e., other members) and non-members 106, the server system 112 sends update request messages to the other members 104 using the proprietary messaging and sends e-mail messages (public protocol 110) requesting updated contact information to non-members 106.

An advantage of the present invention includes asymmetric operation, which may be leveraged to grow the private network 100. Now referring to FIG. 3a, a flow chart of a process for growing the private network 100 in accordance with one embodiment of the present invention. The service is initialized 150 when a user 103 becomes a member 104, for example, when a user 103 accepts an invitation to join a private network. As described below service initialization 150 is configured to be a frictionless process. For example, a user 103 may download an application client-software and install it in the user's client system 116. Thus, as part of the initialization process 150 the user 103 becomes a member 104.

After the service initialization process 150, new member 104 can begin using the features provided by service 100 by submitting service requests. When a member 104 begins to use the service 100, service requests are received 152 for processing. For example, a member's client software may designate a set of contacts in the member's contact list for which updated information is to be requested. As part of the processing, service requests are sent 154 to other members 104 and to non-members 106 using the appropriate communication method. For instance, a notification to verify a member's own personal contact information stored in the system database 114 may be sent via private protocol 108 to any member 104 designated in the service request.

In addition, an e-mail message may be sent to non-members 106 asking them to provide current contact information in a reply e-mail message. Members 104 may respond to service requests via the private protocol 108 if, for example, their own information stored in the system database 114 needs to be updated. Non-members 106 may respond via the public protocol 110 or some other alternative general access mode. In one embodiment non-members can respond to update requests using e-mail messages or web-based forms via the Internet.

The service responses are received 156 and the service to the original member is performed 158 on server 112. For example, current contact information provided by non-members 106 may be extracted from response e-mail messages using heuristic algorithms and that information may be used to update member database records concerning the non-members 106.

Similarly, response messages from members 104 confirming that their own information stored in the server system database 114 is current, or providing updated information, are received via the private protocol 108 and the member profiles of the requesting and providing members 104 are linked in the system database 114. Then, using the private protocol 108 to communicate with the client application software in the requesting member's client system 116, the local database 128 is updated 160 to include information in the service responses. The service may be requested 162 once again, for example, for a new set of contacts, or it may be terminated 164.

Referring now to FIG. 3b, shown is an event diagram of one example of a method illustrating asymmetric operation according to one embodiment of the present invention. System server 112 sends 168 a communication to a user 103 that results in the user 103 becoming a member 104a. The communication may be an update request bearing an invitation to join the private network, a download of client software, or the like. The member 104a sends 170 a service request that designates a set of users 103 from which information is to be requested. The server 112 accesses 172 central database 114 to determine which designated users 103 are members 104 and which ones are non-members 106. The database 114 provides 174 the membership information regarding the designated users 103 to the server 112. The server 112 sends 176 information requests to members 104 via private protocol 108 and sends 178 information requests to non-members 106 via public protocol 110.

Responses from members 104 and non-members 106 may occur over a period of time and in no particular order. FIG. 3b also shows a representative set of actions for each type of response. For example, members 104 respond 180 to the service request via private protocol 108. A particular member 104 response may be, for example, an update to the member's own information, an authorization to allow the requesting member 104a access to their information, or the like. The server 112 accesses 182 the database 114 to process responses from other members 104. These processes include update information according to the responses from other members 104 or to enable links between system records of the requesting member 104a and the responding members 104. Once the server database 114 has been updated with any member response information, the server 112 communicates 184 with the requesting member 104a. These communications include notification of the new links made, synchronizing system (e.g., universal address book), synchronizing local (e.g., PIM 122 or local database 128) information, or the like. It should be noted that in one embodiment, server 112 might automatically process service requests to at least some members 104 based on the permissions those members 104 have provided. For example, a member 104 may have a public information card with a permission indicating that the card can be provided to any update requesting member 104 without requiring any further input.

In contrast, non-members 106 respond 186 via the public protocol 110 in one or more different ways. For example, non-members may respond through reply e-mail, voicemail, instant message, web-access, or the like. The server 112 processes the responses of non-members 106 by determining relevant information of non-members 106 by extracting it from the response mechanism used by the non-member 106. For example, the server 112 may be the recipient of the e-mail messages sent as replies to a personal information update request. The e-mail update requests may include the server 112 recognizable field names (e.g., "New Address" "New E-mail" or the like) that a non-member 106 can use to provide "fill-in-the-blank" information in their reply e-mail message. Upon receipt of the reply e-mails, the server 112 may use a text-searching algorithm to find strings with the recognizable field names and capture the text following as the non-member 106 responses. Other similar text processing algorithms can be used to extract the non-member 106 update information. In an alternative embodiment, more advanced heuristic based algorithms can be use to extract and validate the format of non-member provided update information.

Once some or all the relevant information is available, the server 112 updates 188 the system records of the member 104a regarding information of the non-member 106. The server 112 also communicates 190 with the member 104a in regard to the non-member 106. This communication may be to update the member 104a about information received from each non-member 106 (e.g., service unrelated information included in a reply e-mail) or to synchronize the local database 118 with the updated non-member information.

Now referring to FIGS. 4a through 4d, a set of logical diagrams depicting viral network growth according to one embodiment of the present invention is shown. In the context of these Figures, representations of non-members 106 are designated by the letter "U" followed by a number and representations of members 104 are designated by the letter "M" followed by a number. Further, private network connections are shown as arrows, either uni-directional, pointing away from members M to non-members U and depicting asymmetric network links, or bi-directional, pointing towards two members M and depicting symmetric portions of the private network over which enhanced services are available. It should be noted that private network connections are not necessarily physical connections. Rather, they may include virtual links between users 103 (members M and non-members U) representative of the services offered by the private network and the information exchanges in connection with those services.

Figure 4B:
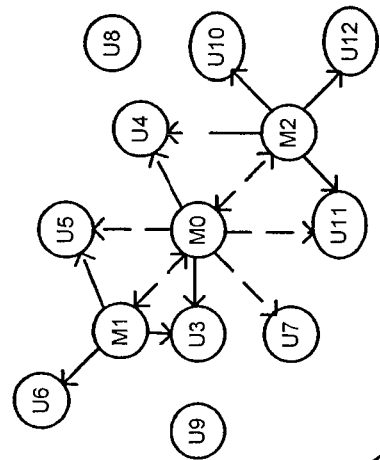
FIGS. 4a through 4d illustrate stages of viral growth of a network in accordance with one embodiment of the present invention.
Figure 4A:
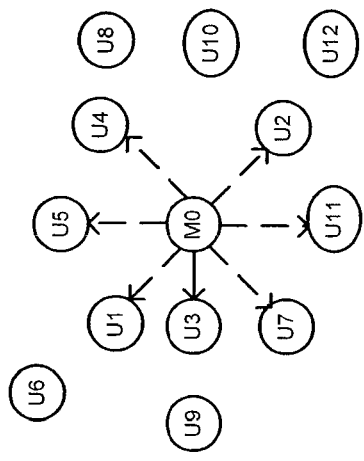

FIG. 4a shows a first member MO that uses private network service 100 with a subset of non-members U1, U3, U7, U11, U2, U4, and U5. The arrows pointing away from MO represent communications that expose the non-members U to the private network, for example, service requests with invitations to join, e-mails or other messages mentioning the private network service, or the like.

Non-members U1 and U2 decide to join the private network 100, for example, by responding to an invitation to join the private network included with a private network service request, and become members M1 and M2. The other non-members U3, U7, Ulf, U4, and U5, have been exposed to the private network for the first time and decide not to join the private network, e.g., may ignore the communication from MO, may not have the time to look into the service, or for some other reason to not join at this time.

As shown in FIG. 4b, M1 and M2 use the private network service 100 with another subset of non-members U. M1 uses the private network service 100 with U6, U3, U5, and MO. M2 uses the service with U11, U12, U10, U4, and MO. Since MO was already a member, the link between MO and M1 and M2 are symmetric, shown by the bi-directional arrows, are enhanced services are available between these members M.

It should be noted that since MO had contacts with members M1 and M2, it is possible that M1 and M2 may share contacts with MO, and therefore, may use the private network service 100 with some subset of users 103 in common with MO, for example, U3, U5, U4, and U11. Thus, some non-members U get multiple exposures to private network service 100 from different members M. Hence, these non-members are provided with multiple opportunities to join the private network. In and of itself, the multiple exposures may induce non-members U to join the private network. For instance, non-members may think that if two friends or business contacts are using the service it may be worth looking into it, or they may have a closer or more trustworthy relationship with the second member, or the like.

Figure 4D:
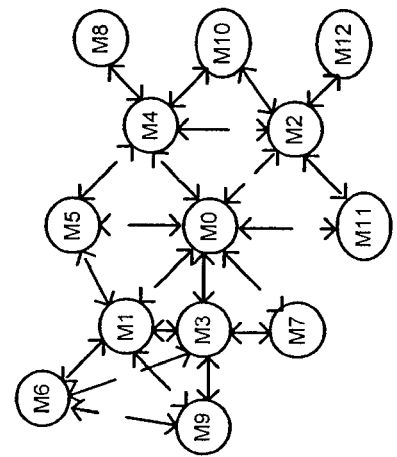
Figure 4C:
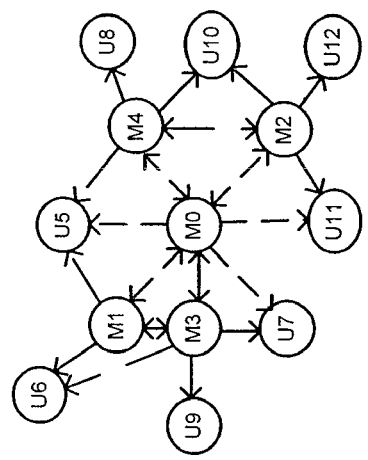

FIG. 4c shows the next iteration of the viral growth deployment. Here non-member user U3 contacted by both MO and M1 has decided to join the private network and is using the service with some overlapping non-members, e.g., U6, and some non-members who had not previously been exposed to the private network, e.g., U9. A similar situation is shown with respect to non-member U4 who became member M4. After several iterations, the number of members M increases exponentially as the pool of non-members U coming in contact with the private network becomes larger and larger. Eventually, all users 103 may become members M as depicted in FIG. 4d.

In order to help achieve desired levels of viral growth, a viral equation provides a guide for growth of greater than one for every new member 104 of a private network. A viral equation (1) can be implemented using a viral engine approach to network growth.

$$\text{Growth} = N \times Cr > 1 \quad (1)$$

N is the number of non-members 106 exposed to the private network. CR is the conversion rate into member of the private network. If for every member 104 at least more than one other user 103 becomes a member 104, the network will grow exponentially. However, if the per member growth is less than or equal to one, for example, if the service offered does not entice users 103 to join, the network will sequentially grow very slowly (Growth=1), remain at the same size (Growth<1), and could eventually collapse (Growth<0).

The implementation of viral growth features as well as similar adaptations falls within the scope of the present invention. Several viral features according to the present invention are described with respect to FIGS. 5a through 17. These features are intended to maximize the variables of the viral equation thereby resulting in a growth rates greater than one.

Accordingly, one aspect included in the present invention is the use of genetic algorithms to adapt and improve features of every aspect of the private network service 100 leading to the conversion of a non-member 106 to a member 104. The genetic evolution of features that have shown to successfully contribute to member conversion contributes to maximizing the conversion rate (CR). FIGS. 5*a* through 8*c* facilitate the description of some aspects of this genetic evolution feature.

FIG. 5*a* shows a list of electronic mail (e-mail) messages for sending to non-members according to one embodiment of the present invention. Each line in the first column is a file name for an e-mail message used to request contact information updates from non-members 106. These messages also include invitations to join the private network. Each message is characterized by a set of aesthetic appeal related features, for example, colors, arrangement, tone, graphics, and the like. The conversion rate (CR), in this case, the rate of positive invitation responses, for each message is recorded and tracked for a period of time, the values for each of three time frames is shown in each column.

Figure 5B:
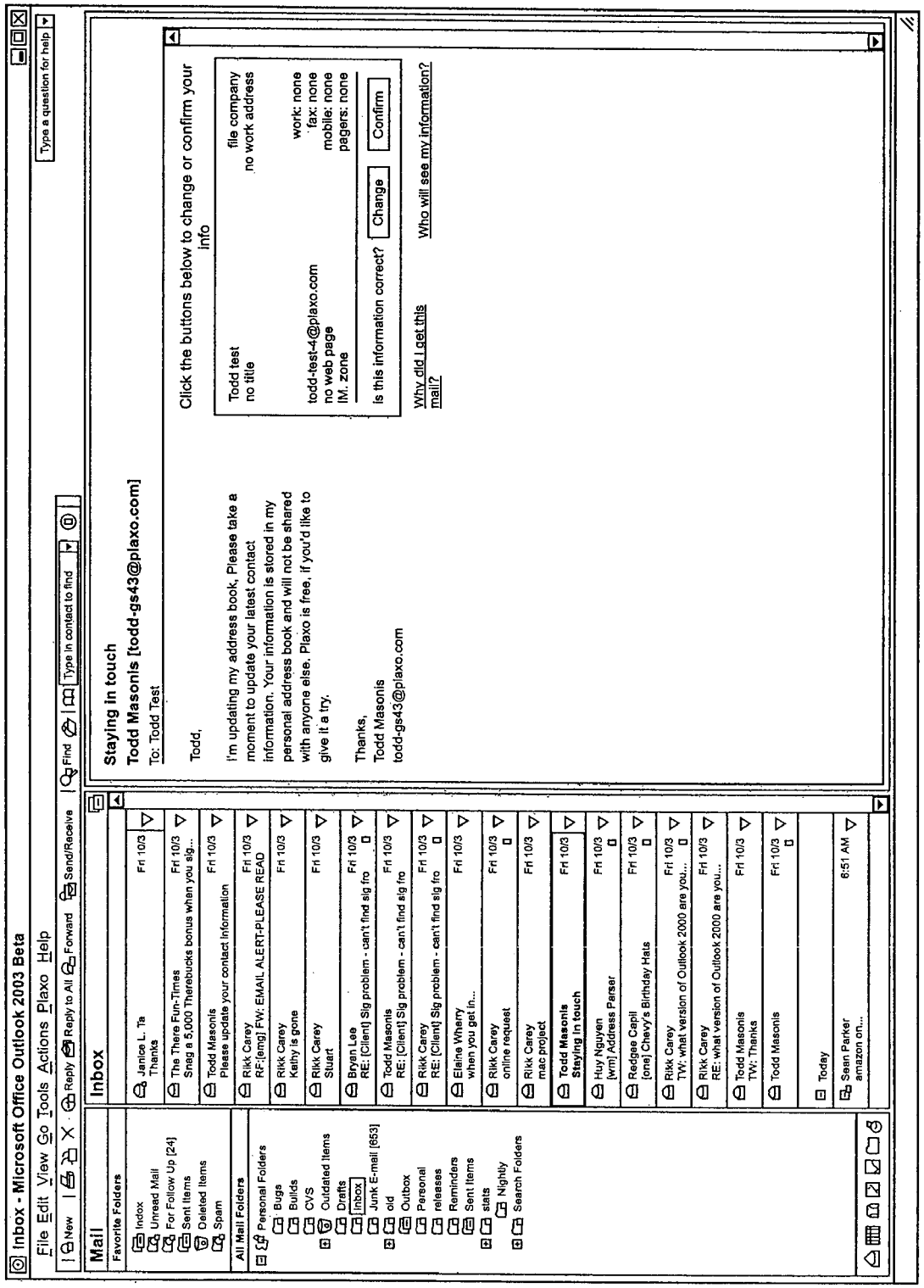
FIG. 5b is a sample update request electronic mail message according to one embodiment of the present invention.
Figure 5C:
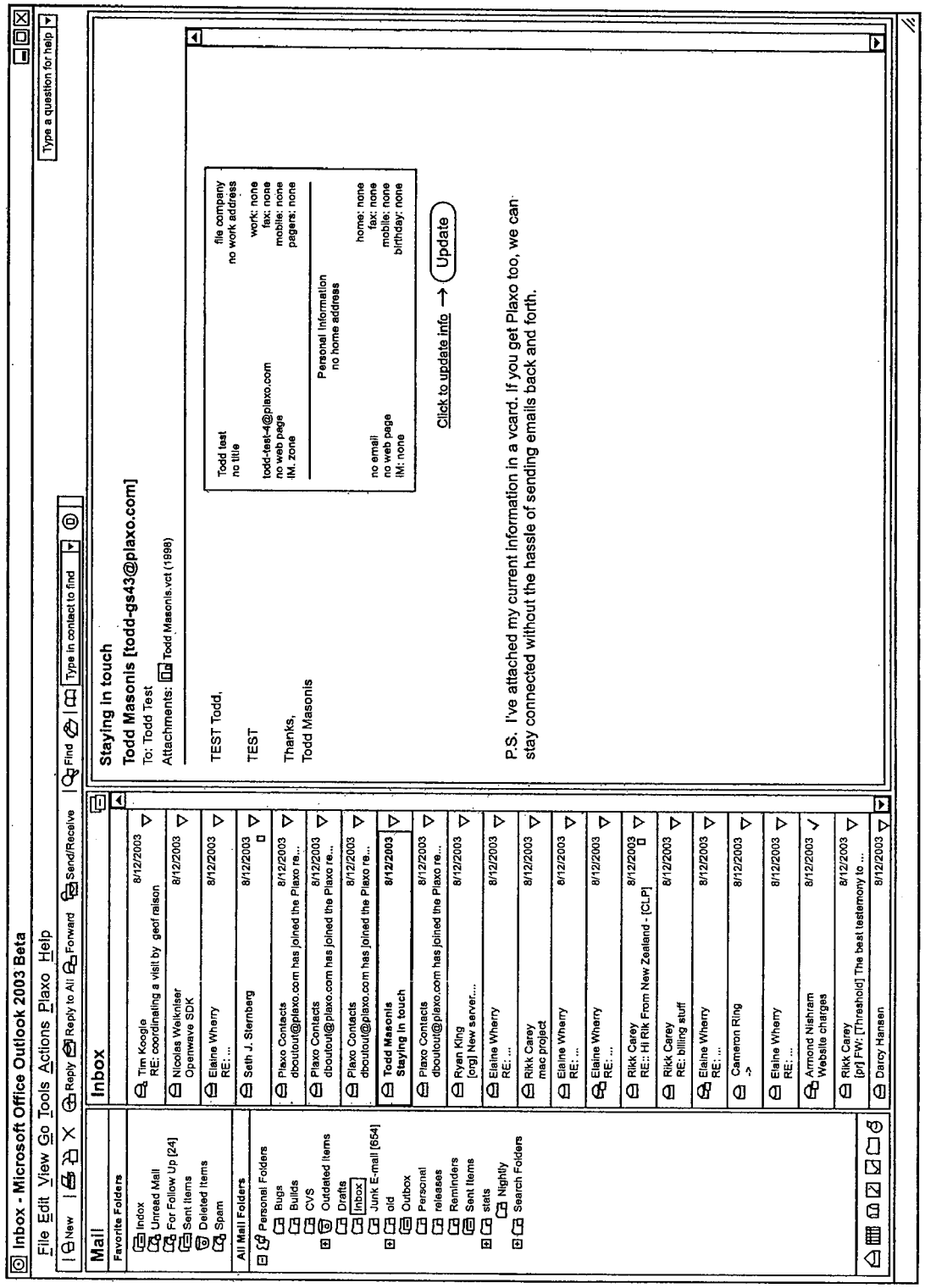
FIG. 5c is a sample update request electronic mail message according to one embodiment of the present invention.
Figure 5D:
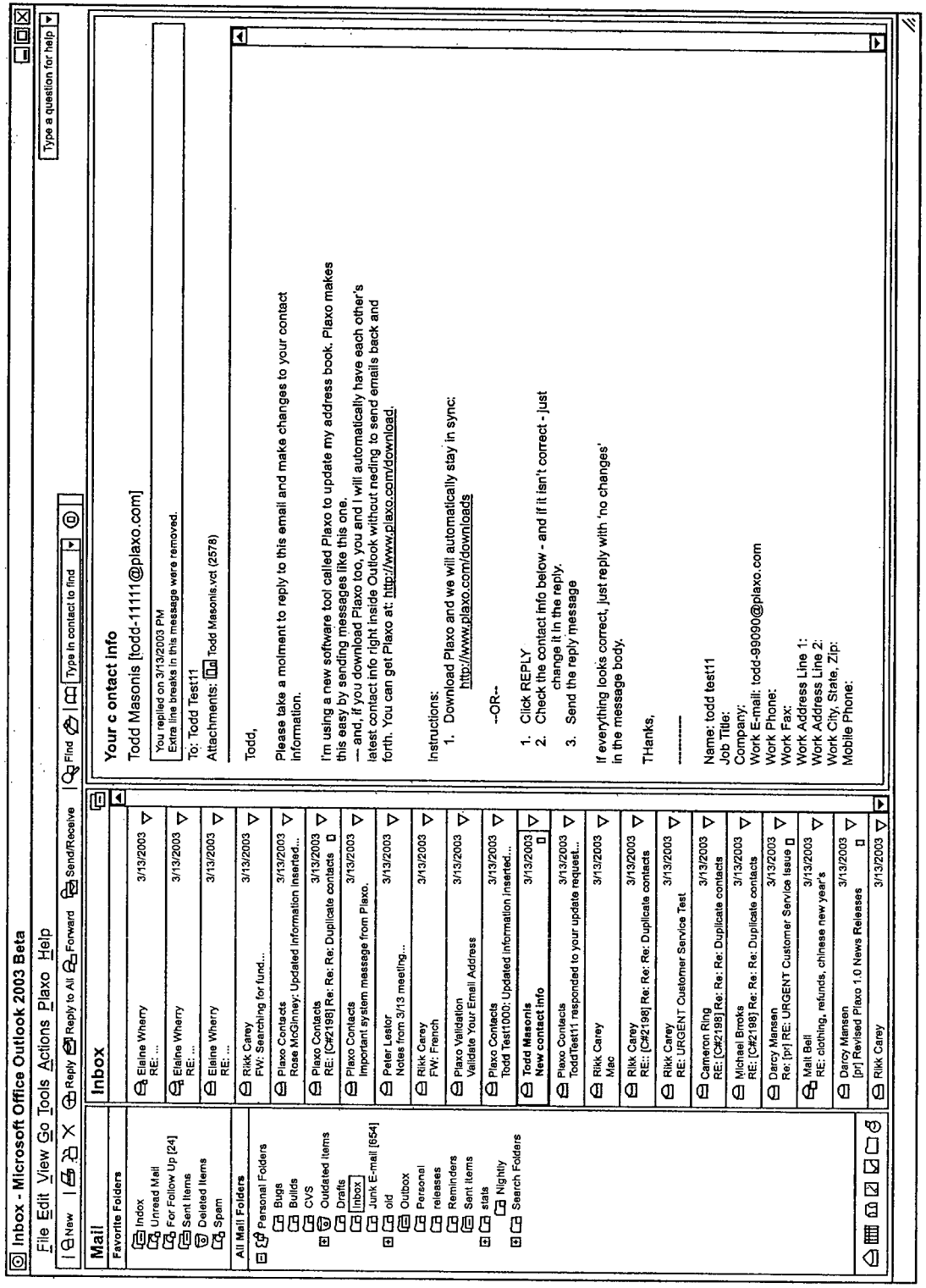
FIG. 5d is a sample update request electronic mail message according to one embodiment of the present invention.

By way of example, FIG. 5*b* shows an e-mail message with the user's information in a business card format that includes reply buttons to change or confirm the information. FIG. 5*c* shows an alternative embodiment of the e-mail message with a card showing business and personal information and a stand-alone "update" button. FIG. 5*d* shows yet another embodiment of the update e-mail message composed in simple text and including a list of personal information field titles to be filled out by the user. These messages are examples of the service response messages for non-members 106 discussed above. For example, non-members 106 may respond to an information update request by replying to an e-mail message such as any of the ones shown in FIGS. 5*a*-5*d*. Then, a server 112 may apply natural language processing algorithms to extract response information as described above.

In addition to the layout and the use of text alone or text and graphics, other features that may be genetically evolved and tracked include colors, sizes, shapes, and the like. The features included in successful, i.e., high conversion rate, e-mail messages are cloned into subsequent generation of messages while those of unsuccessful messages are eliminated. For example, the first e-mail message in FIG. 5*a*, su_default_nlp, has a total conversion rate of 2.93%, the highest conversion rate of all e-mail messages. Accordingly, the features in this message are likely to be cloned in future versions of the message.

Figure 7A:
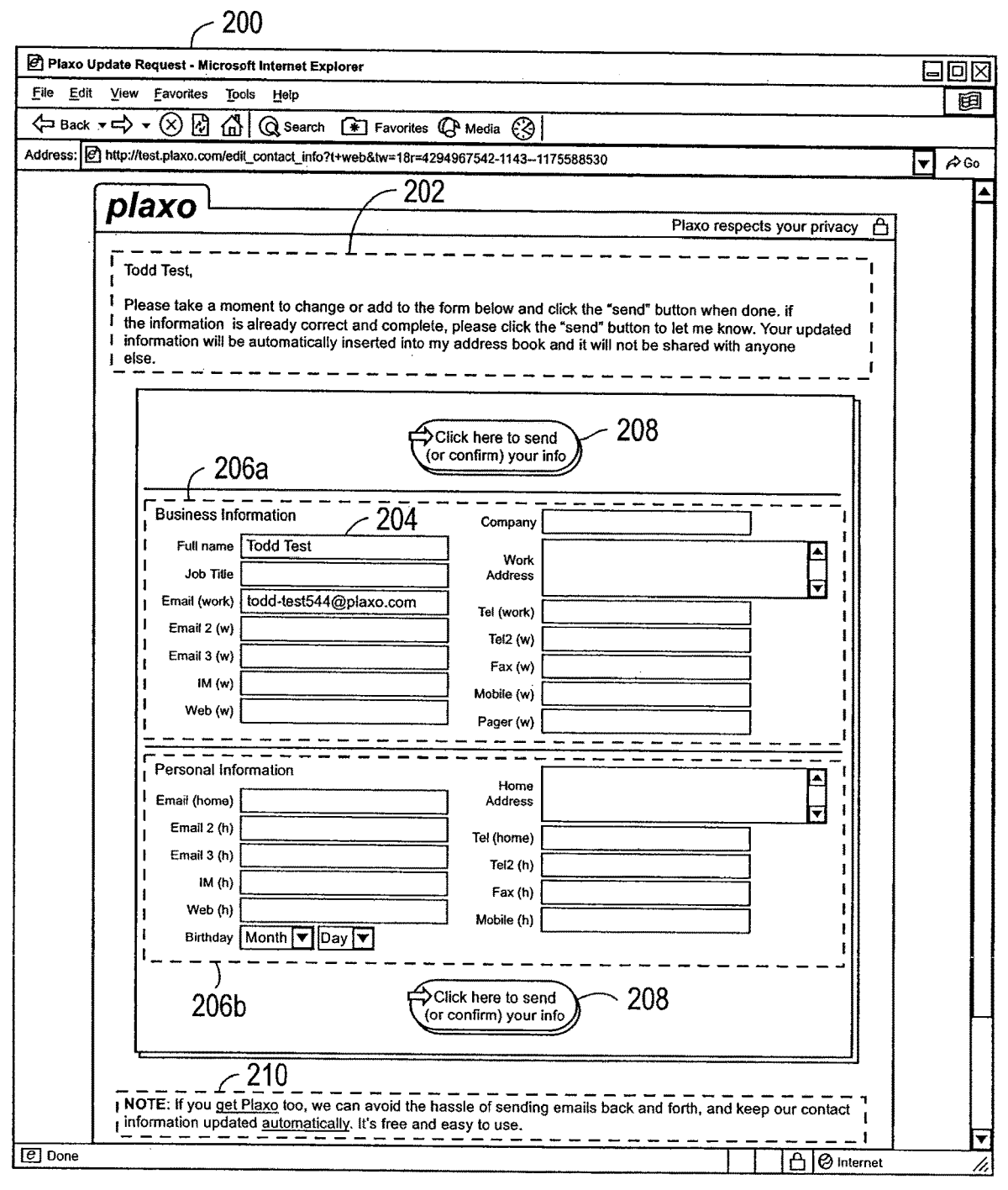
Figure 7B:
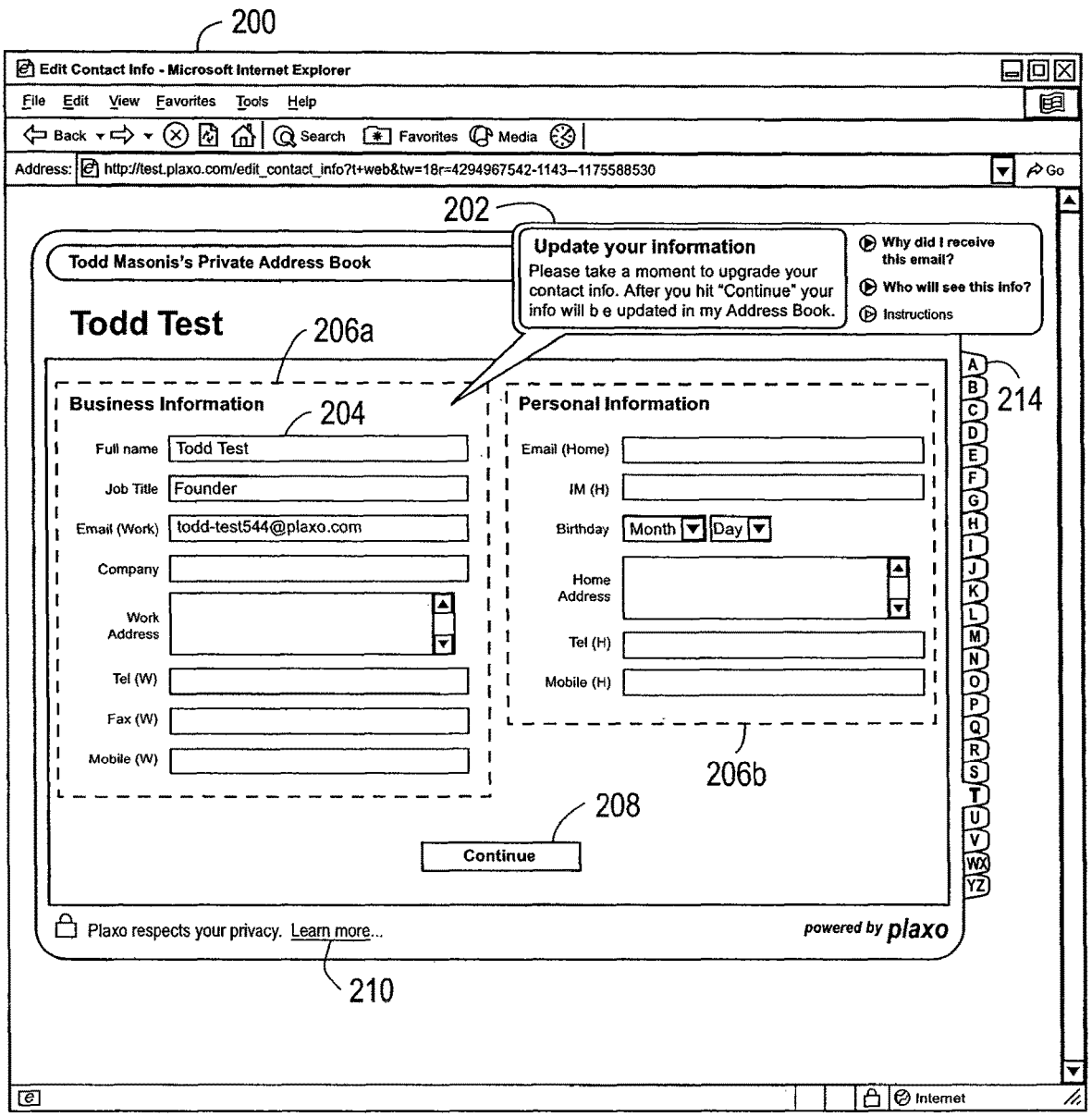
FIG. 7b is a sample update response web page according to one embodiment of the present invention.

A similar genetic evolution approach is used for Internet web pages in one embodiment of the invention. FIG. 6 shows a table of web pages presented to users visiting the private network service web site. For these web pages, success is measured based on the degree of accomplishment of the intended purpose of each web page. For example, edit_contact_information ("ECI") pages are intended for users to provide their updated information, possibly to download the client software, and to launch the service. FIGS. 7*a* and 7*b* illustrate two alternative embodiment of an edit_contact_information web page with different aesthetic appeal related features.

FIG. 7*a* shows a light color background information input form 200 preceded by a short message 202 with instructions on how to fill it out. The form 200 displays information fields 204 for personal and business information in separate sections 206 (206*a* and 206*b*) arranged vertically, business information section 206*a* above the personal information section 206*b*. Two buttons 208 are displayed to send or confirm the information displayed. A note 210 at the bottom of the form 200 explicitly provides information in a personalized tone about the benefits of joining the private network, e.g., "Hi Joe, this service avoids the hassle of sending e-mails back and forth, and keep our contact information updated automatically. It's free and easy to use."

FIG. 7*b* shows an alternative user interface for an edit_contact_information page. Here the form 200 is displayed to look like a page in an address book with index tabs 214 along the right side highlighting the letter corresponding to the non-member's name. The information fields 204 for business and personal information are displayed in horizontally arranged sections (206*a* and 206*b*), side by side. Instructions and other information about filling out the form are displayed on a "pop-up" window 202 design. A button 208 is displayed at the bottom of the form to continue once the information has been entered. A note 210 is displayed offering more information, e.g., "Learn more . . . "

Figure 8A:
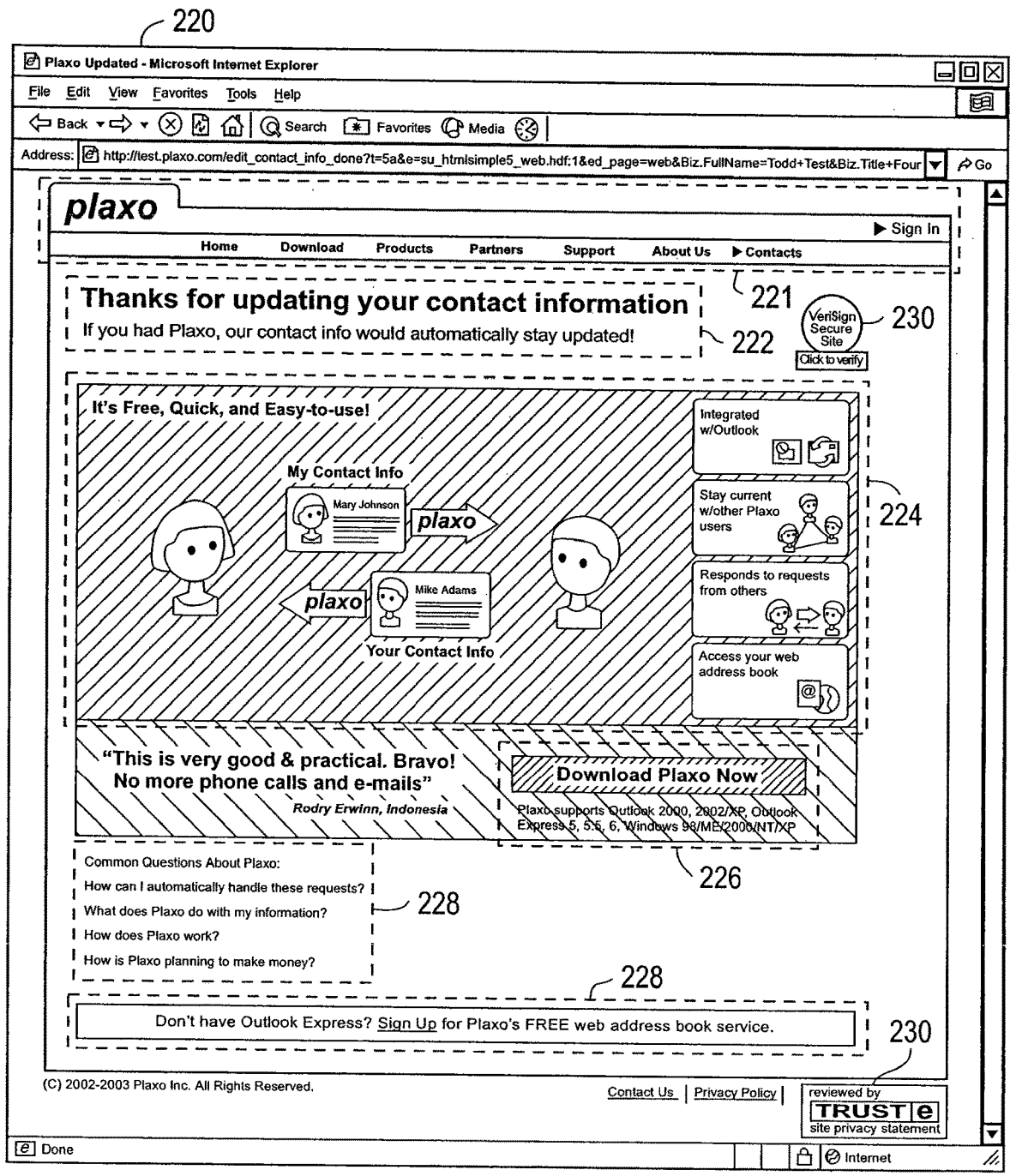
FIG. 8a is a sample invitation to join web page according to one embodiment of the present invention.
Figure 8B:
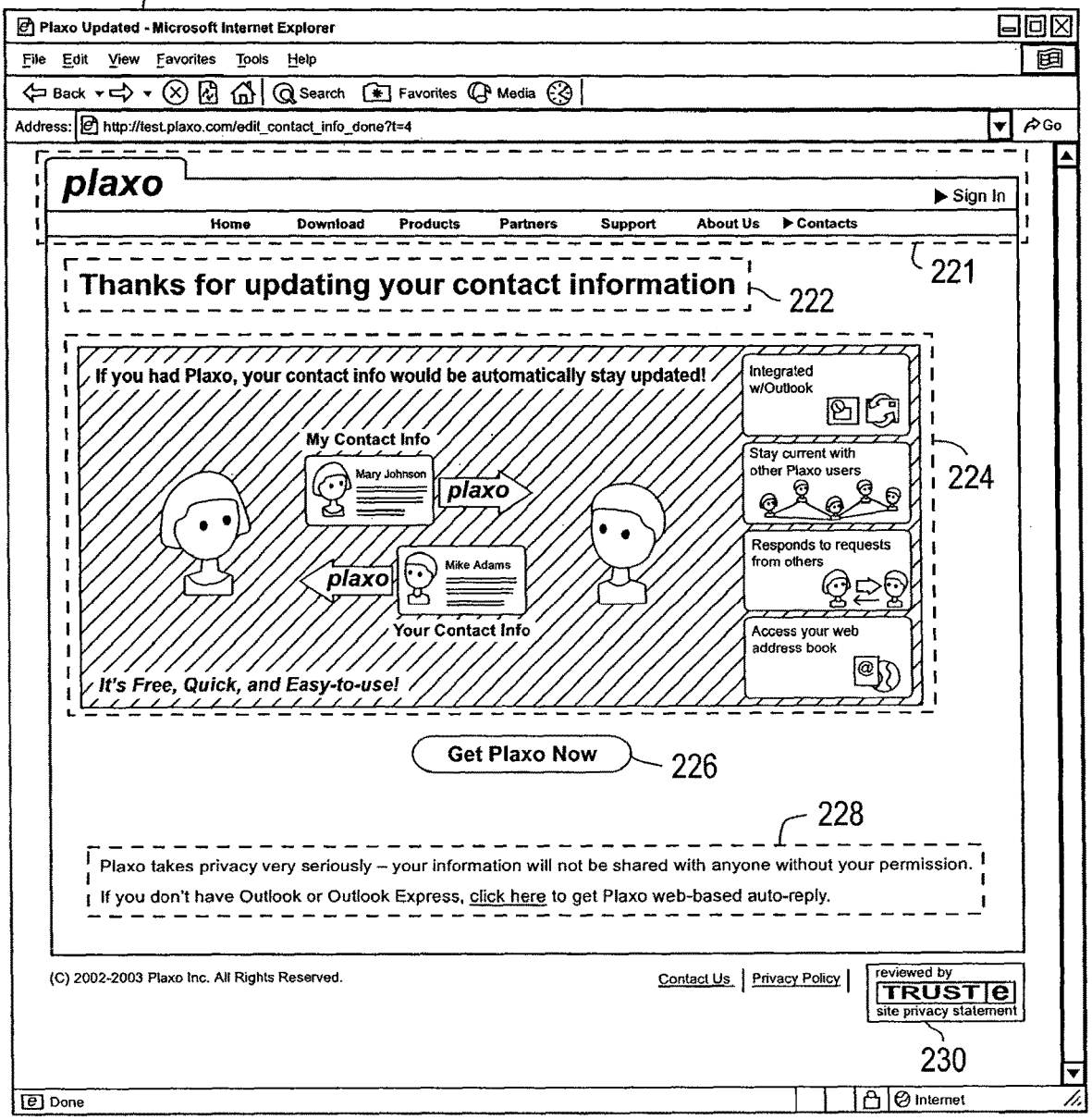
FIG. 8b is a sample invitation to join web page according to one embodiment of the present invention.
Figure 8C:
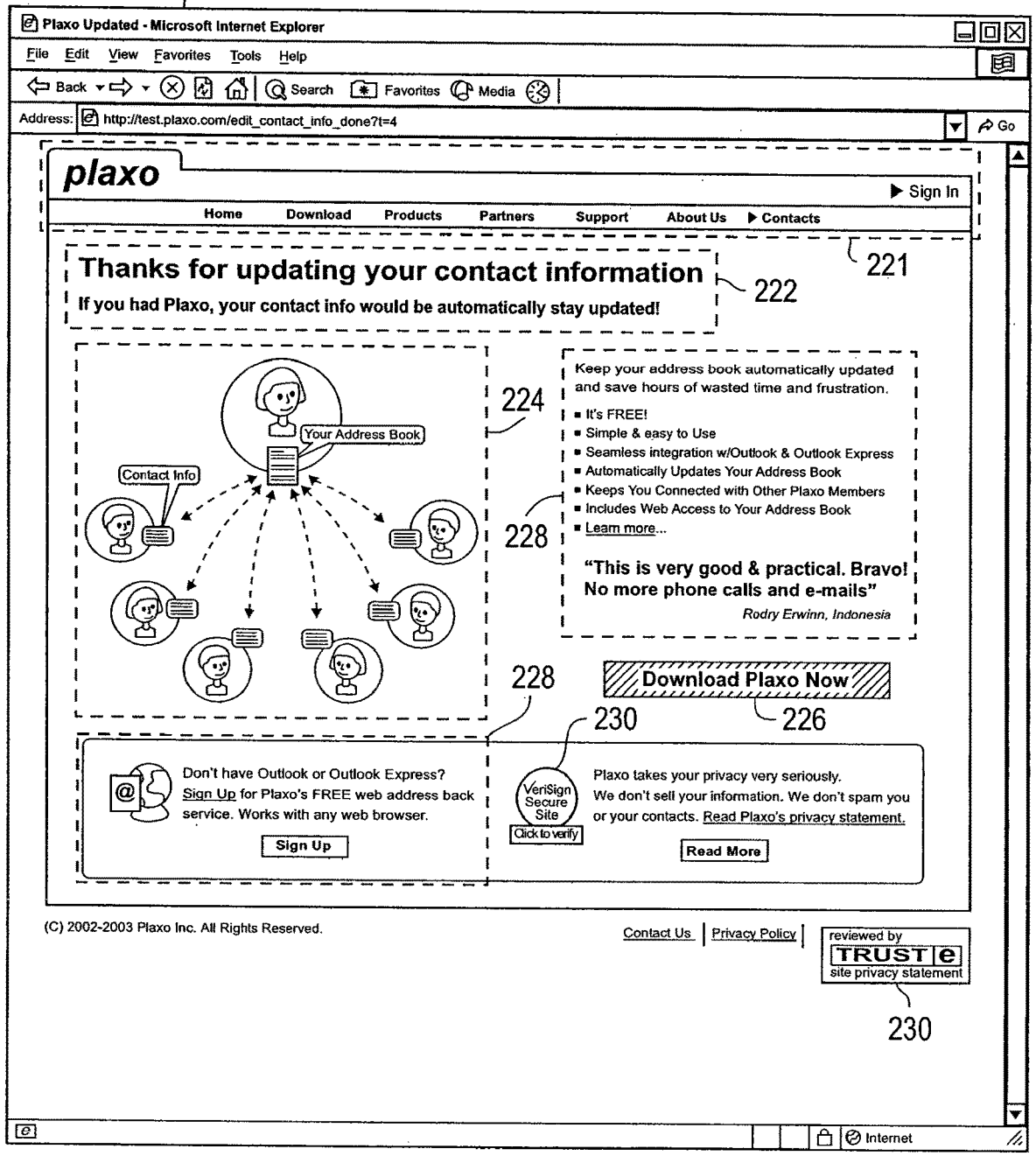
FIG. 8c is a sample invitation to join web page according to one embodiment of the present invention.

Similarly, edit_contact_information_done ("ECID") pages may be intended to provide information about the private network to convince non-members to join the network. By way of example, ECID pages may include a link to download private network client software. FIGS. 8*a* through 8*c* show alternative embodiments of ECID web pages with different aesthetic appeal related features.

FIG. 8*a* shows one example of an ECID web page 220. Across the top of the page a navigation bar 221 is displayed. Since this page is shown after a non-member updates or edits contact information, a thank you message 222 is displayed. In this embodiment, the "thank you" message 222 includes a description of a benefit of joining the private network 100. A graphic display 224 of several features of the system is also included. The graphic display 224 is intended to convey the general function of the private service 100 and some of its value added features in order to convince non-members 106 to join the private network. A download button 226 with a particular textual description, shape, size, location, and color, provides a link to the download and installation of the private network client software. Other service related information 228 is displayed, for example, as a list of common questions, available system interface options, and the like. In addition, some third party logos 230 are included to promote user trust in the private network service 100. For example, a VeriSign® Secure Site logo provides a measure of the security features offered by the private network based standards of a third party, VeriSign Inc. of Mountain View, Calif. A Trust-e logo (or trustmark) provides measure of the privacy features offered by the private network based on standards by a third party, TRUSTe of San Francisco, Calif.

Similarly, FIG. 8*b* shows another example of an ECID web page 220 with different variations of aesthetic related features of these elements. In this example download button 226 includes a different descriptive text, size, location, and shape. Some of the text in other elements is displayed in a different color. Only a Trust-e logo 230 is displayed. FIG. 8*c* also shows yet another example of an ECID web page 220 with different variations of aesthetic related features of these elements. In this embodiment graphic display 224 is significantly different. It is reduced in size and placed side-by-side with the private service additional information 228 textual descriptions. These Figures represent some examples of potential variations but many more permutations and variations of these and other aesthetic related features are possible and within the scope of the present invention.

Referring back to FIG. 6, the measures of success for different versions web-pages (as described with respect to FIGS. 7*a* through 8*c*) are shown. Based on these measures of success, aesthetic related features in the most successful web pages are cloned into subsequent versions of those pages using genetic algorithms. Thus, a feedback loop is established to help increase the likelihood of positive responses in the form of conversion to membership with each generation. In turn, this helps increase the conversion rate (CR) for overall network growth.

Another viral engine feature according to one aspect of the present invention is the frictionless private network service 100 setup process. The frictionless setup process increases the likelihood that a new user may complete a setup process and join the private network member. Hence, the setup process of the private service 100 according to the present invention is best accomplished minimizing the number of steps and number of user inputs required for completion.

FIG. 9a through 9g show user interface screenshots of a sample registration and setup process of one embodiment of the invention.

Figure 9A:
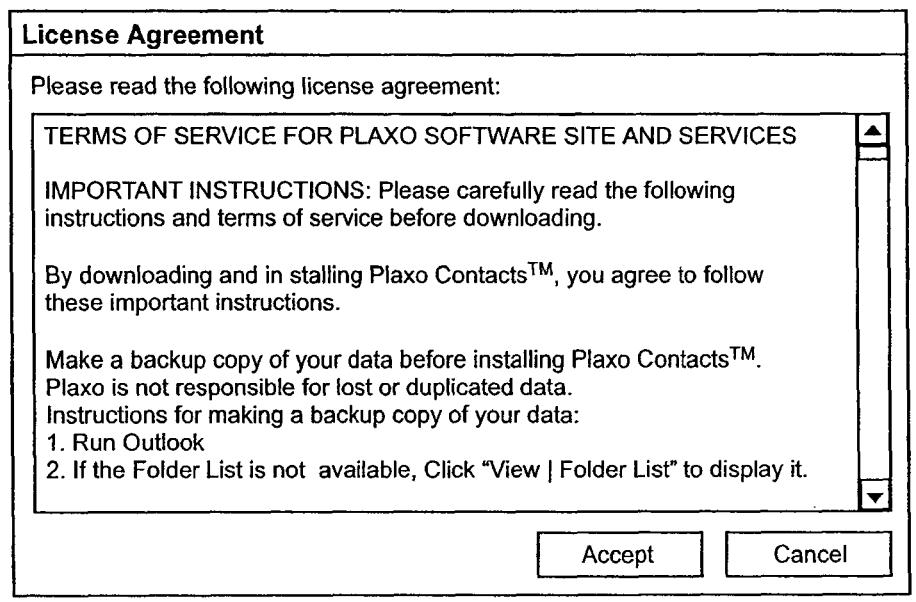
FIG. 9a is a sample screen shot for a step in the system setup according to one embodiment of the present invention.
Figure 9B:
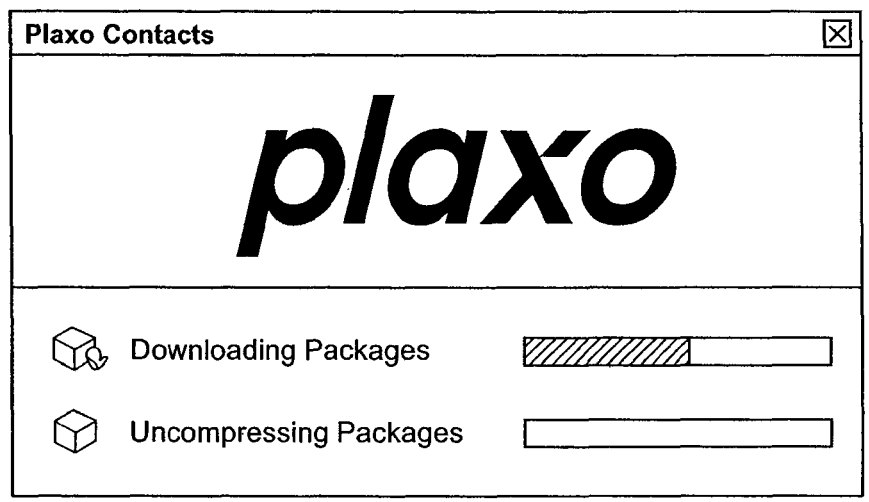
FIG. 9b is a sample screen shot for a step in the system setup according to one embodiment of the present invention.
Figure 9C:
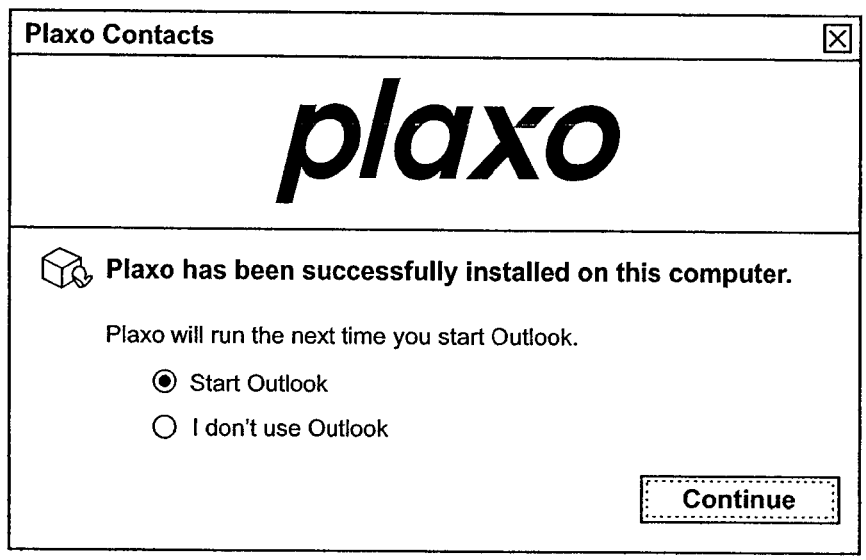
FIG. 9c is a sample screen shot for a step in the system setup according to one embodiment of the present invention.

The setup process beings with a license agreement shown in FIG. 9a, which requires a first button selection from the non-member 106. Once the license is accepted, the client software download begins. The download and installation progress is tracked on the user interface of the non-member 106 with the screen shown in FIG. 9b. A second user input is required from the non-member 106 to determine which application which the private service 100 will interact with, i.e., preferred access mode, which is shown in FIG. 9c.

Figure 9D:
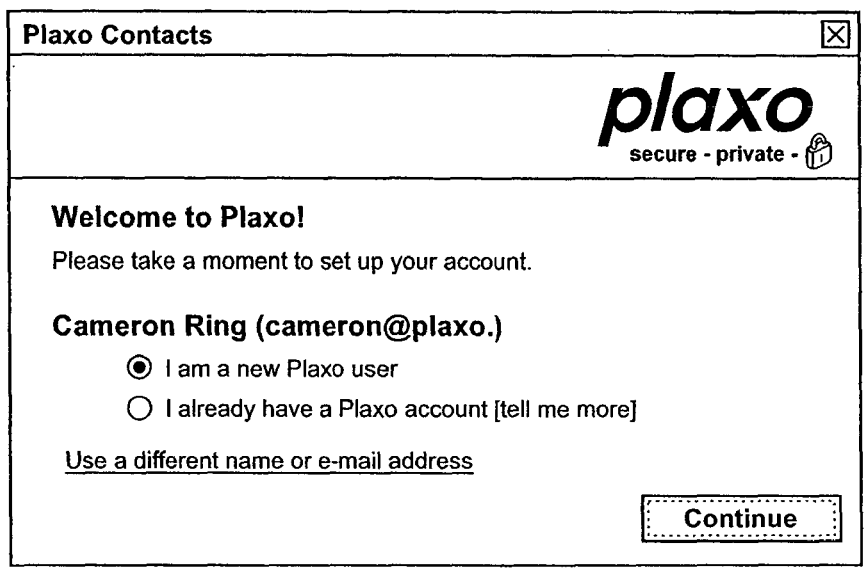
FIG. 9d is a sample screen shot for a step in the system setup according to one embodiment of the present invention.
Figure 9E:
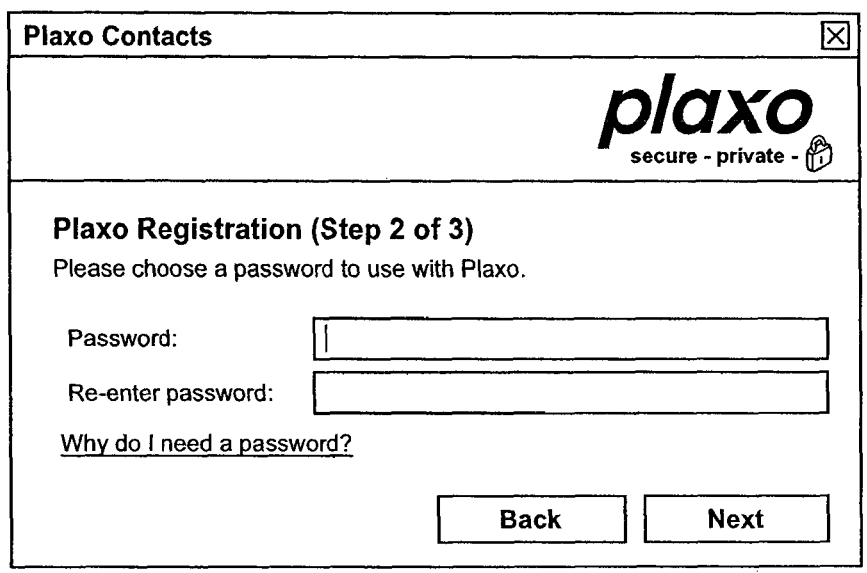
FIG. 9e is a sample screen shot for a step in the system setup according to one embodiment of the present invention.
Figure 9F:
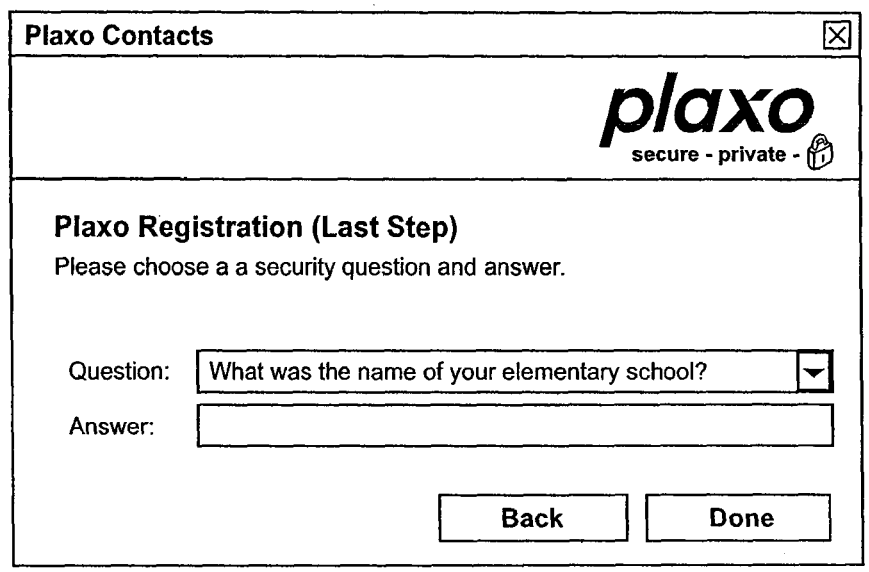
FIG. 9f is a sample screen shot for a step in the system setup according to one embodiment of the present invention.
Figure 9G:
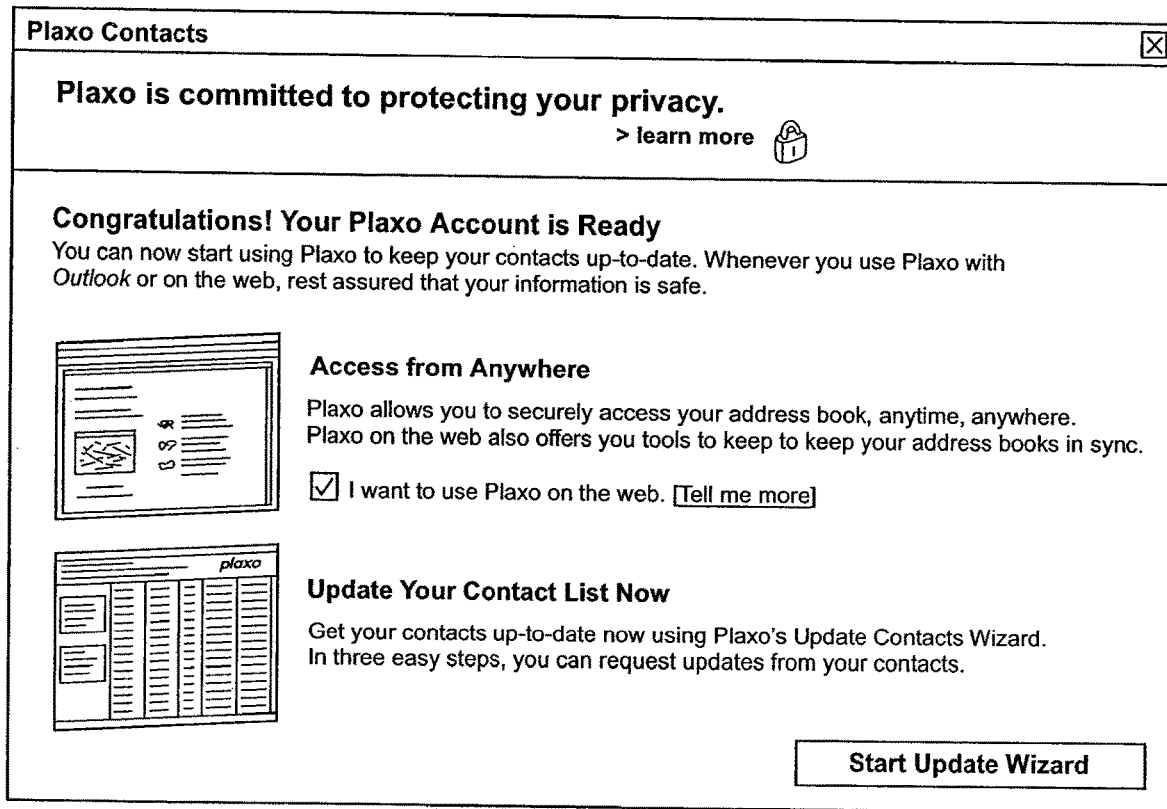
FIG. 9g is a sample screen shot for a step in the system setup according to one embodiment of the present invention.

FIG. 9d shows another user interface to receive a third input from the non-member 106 indicating whether the non-member 106 is in fact new to the private network or is an existing member 104 downloading the client software again. A fourth user interaction is required to establish a new user password for accessing the private network as shown in FIG. 9e. FIG. 9f shows an optional security question selection screen for a backup authentication if a member forgets his or her password. FIG. 9g shows the registration completion page.

FIGS. 9a through 9f illustrate a frictionless system with only five simple user inputs. Through this process a non-member can complete a registration process, including download and installation of client software quickly and with minimal intrusion. It should be noted, that no user input is required for entering personal information. This process is performed later aided by data-mining features of the private network in accordance with the present invention. Another aspect of the frictionless system includes an auto-validation feature to verify personal information provided by new members 104 before sharing with other members 104. For example, once a new member 104 provides an e-mail address as his own, server 112 may send an e-mail message to the address provided and automatically confirm receipt of the e-mail message by the client application 118 using private protocol 108 confirmation message.

As previously described, the viral equation of the present invention has a number of users 103 exposed to the private network (N) and the conversion rate element (CR). As described previously, a number of features of the viral engine help increase conversion rate (CR). Additional features of the viral engine are intended to maximize the other element of the viral equation, i.e., the number of users 103 (N) that are exposed to the private network. Assuming a constant conversion rate (CR), the more users 103 that are exposed to the private network or receive an opportunity to join, the faster the private network will grow. Nevertheless, as the number of users 103 (N) grows, it may also provide for an increase in conversion rate as further described below.

To increase exposure to users 103, in one embodiment of the present invention, once a user 103 registers and becomes a member 104, an update contacts wizard is launched in the member's client system 116. FIGS. 10 through 14 show example sample screen shots of a user interface for an update contacts wizard.

Figure 10:
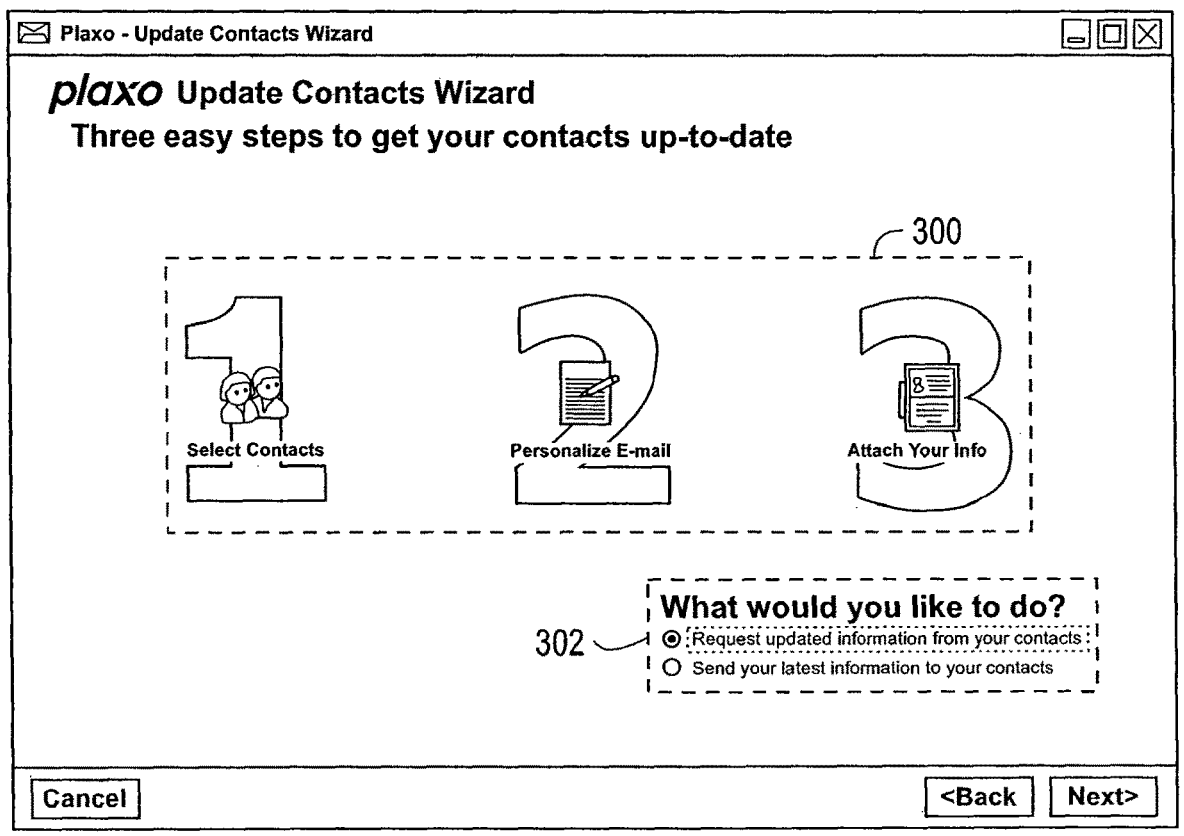
FIG. 10 is a sample screen shot of a contacts update wizard according to one embodiment of the present invention.
Figure 11:
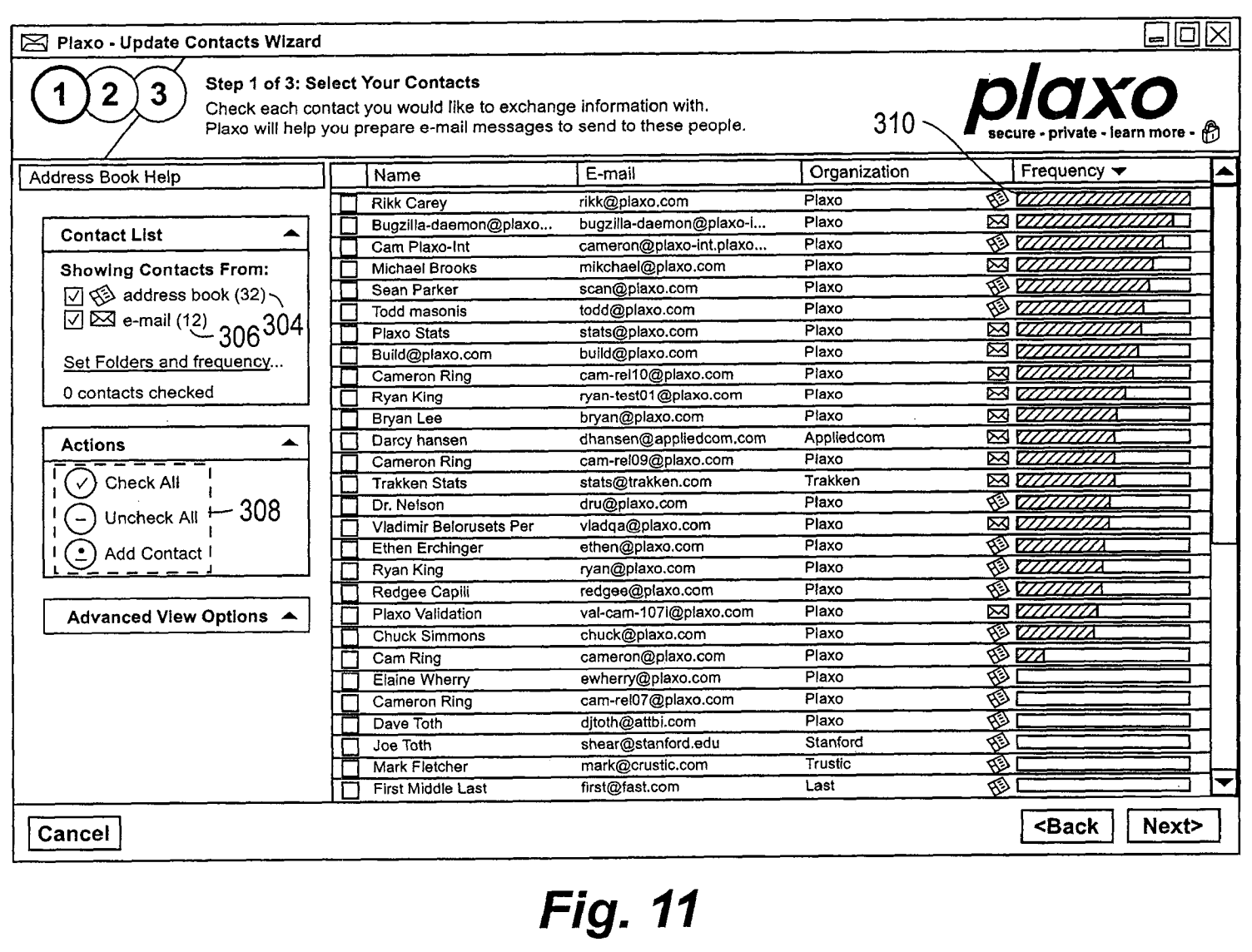

FIG. 10 shows a screen shot that informs the member 104 of the wizard's process 300 and provides a feature selection 302 that allows the member 104 to select whether to request an update or whether to provide an update. FIG. 11 shows a screen shot of a user interface for the user 103 selection step (1) of the update contacts wizard of this embodiment. As a default in one embodiment, all the users 103 in a member's contacts list or address book are automatically selected in order to maximize the number of users 103 exposed to the private network (N in the viral equation). However, member 104 may be given the option to select a subset of those users 103.

At this step, another aspect of the present invention includes a data-mining feature that contributes to maximizing the number of users 103 exposed to the private network (N) and to maximizing the conversion rate (CR). The data-mining feature of the viral engine is intended for finding users 103 more likely to join the private network. In one embodiment, heuristic algorithms are applied to a member's e-mail folders to find users 103 that are not included in the member's contacts list or address book 304. The result of this feature is shown in FIG. 11 as a number of e-mail users 306. For example, e-mail messages can be scanned to find e-mail addresses in the headers and bodies of the messages. The data-mining feature in this embodiment may include other algorithms to apply to the member's e-mail folders. For example, a syntax-checking algorithm may be used to find invalid e-mail addresses in a member's 104 address book, which avoids sending update requests to invalid e-mail addresses. This feature contributes to increasing the conversion rate (CR) by aiding in the selection of non-members 106 with valid e-mail addresses. That is, non-members with valid e-mail addresses are more likely to respond to an e-mail based invitation to join the network 100 than non-members 106 with invalid e-mail addresses, who will probably not even receive the invitation e-mail messages.

The data-mining feature further includes heuristics and other algorithms to repeatedly perform data analysis of the member's stored communications to determine a degree relationship between users 103 and member 104. Analysis to identify relationship to users 103 may include heuristic, natural language processing based, and other algorithms based on, for example, frequency of sending, receiving, or replying to communications, length of communications, tone of written messages, specific words or strings in messages or descriptions that may signal a closer relation (e.g., "Dear mom," "Dad's cell no.," or the like), area codes, time of day of communications, or any other information in members records that can lead to relationship related information. A premise of this feature is that the closer the relationship between a member 104 and a non-member 106 receiving the member's service request, which may bear an invitation to join the private network, the more likely it is that the non-member may subscribe to the private network, i.e., the higher the likelihood of conversion. Therefore, this relationship based viral feature positively impacts the conversion rate (CR).

Next, a frequency bar 310 graphically represents the relative frequency of contact with each user 103. As shown in FIG. 11, a sorted list of users 103 based on frequency from most frequent to least frequent can be displayed at the time the member selects which users 103 to use the private service with. By using this sorted arrangement, users 103 most frequently communicating with member 104 are prominently displayed at the top of the list making it more likely to be selected. Users 103 that regularly communicate with member 104 are more likely to join the private network than other users 103 who seldom communicate with member 104. Other heuristic algorithms to determine users 103 likely to join based on relationship with the member 104 include frequency of reply to member's messages, frequency of reply to user's messages, length of messages, topic of messages, and the like.

Figure 12:
FIG. 12 is a sample personalized update request according to one embodiment of the present invention.

The viral engine of the present invention also includes a personalization feature that contributes to maximizing the conversion rate (CR). Messages that look personal from the sender as opposed to generic messages are more likely to elicit a response from the receiver. For example, e-mail messages that look generic are often discarded as 'junk" mail hence they are less likely to prompt a response. FIG. 12 shows a sample screen shot of a user interface for the personalization step (2) of a contact update wizard of one embodiment of the invention. An information update request e-mail message is provided with a set of fields that the member 104 can personalize. Default text is provided that reads in the first person explaining the purpose of the service and the benefits of joining the private network. Users 103 are provided with the option to join the private network as a response to the message so that their information will be automatically updated with the member 104. In addition, instructions for alternatively replying to the message to provide a one-time update are also provided. The more a member 104 personalizes the message the more likely it is that the intended recipient, user 103, will respond and join the private network.

Message personalization provides a second benefit to network deployment. By allowing members 104 to personalize their messages, a "word-of-mouth" recommendation process is encouraged. When used in subsequent update requests, after a member 104 has been using the private network service for some time, the message personalization feature provides a forum for the member 104 to report to potential new members (i.e., non-members 106) the member's satisfaction and positive experiences using the service.

Figure 13A:
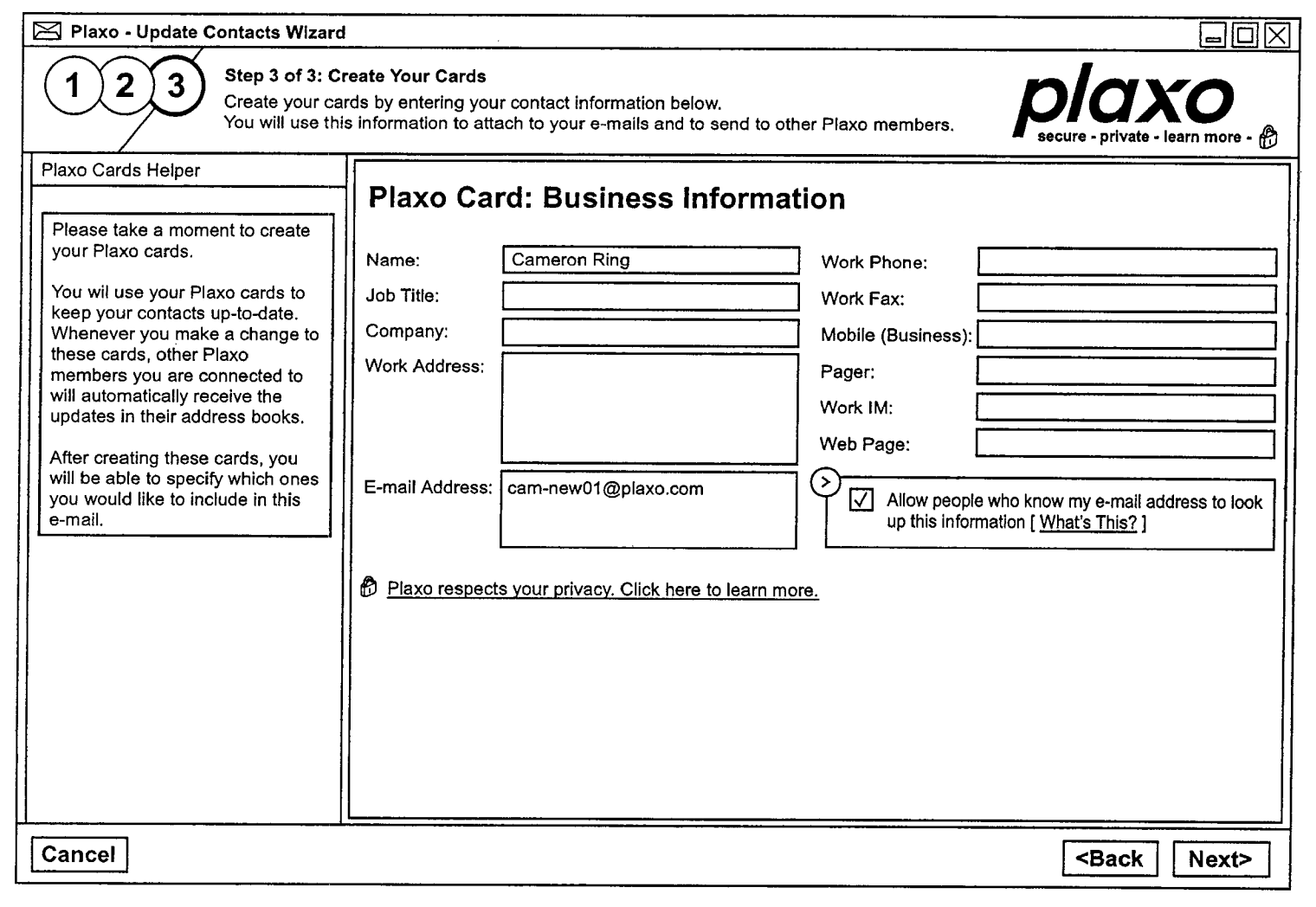
Figure 13B:
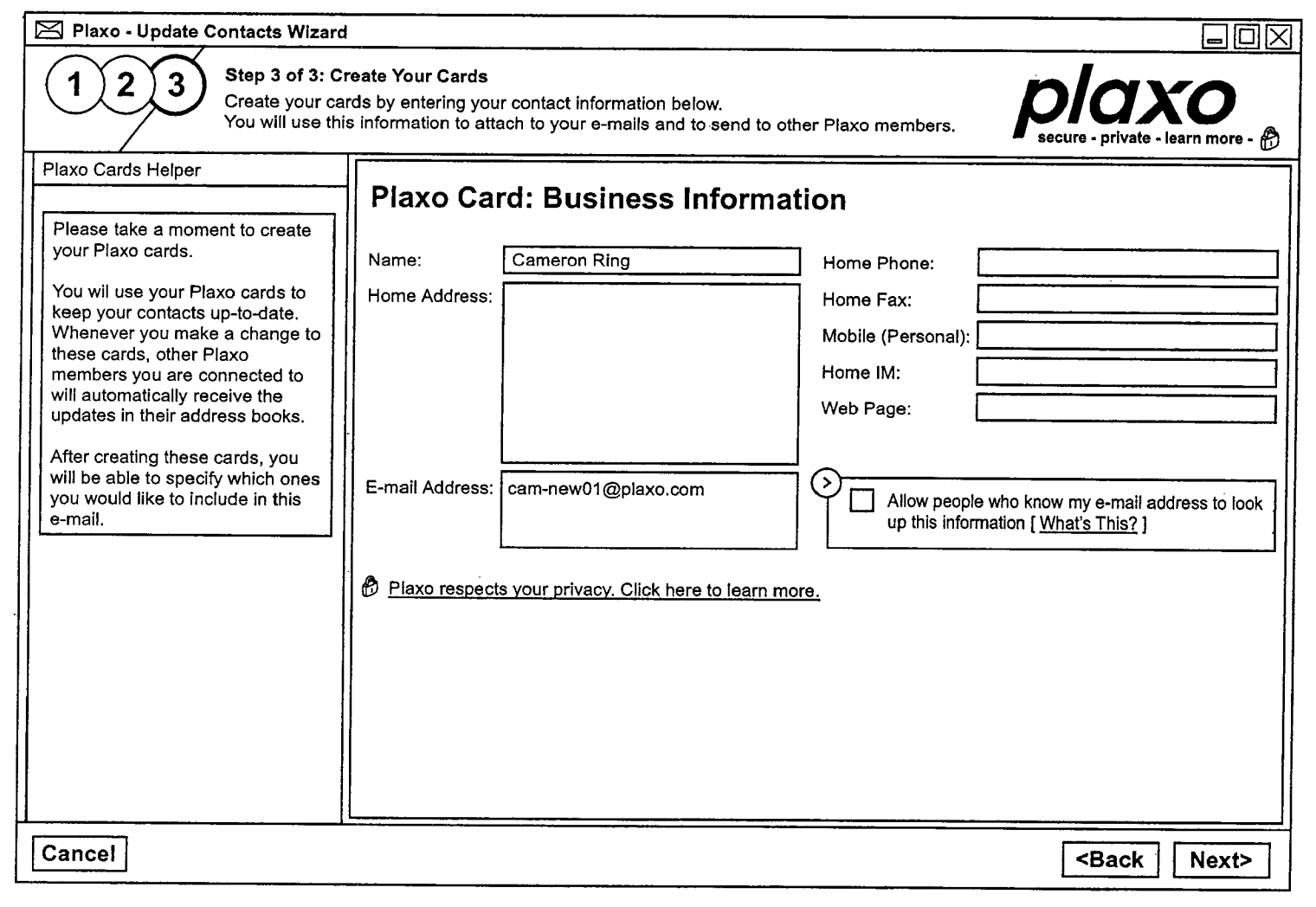
Figure 13C:
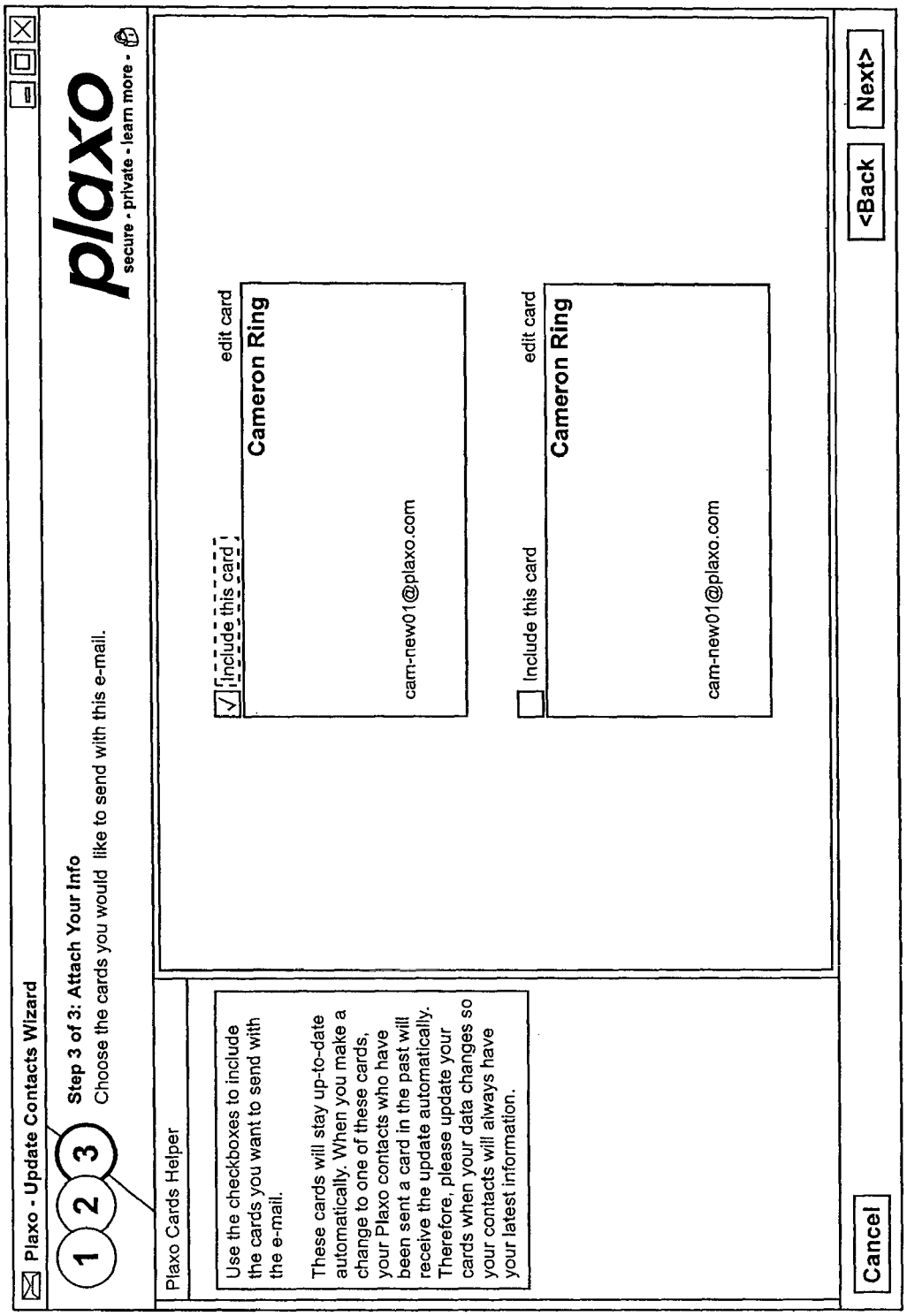
FIG. 13c is a sample screen shot of a list of available profiles for a private network member according to one embodiment of the present invention.

A third and final step of an update contacts wizard of one embodiment of the invention includes the member information input (3). FIGS. 13*a* through 13*c* illustrate this process. FIG. 13*a* shows a screen shot of a sample user interface for a member business information input screen and FIG. 13*b* shows a personal information version of the same. One feature of the frictionless set-up process of the viral engine previously mentioned is the use of data-mining algorithms over the existing member's stored messages to gather member information and automatically populate as many fields of user information as possible. This contributes to the frictionless setup process because it reduces the need for a new member 104 to input data. For example, a member's sent e-mail folder could be scanned to find a current e-mail address, business information from signature blocks, and the like. Similarly, e-mail folders can be scanned to determine whether the member 104 uses more than one e-mail address. Frequency of the member's e-mail addresses can be calculated to determine the most likely current e-mail address.

Once the member 104 information is gathered it is displayed to the member 104 for confirmation as shown in FIG. 13*c*. One aspect of the present invention includes the member-controlled access to member information. FIG. 13*c* also shows a selection field for a member 104 to determine which of the member's personal or business information is to be used in connection with update request messages. Alternative embodiments may allow a member 104 to create multiple information cards, or personas, each with a subset of personal information fields. The member 104 can grant a different set of access rights to each field of personal information by including it in a separate card. Other embodiments of the present invention provide a field-by-field authorization feature that allows members 104 to control access to each field of their personal information.

In one embodiment of the present invention, group type members 104 could cerate multiple sets of information or sub-databases (e.g., address books, lists of contacts, or the like) within the group member 104 profile or account. In general, one of these sub-databases may include the information relating to the members 104 who are part of the group. Other sub-databases are used to store other information of relevance to the group members. For example, a 'job hunter" group might contain two address books, one address book with contact information of the members 104 who compose the group, and a second address book with contact information of employers. It should be noted, that at least some of the information in one or more group sub-databases may be information regarding non-members 106 provided via public protocol 110 as described above.

Figure 14:
FIG. 14 is a sample screen shot for confirming a list of network users in a member's contact list to receive update requests according to one embodiment of the present invention.

FIG. 14 shows a sample screen shot of a user interface confirmation screen of an update contact wizard of one embodiment of the invention. The member 104 is presented the list of designated users 103 for sending service requests to prior to completing the update contact wizard. This screen provides a check for any potential error in the previous wizard steps and further ensures the member 104 privacy by verifying which users 103 will have access to the member provided information.

Following the completion of the update contact wizard, the private network server 112 manages the required functions to complete the private network service. For example, upon receiving the list of users 103 from a member 104, server 112 determines which users 103 are already private network members 104 and which ones are non-members 106. Server 112 manages the transmission of information update requests using private and public protocols and the corresponding responses. Non-members 106 may ignore the request or respond in one of a variety of ways. For example, non-member 106 may simply reply to an update request e-mail, may use a web-based interface to provide the update, or may join the private network and provide the information from within the private network as discussed below.

Figure 15:
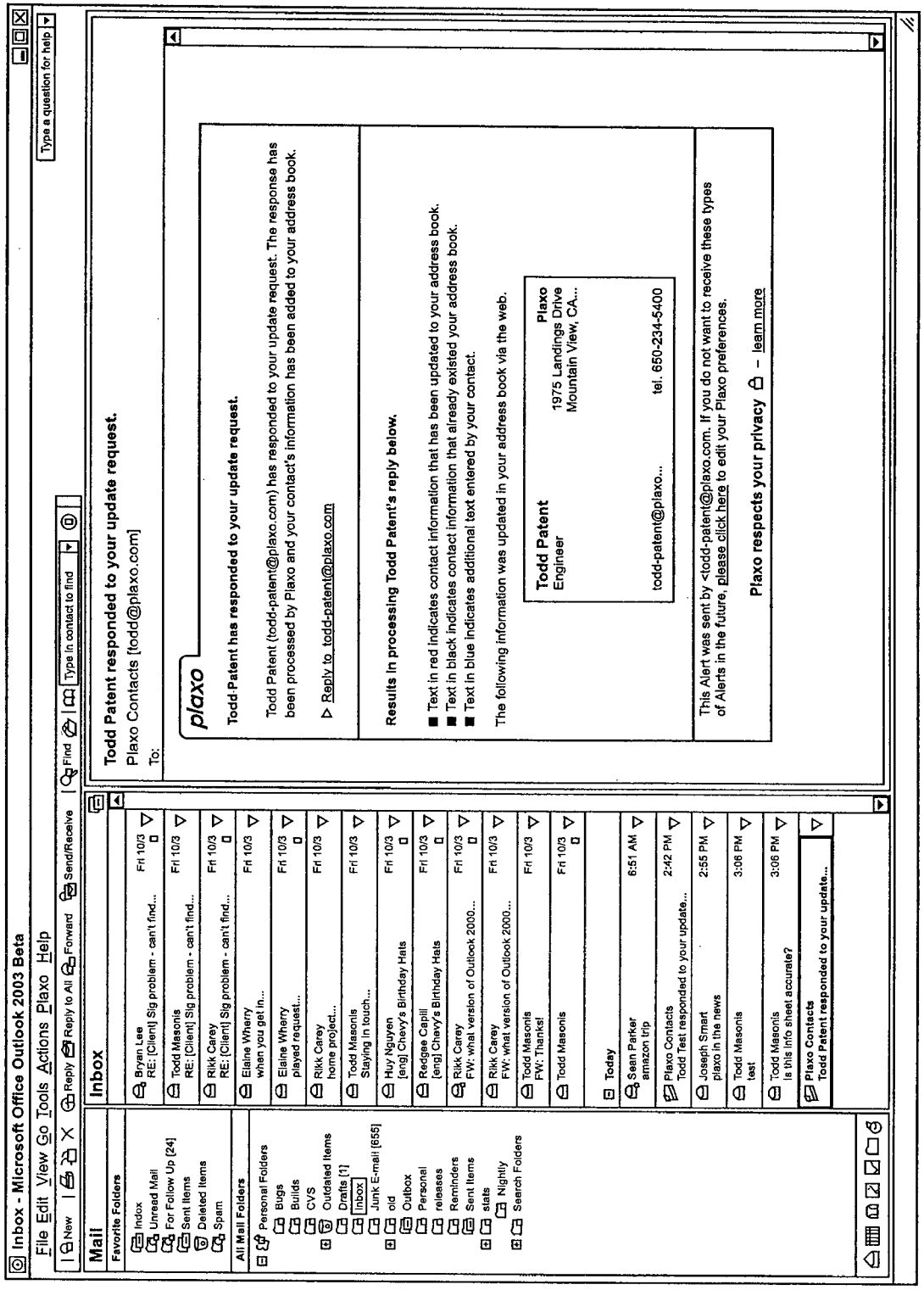
FIG. 15 is a sample confirmation message displayed to a member upon receipt of a response to an update request according to one embodiment of the present invention.

E-mail responses can be parsed with conventional language processing algorithms to determine the contact information fields, for example, text beginning with a number after a "my new address" string may be recognized as a street address. If the web-based interface is used instead, a set of fields can be presented for input to the non-member 106. FIG. 15 shows a confirmation notification to member 104 after a non-member 106 provides a response to the member's update request. A non-member 106 may include other service unrelated information for the member 104 in addition to the update information. Thus, after the server 112 has determined what portions of a non-member's e-mail response correspond to contact information, any additional text is provided to the member 104 for review.

Other members 104 have their information stored in member profiles within the private network database 114. Each member 104 designates some of the contact information in the member profile as public. Information designated as public, either in a field-by-field or card based embodiment, can be accessed by other members 104. The other members 104 must provide at least one currently unique identifier of the member that is stored within the member profile. An example of a unique identifier is a current e-mail address, phone number, or the like. Thus, for the subset of users 103 that are already members 104 and that were designated by a requesting member 104 for updating, a link is created between the member profiles and contacts list of the requesting member 104. The link will automatically provide the information provided in the member profile designated as public. Other information in the member profile can only be accessed after the information providing member 104 authorizes access by the requesting member 104.

In one embodiment, implicit authorization to a set of private information can be used based on the nature of the unique identifier provided for the update request. For example, if a requesting member 104 holds a private unique identifier of another information providing member 104, that is, a unique identifier designated as private in the providing member profile, the link that the system 100 establishes between the members 104 may provide access to other private information of the information providing member 104 related to the private unique identifier. For example, member A may request an update for member B by providing an e-mail address for member B. The e-mail address provided by member A is stored in member B's profile in a personal information card designated as private. Thus, other information in that private card of member B will be made accessible to member A as part of the update.

Figure 16:
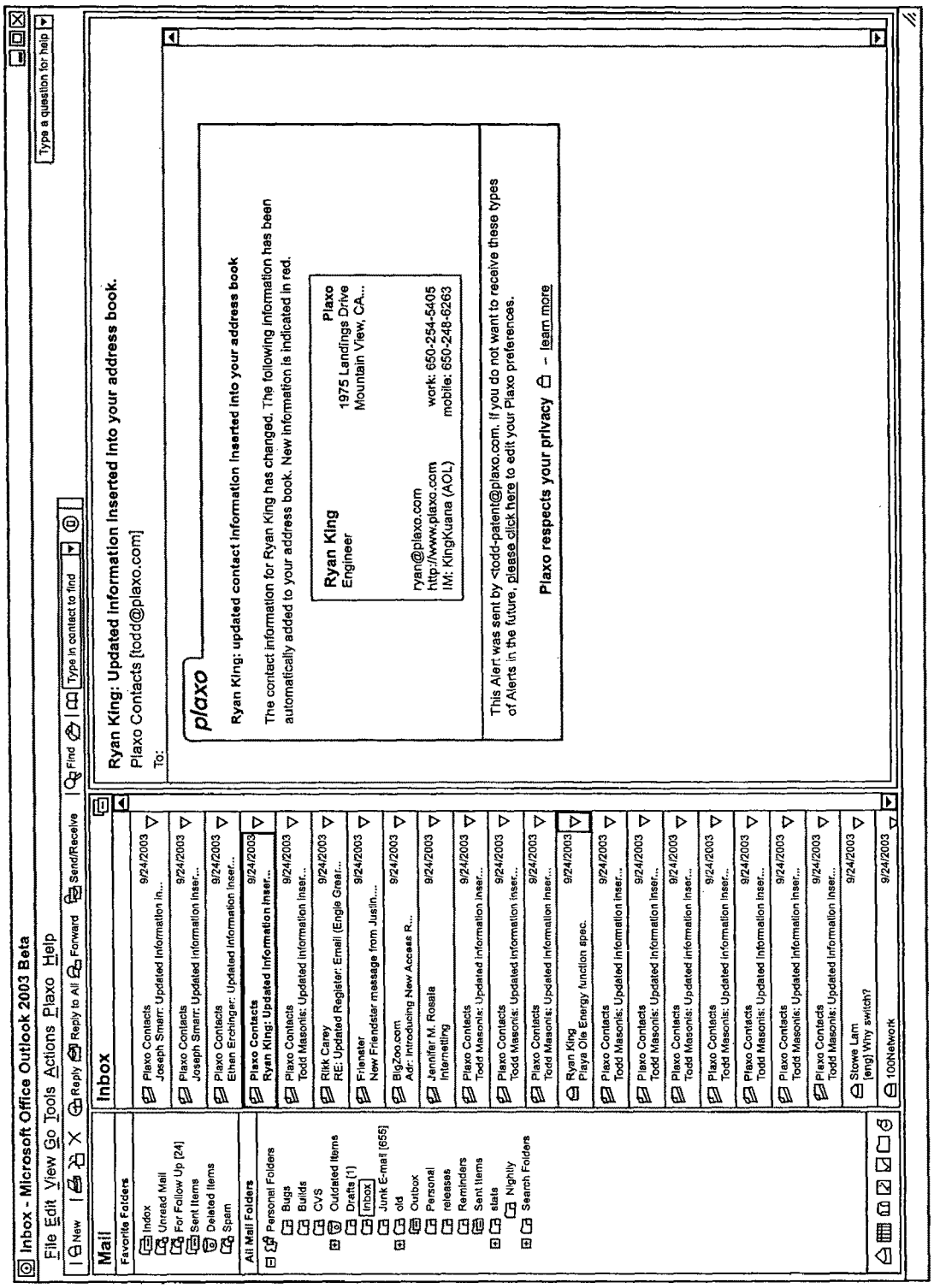
FIG. 16 is a sample confirmation message displayed to a member upon receipt of a member's own updated contact information according to one embodiment of the present invention.

Once a link is established between member profiles and contact lists, any update in a profile is automatically reflected in the contact list of other members 104. Further, once a link is established, even if the unique identifier, e.g., e-mail address, of a member 104 changes, members 104 remain linked and receive updated information. This feature is an enhanced feature of the private network 100 only available to members 104. FIG. 16 shows one embodiment of a notification message to inform members about profile updates of other members in their contact list according to this aspect of the invention.

Figure 17:
FIG. 17 is a sample screen shot of a member's user profile according to one embodiment of the present invention.

FIG. 17 shows a sample screen shot of a member profile 350 according to one embodiment of the present invention. Member profile 350 includes a general status 351, a contact based status window 352, recent alert window 353, information cards window 354 including business card 356 and personal card 358. The general status 351 is a summary of how current the information in the member's contact list or address book is. Contact based status window 352 shows a list of the member's contacts indicating for each member 104 whether their information has been updated. The status includes a designation for contacts that are private network members 104, which indicates that the information for those contacts is current, e.g., "member." For non-members 106 the status can include "replied," "sent" or "pending," and "out-of-date" to indicate whether the information has been updated, a request has been sent but not replied to, or no request has been sent. The recent alert window 353 provides recent notifications that the member 104 may want to review.

The information cards window 354 includes the member's own information organized in cards or "personas" to which different access rights can be granted. For example, business card 356 includes the member's publicly available (to other members 104) information while personal card 358 includes the member's personal information only available to members 104 specifically authorized. In this context, publicly available means available to members 104 having at least a unique identifier of a member, such as, a current verified e-mail address, IM user id, phone number, or the like.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

The invention claimed is:

1. A method comprising:
   determining, by a computing device and based on an electronic contact network of a user, target users associated with the user;
   determining, for each of a plurality of advertisements associated with the electronic contact network, a corresponding response rate that is based on a quantity of recipient users that responded to the advertisement after being sent the advertisement;
   determining, based on the response rates, a determined advertisement; and
   causing sending, to a subset of the target users, of the determined advertisement.

2. The method of claim 1, wherein the determining the target users is based on an electronic mailbox of the user.

3. The method of claim 2, further comprising:
   determining, based on the electronic mailbox, one or more additional target users for receipt of the determined advertisement; and
   causing sending, to the one or more additional target users, of the determined advertisement.

4. The method of claim 1, further comprising:
   determining, for at least one of the target users, a frequency of communications between the at least one of the target users and the user; and
   determining, based on the frequency, the subset of the target users.

5. The method of claim 1, further comprising:
   determining a familial relationship between at least one of the target users and the user; and
   determining, based on the familial relationship, the subset of the target users.

6. The method of claim 1, further comprising:
   selecting, based on a determination that an aesthetic appeal related feature prompts a response to the determined advertisement, the aesthetic appeal related feature to be included in the determined advertisement.

7. The method of claim 1, further comprising:
   generating a report comprising a frequency bar graphically representing a frequency of electronic mail communication with the target users.

8. The method of claim 1, wherein the determining the target users comprises performing analysis of electronic mail messages within electronic mail folders of the user to determine target users that are not members of the electronic contact network or that are likely to respond to the determined advertisement.

9. The method of claim 1, further comprising:
   receiving, after the causing the sending of the determined advertisement, contact information associated with a target user of the subset of the target users.

10. The method of claim 1, further comprising:
designating, based on input received from the user, a set of contacts, in a contact list of the user, to be updated;
causing sending, to members of the electronic contact network associated with the set of contacts, of a request to verify contact information; and
causing sending, to non-members of the electronic contact network associated with the set of contacts, of an electronic mail message asking the non-members to provide current contact information in a reply electronic mail message,
wherein the electronic mail message comprises a fill-in-the-blank form.

11. The method of claim 1, further comprising:
determining, based on whether the subset of the target users responded to the determined advertisement, whether the determined advertisement elicited a response from the subset of the target users; and
updating, based on a quantity of the target users that responded to the determined advertisement, the determined advertisement.

12. The method of claim 1, wherein the determined advertisement is an automatically-generated advertisement, the method further comprising:
causing sending, to the user, of an option to edit the automatically-generated advertisement.

13. The method of claim 1, further comprising determining the subset of the target users based on one or more of:
a length of communications between at least one of the target users and the user,
a tone used in the communications between the at least one of the target users and the user,
a geographic location of the at least one of the target users, or
a time of day of communications between the at least one of the target users and the user.

14. A method comprising:
determining, by a computing device and based on an electronic contact network of a user, target users associated with the user;
determining, based on a frequency of communications between at least one of the target users and the user, a subset of the target users; and
causing sending, to the subset of the target users, of an advertisement associated with the electronic contact network.

15. The method of claim 14, wherein the determining the target users is based on an electronic mailbox associated with the user.

16. The method of claim 14, wherein the determining the target users comprises performing analysis of electronic mail messages within electronic mail folders of the user to determine target users that are not members of the electronic contact network or that are likely to respond to the advertisement.

17. The method of claim 14, further comprising:
determining, for each of a plurality of advertisements associated with the electronic contact network, a corresponding response rate that is based on a quantity of recipient users that responded to the advertisement after being sent the advertisement; and
determining, based on the response rates of the plurality of advertisements associated with the electronic contact network, the advertisement sent to the subset of the target users.

18. The method of claim 14, further comprising:
selecting, based on a determination that an aesthetic appeal related feature prompts a response to the advertisement, the aesthetic appeal related feature to be included in the advertisement.

19. The method of claim 14, wherein the advertisement sent to the subset of the target users is an automatically-generated advertisement, the method further comprising:
causing sending, to the user, of an option to edit the automatically-generated advertisement.

20. The method of claim 14, wherein the determining the subset of the target users is based on one or more of:
a length of communications between the at least one of the target users and the user,
a tone used in the communications between the at least one of the target users and the user,
a geographic location of the at least one of the target users, or
a time of day of communications between the at least one of the target users and the user.

21. An apparatus comprising:
one or more processors; and
memory storing instructions that, when executed by the one or more processors, cause the apparatus to:
determine, based on an electronic contact network of a user, target users associated with the user;
determine, for each of a plurality of advertisements associated with the electronic contact network, a corresponding response rate that is based on a quantity of recipient users that responded to the advertisement after being sent the advertisement;
determine, based on the response rates, a determined advertisement; and
cause sending, to a subset of the target users, of the determined advertisement.

22. The apparatus of claim 21, wherein the instructions, when executed by the one or more processors, cause the apparatus to determine, further based on an electronic mailbox of the user, the target users.

23. The apparatus of claim 22, wherein the instructions, when executed by the one or more processors, further cause the apparatus to:
determine, based on the electronic mailbox, one or more additional target users for receipt of the determined advertisement; and
cause sending, to the one or more additional target users, of the determined advertisement.

24. The apparatus of claim 21, wherein the instructions, when executed by the one or more processors, further cause the apparatus to:
determine, for at least one of the target users, a frequency of communications between the at least one of the target users and the user; and
determine, based on the frequency, the subset of the target users.

25. The apparatus of claim 21, wherein the instructions, when executed by the one or more processors, further cause the apparatus to:
determine a familial relationship between at least one of the target users and the user; and
determine, based on the familial relationship, the subset of the target users.

26. The apparatus of claim 21, wherein the instructions, when executed by the one or more processors, further cause the apparatus to:
select, based on a determination that an aesthetic appeal related feature prompts a response to the determined advertisement, the aesthetic appeal related feature to be included in the determined advertisement.

27. The apparatus of claim 21, wherein the instructions, when executed by the one or more processors, further cause the apparatus to:
generate a report comprising a frequency bar graphically representing a frequency of electronic mail communication with the target users.

28. The apparatus of claim 21, wherein the instructions, when executed by the one or more processors, cause the apparatus to determine the target users by performing analysis of electronic mail messages within electronic mail folders of the user to determine target users that are not members of the electronic contact network or that are likely to respond to the determined advertisement.

29. The apparatus of claim 21, wherein the instructions, when executed by the one or more processors, further cause the apparatus to:
receive, after the causing the sending of the determined advertisement, contact information associated with a target user of the subset of the target users.

30. The apparatus of claim 21, wherein the instructions, when executed by the one or more processors, further cause the apparatus to:
designate, based on input received from the user, a set of contacts, in a contact list of the user, to be updated;
cause sending, to members of the electronic contact network associated with the set of contacts, of a request to verify contact information; and
cause sending, to non-members of the electronic contact network associated with the set of contacts, of an electronic mail message asking the non-members to provide current contact information in a reply electronic mail message,
wherein the electronic mail message comprises a fill-in-the-blank form.

31. The apparatus of claim 21, wherein the instructions, when executed by the one or more processors, further cause the apparatus to:
determine, based on whether the subset of the target users responded to the determined advertisement, whether the determined advertisement elicited a response from the subset of the target users; and
update, based on a quantity of the target users that responded to the determined advertisement, the determined advertisement.

32. The apparatus of claim 21, wherein the determined advertisement is an automatically-generated advertisement, and
the instructions, when executed by the one or more processors, further cause the apparatus to:
cause sending, to the user, of an option to edit the automatically-generated advertisement.

33. The apparatus of claim 21, wherein the instructions, when executed by the one or more processors, cause the apparatus to determine the subset of the target users based on one or more of:
a length of communications between at least one of the target users and the user,
a tone used in the communications between the at least one of the target users and the user,
a geographic location of the at least one of the target users, or
a time of day of communications between the at least one of the target users and the user.

34. An apparatus comprising:
one or more processors; and
memory storing instructions that, when executed by the one or more processors, cause the apparatus to:
determine, based on an electronic contact network of a user, target users associated with the user;
determine, based on a frequency of communications between at least one of the target users and the user, a subset of the target users; and
cause sending, to the subset of the target users, of an advertisement associated with the electronic contact network.

35. The apparatus of claim 34, wherein the instructions, when executed by the one or more processors, cause the apparatus to determine the target users by determining, based on an electronic mailbox associated with the user, the target users.

36. The apparatus of claim 34, wherein the instructions, when executed by the one or more processors, cause the apparatus to determine the target users by performing analysis of electronic mail messages within electronic mail folders of the user to determine target users that are not members of the electronic contact network or that are likely to respond to the advertisement.

37. The apparatus of claim 34, wherein the instructions, when executed by the one or more processors, further cause the apparatus to:
determine, for each of a plurality of advertisements associated with the electronic contact network, a corresponding response rate that is based on a quantity of recipient users that responded to the advertisement after being sent the advertisement; and
determine, based on the response rates of the plurality of advertisements associated with the electronic contact network, the advertisement sent to the subset of the target users.

38. The apparatus of claim 34, wherein the instructions, when executed by the one or more processors, further cause the apparatus to:
select, based on a determination that an aesthetic appeal related feature prompts a response to the advertisement, the aesthetic appeal related feature to be included in the advertisement.

39. The apparatus of claim 34, wherein the advertisement sent to the subset of the target users is an automatically-generated advertisement, and
the instructions, when executed by the one or more processors, further cause the apparatus to:
cause sending, to the user, of an option to edit the automatically-generated advertisement.

40. The apparatus of claim 34, the instructions, when executed by the one or more processors, cause the apparatus to determine the subset of the target users based on one or more of:
a length of communications between the at least one of the target users and the user,
a tone used in the communications between the at least one of the target users and the user,
a geographic location of the at least one of the target users, or
a time of day of communications between the at least one of the target users and the user.

41. A system comprising:
an apparatus; and
a user device,
wherein the apparatus comprises:
one or more first processors; and
first memory storing first instructions that, when executed by the one or more first processors, cause the apparatus to:
determine, based on an electronic contact network of a user, target users associated with the user;
determine, for each of a plurality of advertisements associated with the electronic contact network, a corresponding response rate that is based on a quantity of recipient users that responded to the advertisement after being sent the advertisement;
determine, based on the response rates, a determined advertisement; and
cause sending, to a subset of the target users, of the determined advertisement, and
wherein the user device comprises:
one or more second processors; and
second memory storing second instructions that, when executed by the one or more second processors, cause the user device to:
receive, from the apparatus, the determined advertisement.

42. The system of claim 41, wherein the first instructions, when executed by the one or more first processors, cause the apparatus to determine, further based on an electronic mailbox of the user, the target users.

43. The system of claim 42, wherein the first instructions, when executed by the one or more first processors, further cause the apparatus to:
determine, based on the electronic mailbox, one or more additional target users for receipt of the determined advertisement; and
cause sending, to the one or more additional target users, of the determined advertisement.

44. The system of claim 41, wherein the first instructions, when executed by the one or more first processors, further cause the apparatus to:
determine, for at least one of the target users, a frequency of communications between the at least one of the target users and the user; and
determine, based on the frequency, the subset of the target users.

45. The system of claim 41, wherein the first instructions, when executed by the one or more first processors, further cause the apparatus to:
determine a familial relationship between at least one of the target users and the user; and
determine, based on the familial relationship, the subset of the target users.

46. The system of claim 41, wherein the first instructions, when executed by the one or more first processors, further cause the apparatus to:
select, based on a determination that an aesthetic appeal related feature prompts a response to the determined advertisement, the aesthetic appeal related feature to be included in the determined advertisement.

47. The system of claim 41, wherein the first instructions, when executed by the one or more first processors, further cause the apparatus to:
generate a report comprising a frequency bar graphically representing a frequency of electronic mail communication with the target users.

48. A system comprising:
an apparatus; and
a user device,
wherein the apparatus comprises:
one or more first processors; and
first memory storing first instructions that, when executed by the one or more first processors, cause the apparatus to:
determine, based on an electronic contact network of a user, target users associated with the user;
determine, based on a frequency of communications between at least one of the target users and the user, a subset of the target users; and
cause sending, to the subset of the target users, of an advertisement associated with the electronic contact network, and
wherein the user device comprises:
one or more second processors; and
second memory storing second instructions that, when executed by the one or more second processors, cause the user device to:
receive, from the apparatus, the advertisement.

49. The system of claim 48, wherein the first instructions, when executed by the one or more first processors, cause the apparatus to determine the target users by determining, based on an electronic mailbox associated with the user, the target users.

50. The system of claim 48, wherein the first instructions, when executed by the one or more first processors, cause the apparatus to determine the target users by performing analysis of electronic mail messages within electronic mail folders of the user to determine target users that are not members of the electronic contact network or that are likely to respond to the advertisement.

51. The system of claim 48, wherein the first instructions, when executed by the one or more first processors, further cause the apparatus to:
determine, for each of a plurality of advertisements associated with the electronic contact network, a corresponding response rate that is based on a quantity of recipient users that responded to the advertisement after being sent the advertisement; and
determine, based on the response rates of the plurality of advertisements associated with the electronic contact network, the advertisement sent to the subset of the target users.

52. The system of claim 48, wherein the first instructions, when executed by the one or more first processors, further cause the apparatus to:
select, based on a determination that an aesthetic appeal related feature prompts a response to the advertisement, the aesthetic appeal related feature to be included in the advertisement.

53. One or more non-transitory computer-readable media storing instructions that, when executed, cause:
determining, by a computing device and based on an electronic contact network of a user, target users associated with the user;
determining, for each of a plurality of advertisements associated with the electronic contact network, a corresponding response rate that is based on a quantity of recipient users that responded to the advertisement after being sent the advertisement;
determining, based on the response rates, a determined advertisement; and
causing sending, to a subset of the target users, of the determined advertisement.

54. The one or more non-transitory computer-readable media of claim 53, wherein the determining the target users is based on an electronic mailbox of the user.

55. The one or more non-transitory computer-readable media of claim 54, wherein the instructions, when executed, further cause:
   determining, based on the electronic mailbox, one or more additional target users for receipt of the determined advertisement; and
   causing sending, to the one or more additional target users, of the determined advertisement.

56. The one or more non-transitory computer-readable media of claim 53, wherein the instructions, when executed, further cause:
   determining, for at least one of the target users, a frequency of communications between the at least one of the target users and the user; and
   determining, based on the frequency, the subset of the target users.

57. The one or more non-transitory computer-readable media of claim 53, wherein the instructions, when executed, further cause:
   determining a familial relationship between at least one of the target users and the user; and
   determining, based on the familial relationship, the subset of the target users.

58. The one or more non-transitory computer-readable media of claim 53, wherein the instructions, when executed, further cause:
   selecting, based on a determination that an aesthetic appeal related feature prompts a response to the determined advertisement, the aesthetic appeal related feature to be included in the determined advertisement.

59. The one or more non-transitory computer-readable media of claim 53, wherein the instructions, when executed, further cause:
   generating a report comprising a frequency bar graphically representing a frequency of electronic mail communication with the target users.

60. One or more non-transitory computer-readable media storing instructions that, when executed, cause:
   determining, by a computing device and based on an electronic contact network of a user, target users associated with the user;
   determining, based on a frequency of communications between at least one of the target users and the user, a subset of the target users; and
   causing sending, to the subset of the target users, of an advertisement associated with the electronic contact network.

61. The one or more non-transitory computer-readable media of claim 60, wherein the determining the target users is based on an electronic mailbox associated with the user.

62. The one or more non-transitory computer-readable media of claim 60, wherein the determining the target users comprises performing analysis of electronic mail messages within electronic mail folders of the user to determine target users that are not members of the electronic contact network or that are likely to respond to the advertisement.

63. The one or more non-transitory computer-readable media of claim 60, wherein the instructions, when executed, further cause:
   determining, for each of a plurality of advertisements associated with the electronic contact network, a corresponding response rate that is based on a quantity of recipient users that responded to the advertisement after being sent the advertisement; and
   determining, based on the response rates of the plurality of advertisements associated with the electronic contact network, the advertisement sent to the subset of the target users.

64. The one or more non-transitory computer-readable media of claim 60, wherein the instructions, when executed, further cause:
   selecting, based on a determination that an aesthetic appeal related feature prompts a response to the advertisement, the aesthetic appeal related feature to be included in the advertisement.

* * * * *

UNITED STATES PATENT AND TRADEMARK OFFICE
CERTIFICATE OF CORRECTION

| | |
|---|---|
| PATENT NO. | : 11,445,033 B2 |
| APPLICATION NO. | : 17/072420 |
| DATED | : September 13, 2022 |
| INVENTOR(S) | : Masonis et al. |

It is certified that error appears in the above-identified patent and that said Letters Patent is hereby corrected as shown below:

On the Title Page

Column 2, Item (56) Foreign Patent Documents, Line 2:
Delete "NO" and insert --WO-- therefor Page 4, Column 2, Item (56) Other Publications, Line 9:
Delete "hve" and insert --have-- therefor Page 5, Column 2, Item (56) Other Publications, Line 6:
Delete "Adresses" and insert --Addresses-- therefor Page 5, Column 2, Item (56) Other Publications, Line 57:
Delete "form" and insert --from-- therefor Page 6, Column 2, Item (56) Other Publications, Line 57:
Delete "addres" and insert --address-- therefor In the Specification Column 4, Summary of the Invention, Line 48:
Delete "'junk-mail'"" and insert --"junk-mail"-- therefor Column 10, Detailed Description of the Invention, Lines 11-12:
Delete "Freemont," and insert --Fremont,-- therefor Column 10, Detailed Description of the Invention, Line 17:
Delete "Itis" and insert --It is-- therefor Column 12, Detailed Description of the Invention, Line 5:
Delete "142 and 140" and insert --140 and 142-- therefor Signed and Sealed this
Seventh Day of November, 2023

Katherine Kelly Vidal

Katherine Kelly Vidal
*Director of the United States Patent and Trademark Office*

CERTIFICATE OF CORRECTION (continued)
U.S. Pat. No. 11,445,033 B2

Column 15, Detailed Description of the Invention, Line 42:
Delete "118" and insert --128-- therefor Column 15, Detailed Description of the Invention, Line 61:
Delete "MO" and insert --M0-- therefor Column 15, Detailed Description of the Invention, Line 64:
Delete "MO" and insert --M0-- therefor Column 16, Detailed Description of the Invention, Line 5:
Delete "Ulf," and insert --U11,-- therefor Column 16, Detailed Description of the Invention, Line 8:
Delete "MO," and insert --M0,-- therefor Column 16, Detailed Description of the Invention, Line 12:
Delete "MO." and insert --M0.-- therefor Column 16, Detailed Description of the Invention, Line 13:
Delete "MO." and insert --M0.-- therefor Column 16, Detailed Description of the Invention, Line 14:
Delete "MO" and insert --M0-- therefor Column 16, Detailed Description of the Invention, Line 14:
Delete "MO" and insert --M0-- therefor Column 16, Detailed Description of the Invention, Line 18:
Delete "MO" and insert --M0-- therefor Column 16, Detailed Description of the Invention, Line 20:
Delete "MO," and insert --M0,-- therefor Column 16, Detailed Description of the Invention, Line 22:
Delete "MO," and insert --M0,-- therefor Column 16, Detailed Description of the Invention, Line 34:
Delete "MO" and insert --M0-- therefor Column 21, Detailed Description of the Invention, Line 19:
Delete "'junk'" and insert --"junk"-- therefor Column 22, Detailed Description of the Invention, Line 13:
Delete "cerate" and insert --create-- therefor Column 22, Detailed Description of the Invention, Line 19:
Delete "'job" and insert --"job-- therefor